(12) United States Patent
Tarsa et al.

(10) Patent No.: US 10,890,714 B2
(45) Date of Patent: *Jan. 12, 2021

(54) WAVEGUIDE-BASED LIGHT SOURCES WITH DYNAMIC BEAM SHAPING

(71) Applicant: IDEAL Industries Lighting LLC, Durham, NC (US)

(72) Inventors: Eric J. Tarsa, Goleta, CA (US); Jean-Claude David Ramey DeSugny, Santa Barbara, CA (US); David Stone, Santa Barbara, CA (US); Benjamin A. Jacobson, Santa Barbara, CA (US); Shawn Patrick Keeney, Chapel Hill, NC (US)

(73) Assignee: Ideal Industries Lighting LLC, Sycamore, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/703,125

(22) Filed: Dec. 4, 2019

(65) Prior Publication Data

US 2020/0103591 A1 Apr. 2, 2020

Related U.S. Application Data

(63) Continuation of application No. 15/587,442, filed on May 5, 2017, now Pat. No. 10,527,785.

(Continued)

(51) Int. Cl.
*G02B 6/12* (2006.01)
*F21V 8/00* (2006.01)
(Continued)

(52) U.S. Cl.
CPC ......... *G02B 6/12004* (2013.01); *F21S 6/005* (2013.01); *F21V 23/0435* (2013.01);
(Continued)

(58) Field of Classification Search
CPC .................. G02B 26/004; G02B 26/007
See application file for complete search history.

(56) References Cited

U.S. PATENT DOCUMENTS

| 615,108 A | 11/1898 | De Segundo |
| 631,880 A | 8/1899 | Ross |

(Continued)

FOREIGN PATENT DOCUMENTS

| DE | 20014114 | 12/2000 |
| DE | 10047101 | 5/2002 |

(Continued)

OTHER PUBLICATIONS

IPRP for International Application No. PCT/US2014/028938, dated Sep. 24, 2015, Applicant, Cree, Inc., (12 pages).

(Continued)

*Primary Examiner* — Evan P Dzierzynski
*Assistant Examiner* — Keith G. Delahoussaye
(74) *Attorney, Agent, or Firm* — Myers Bigel, P.A.

(57) ABSTRACT

Luminaires are described herein employing waveguides and associated architectures for dynamic alteration of illuminance distribution patterns. The waveguide includes a light extraction component. The waveguide transmits light from a light source to the light extraction component by total internal reflection (TIR). The light extraction component includes one or more reversibly moveable surfaces for altering illuminance distribution patterns of the luminaire in response to one or more forces applied to the light extraction component by a force application assembly of the luminaire.

30 Claims, 31 Drawing Sheets

Related U.S. Application Data

(60) Provisional application No. 62/333,000, filed on May 6, 2016.

(51) Int. Cl.
*F21V 23/04* (2006.01)
*F21S 6/00* (2006.01)
*G02B 6/122* (2006.01)
*F21Y 115/10* (2016.01)

(52) U.S. Cl.
CPC ...... *F21V 23/0464* (2013.01); *F21V 23/0471* (2013.01); *F21V 23/0485* (2013.01); *G02B 6/0045* (2013.01); *G02B 6/0063* (2013.01); *G02B 6/0076* (2013.01); *G02B 6/0088* (2013.01); *G02B 6/122* (2013.01); *F21Y 2115/10* (2016.08); *G02B 6/0068* (2013.01); *G02B 6/0073* (2013.01); *G02B 6/0078* (2013.01); *G02B 2006/12083* (2013.01)

(56) References Cited

U.S. PATENT DOCUMENTS

| | | |
|---|---|---|
| 766,515 A | 8/1904 | Northrup |
| D67,806 S | 7/1925 | Hoyt et al. |
| 2,043,951 A | 6/1936 | Eksergian |
| 2,992,587 A | 7/1961 | Hicks, Jr. et al. |
| 3,372,740 A | 3/1968 | Kastovich et al. |
| 3,532,871 A | 10/1970 | Shipman |
| D219,546 S | 12/1970 | Kaiser et al. |
| 3,641,354 A | 2/1972 | Ment |
| 4,146,297 A | 3/1979 | Alferness et al. |
| 4,441,787 A | 4/1984 | Lichtenberger |
| 4,714,983 A | 12/1987 | Lang |
| 4,783,155 A | 11/1988 | Imataki et al. |
| D298,861 S | 12/1988 | Ewing et al. |
| 4,914,553 A | 4/1990 | Hamada et al. |
| 4,954,930 A | 9/1990 | Maegawa et al. |
| 4,977,486 A | 12/1990 | Gotoh |
| 5,005,108 A | 4/1991 | Pristash et al. |
| 5,009,483 A | 4/1991 | Rockwell, III |
| 5,026,161 A | 6/1991 | Werner |
| 5,040,098 A | 8/1991 | Tanaka et al. |
| 5,047,761 A | 9/1991 | Sell |
| 5,061,404 A | 10/1991 | Wu et al. |
| 5,097,258 A | 3/1992 | Iwaki |
| 5,113,177 A | 5/1992 | Cohen |
| 5,113,472 A | 5/1992 | Gualtieri et al. |
| 5,171,080 A | 12/1992 | Bathurst |
| 5,175,787 A | 12/1992 | Gualtieri et al. |
| 5,186,865 A | 2/1993 | Wu et al. |
| 5,245,689 A | 9/1993 | Gualtieri |
| 5,253,317 A | 10/1993 | Allen et al. |
| 5,295,019 A | 3/1994 | Rapoport |
| 5,309,544 A | 5/1994 | Saxe |
| 5,359,687 A | 10/1994 | McFarland et al. |
| 5,359,691 A | 10/1994 | Tai et al. |
| 5,396,350 A | 3/1995 | Beeson et al. |
| 5,398,179 A | 3/1995 | Pacheco |
| 5,400,224 A | 3/1995 | Dunah et al. |
| 5,428,468 A | 6/1995 | Zimmerman et al. |
| 5,461,547 A | 10/1995 | Ciupke et al. |
| 5,462,700 A | 10/1995 | Beeson et al. |
| 5,481,385 A | 1/1996 | Zimmerman et al. |
| 5,506,924 A | 4/1996 | Inoue |
| 5,521,725 A | 5/1996 | Beeson et al. |
| 5,521,726 A | 5/1996 | Zimmerman et al. |
| 5,528,720 A | 6/1996 | Winston et al. |
| 5,537,304 A | 7/1996 | Klaus |
| 5,541,039 A | 7/1996 | McFarland et al. |
| 5,548,670 A | 8/1996 | Koike |
| 5,553,092 A | 9/1996 | Bruce et al. |
| 5,555,109 A | 9/1996 | Zimmerman et al. |
| 5,555,160 A | 9/1996 | Tawara et al. |
| 5,555,329 A | 9/1996 | Kuper et al. |
| 5,572,411 A | 11/1996 | Watai et al. |
| 5,577,492 A | 11/1996 | Parkyn, Jr. et al. |
| 5,584,556 A | 12/1996 | Yokoyama et al. |
| 5,598,280 A | 1/1997 | Nishio et al. |
| 5,598,281 A | 1/1997 | Zimmerman et al. |
| 5,613,751 A | 3/1997 | Parker et al. |
| 5,613,770 A | 3/1997 | Chin, Jr. et al. |
| 5,624,202 A | 4/1997 | Grierson |
| 5,657,408 A | 8/1997 | Ferm et al. |
| 5,658,066 A | 8/1997 | Hirsch |
| 5,659,410 A | 8/1997 | Koike et al. |
| 5,676,453 A | 10/1997 | Parkyn, Jr. et al. |
| 5,676,457 A | 10/1997 | Simon |
| 5,677,702 A | 10/1997 | Inoue et al. |
| 5,685,634 A | 11/1997 | Mulligan |
| 5,696,865 A | 12/1997 | Beeson et al. |
| 5,702,176 A | 12/1997 | Engle |
| 5,718,497 A | 2/1998 | Yokoyama et al. |
| 5,727,107 A | 3/1998 | Umemoto et al. |
| 5,735,590 A | 4/1998 | Kashima et al. |
| 5,739,931 A | 4/1998 | Zimmerman et al. |
| 5,748,828 A | 5/1998 | Steiner et al. |
| 5,761,355 A | 6/1998 | Kuper et al. |
| 5,769,522 A | 6/1998 | Kaneko et al. |
| 5,771,039 A | 6/1998 | Ditzik |
| 5,777,857 A | 7/1998 | Degelmann |
| 5,806,955 A | 9/1998 | Parkyn, Jr. et al. |
| 5,812,714 A | 9/1998 | Hulse |
| 5,818,555 A | 10/1998 | Yokoyama et al. |
| 5,839,823 A | 11/1998 | Hou et al. |
| 5,850,498 A | 12/1998 | Shacklette et al. |
| 5,854,872 A | 12/1998 | Tai |
| 5,863,113 A | 1/1999 | Oe et al. |
| 5,872,883 A | 2/1999 | Ohba et al. |
| 5,897,201 A | 4/1999 | Simon |
| 5,914,759 A | 6/1999 | Higuchi et al. |
| 5,914,760 A | 6/1999 | Daiku |
| 5,949,933 A | 9/1999 | Steiner et al. |
| 5,961,198 A | 10/1999 | Hira et al. |
| 5,967,637 A | 10/1999 | Ishikawa et al. |
| 5,974,214 A | 10/1999 | Shacklette et al. |
| 5,997,148 A | 12/1999 | Ohkawa |
| 5,999,281 A | 12/1999 | Abbott et al. |
| 5,999,685 A | 12/1999 | Goto et al. |
| 6,002,079 A | 12/1999 | Shin et al. |
| 6,002,829 A | 12/1999 | Winston et al. |
| 6,007,209 A | 12/1999 | Pelka |
| 6,043,951 A | 3/2000 | Lee |
| 6,044,196 A | 3/2000 | Winston et al. |
| 6,079,838 A | 6/2000 | Parker et al. |
| 6,097,549 A | 8/2000 | Jenkins et al. |
| 6,134,092 A | 10/2000 | Pelka et al. |
| 6,139,163 A | 10/2000 | Satoh et al. |
| 6,139,176 A | 10/2000 | Hulse et al. |
| 6,151,089 A | 11/2000 | Yang et al. |
| 6,155,692 A | 12/2000 | Ohkawa |
| 6,155,693 A | 12/2000 | Spiegel et al. |
| 6,161,939 A | 12/2000 | Bansbach |
| 6,164,790 A | 12/2000 | Lee |
| 6,164,791 A | 12/2000 | Gwo-Juh et al. |
| 6,167,182 A | 12/2000 | Shinohara et al. |
| 6,185,357 B1 | 2/2001 | Zou et al. |
| 6,206,535 B1 | 3/2001 | Hattori et al. |
| 6,231,200 B1 | 5/2001 | Shinohara et al. |
| 6,232,592 B1 | 5/2001 | Sugiyama |
| 6,241,363 B1 | 6/2001 | Lee |
| 6,257,737 B1 | 7/2001 | Marshall et al. |
| 6,259,854 B1 | 7/2001 | Shinji et al. |
| 6,304,693 B1 | 10/2001 | Buelow, II et al. |
| 6,310,704 B1 | 10/2001 | Dogan et al. |
| 6,318,880 B1 | 11/2001 | Siminovitch et al. |
| 6,379,016 B1 | 4/2002 | Boyd et al. |
| 6,379,017 B2 | 4/2002 | Nakabayashi et al. |
| 6,400,086 B1 | 6/2002 | Huter |
| 6,421,103 B2 | 7/2002 | Yamaguchi |
| 6,443,594 B1 | 9/2002 | Marshall et al. |
| 6,461,007 B1 | 10/2002 | Akaoka |
| 6,473,554 B1 | 10/2002 | Pelka et al. |

(56) References Cited

U.S. PATENT DOCUMENTS

| | | | |
|---|---|---|---|
| 6,480,307 B1 | 11/2002 | Yang |
| 6,485,157 B2 | 11/2002 | Ohkawa |
| 6,508,563 B2 | 1/2003 | Parker et al. |
| 6,523,986 B1 | 2/2003 | Hoffmann |
| 6,536,921 B1 | 3/2003 | Simon |
| 6,541,720 B2 | 4/2003 | Gerald et al. |
| 6,554,451 B1 | 4/2003 | Keuper |
| 6,568,819 B1 | 5/2003 | Yamazaki et al. |
| 6,582,103 B1 | 6/2003 | Popovich et al. |
| 6,585,356 B1 | 7/2003 | Ohkawa |
| 6,598,998 B2 | 7/2003 | West et al. |
| 6,612,723 B2 | 9/2003 | Futhey et al. |
| 6,616,290 B2 | 9/2003 | Ohkawa |
| 6,629,764 B1 | 10/2003 | Uehara |
| 6,633,722 B1 | 10/2003 | Kohara et al. |
| 6,634,772 B2 | 10/2003 | Yaphe et al. |
| 6,637,924 B2 | 10/2003 | Pelka et al. |
| 6,647,199 B1 | 11/2003 | Pelka et al. |
| 6,652,109 B2 | 11/2003 | Nakamura |
| 6,659,628 B2 | 12/2003 | Gomez Del Campo |
| 6,671,452 B2 | 12/2003 | Winston et al. |
| 6,676,284 B1 | 1/2004 | Wynne Willson |
| 6,678,021 B2 | 1/2004 | Ohkawa |
| 6,679,621 B2 | 1/2004 | West et al. |
| 6,712,481 B2 | 3/2004 | Parker et al. |
| 6,724,529 B2 | 4/2004 | Sinkoff |
| 6,724,543 B1 | 4/2004 | Chinniah et al. |
| 6,727,965 B1 | 4/2004 | Kubota |
| 6,752,505 B2 | 6/2004 | Parker et al. |
| 6,755,546 B2 | 6/2004 | Ohkawa |
| 6,755,556 B2 | 6/2004 | Gasquet et al. |
| 6,758,582 B1 | 7/2004 | Hsiao et al. |
| 6,775,460 B2 | 8/2004 | Steiner et al. |
| 6,796,676 B2 | 9/2004 | Severtson et al. |
| 6,802,626 B2 | 10/2004 | Belfer et al. |
| 6,802,628 B2 | 10/2004 | Kuo |
| 6,840,656 B2 | 1/2005 | Kuo |
| 6,845,212 B2 | 1/2005 | Gardiner et al. |
| 6,876,408 B2 | 4/2005 | Yamaguchi |
| 6,894,740 B2 | 5/2005 | Ohkawa |
| 6,896,381 B2 | 5/2005 | Benitez et al. |
| 6,924,943 B2 | 8/2005 | Minano et al. |
| 6,971,758 B2 | 12/2005 | Inui et al. |
| 6,974,241 B2 | 12/2005 | Hara et al. |
| 6,992,335 B2 | 1/2006 | Ohkawa |
| 7,008,097 B1 | 3/2006 | Hulse |
| 7,010,212 B2 | 3/2006 | Emmons et al. |
| 7,021,805 B2 | 4/2006 | Amano et al. |
| 7,025,482 B2 | 4/2006 | Yamashita et al. |
| 7,046,318 B2 | 5/2006 | Yu et al. |
| 7,046,905 B1 | 5/2006 | Gardiner et al. |
| 7,052,157 B1 | 5/2006 | Lau |
| 7,063,430 B2 | 6/2006 | Greiner |
| 7,072,096 B2 | 7/2006 | Holman et al. |
| 7,083,313 B2 | 8/2006 | Smith |
| 7,085,460 B2 | 8/2006 | Leu et al. |
| 7,090,370 B2 | 8/2006 | Clark et al. |
| 7,090,389 B2 | 8/2006 | Parker et al. |
| 7,097,341 B2 | 8/2006 | Tsai |
| 7,106,528 B2 | 9/2006 | Ohmori et al. |
| 7,111,969 B2 | 9/2006 | Bottesch et al. |
| 7,118,253 B1 | 10/2006 | Simon |
| 7,131,764 B2 | 11/2006 | Hsu et al. |
| 7,152,985 B2 | 12/2006 | Benitez et al. |
| 7,160,010 B1 | 1/2007 | Chinniah et al. |
| 7,160,015 B2 | 1/2007 | Parker |
| 7,168,841 B2 | 1/2007 | Hsieh et al. |
| 7,175,330 B1 | 2/2007 | Chen |
| 7,178,941 B2 | 2/2007 | Roberge et al. |
| 7,179,946 B2 | 2/2007 | Scholz et al. |
| 7,182,480 B2 | 2/2007 | Kan |
| 7,192,174 B2 | 3/2007 | Myoung |
| 7,195,374 B2 | 3/2007 | Saccomanno et al. |
| 7,204,634 B2 | 4/2007 | Chen et al. |
| 7,209,628 B2 | 4/2007 | Winston et al. |
| 7,213,940 B1 | 5/2007 | Van De Ven et al. |
| 7,218,830 B2 | 5/2007 | Iimura |
| 7,222,995 B1 | 5/2007 | Bayat et al. |
| 7,223,004 B2 | 5/2007 | Chen et al. |
| 7,246,931 B2 | 7/2007 | Hsieh et al. |
| 7,258,467 B2 | 8/2007 | Saccomanno et al. |
| 7,265,800 B2 | 9/2007 | Jagt et al. |
| 7,273,299 B2 | 9/2007 | Parkyn et al. |
| 7,290,906 B2 | 11/2007 | Suzuki et al. |
| 7,292,767 B2 | 11/2007 | Cheng |
| 7,322,733 B2 | 1/2008 | Chang et al. |
| 7,364,342 B2 | 4/2008 | Parker et al. |
| 7,369,918 B2 | 5/2008 | Cosgrove |
| 7,393,124 B1 | 7/2008 | Williams |
| 7,399,108 B2 | 7/2008 | Ayabe et al. |
| 7,400,809 B2 | 7/2008 | Erben et al. |
| 7,404,660 B2 | 7/2008 | Parker |
| 7,407,303 B2 | 8/2008 | Wanninger et al. |
| 7,422,357 B1 | 9/2008 | Chang |
| 7,455,416 B2 | 11/2008 | Chen |
| 7,458,714 B2 | 12/2008 | Chang |
| 7,465,074 B2 | 12/2008 | Bluemel |
| 7,486,854 B2 | 2/2009 | Van Ostrand et al. |
| 7,488,093 B1 | 2/2009 | Huang et al. |
| 7,513,672 B2 | 4/2009 | Parker |
| 7,520,650 B2 | 4/2009 | Smith |
| 7,534,013 B1 | 5/2009 | Simon |
| 7,559,672 B1 | 7/2009 | Parkyn et al. |
| 7,566,148 B2 | 7/2009 | Noh et al. |
| 7,566,159 B2 | 7/2009 | Oon et al. |
| 7,581,854 B2 | 9/2009 | Ford |
| 7,614,759 B2 | 11/2009 | Negley |
| 7,614,764 B2 | 11/2009 | Williams et al. |
| 7,626,655 B2 | 12/2009 | Yamazaki et al. |
| 7,628,508 B2 | 12/2009 | Kita et al. |
| 7,635,193 B2 | 12/2009 | Chang |
| 7,635,205 B2 | 12/2009 | Yu et al. |
| 7,639,918 B2 | 12/2009 | Sayers et al. |
| 7,641,363 B1 | 1/2010 | Chang et al. |
| 7,648,256 B2 | 1/2010 | Shiratsuchi et al. |
| 7,654,687 B2 | 2/2010 | Tsai et al. |
| 7,654,719 B2 | 2/2010 | Chang |
| 7,663,804 B2 | 2/2010 | Chang |
| 7,674,018 B2 | 3/2010 | Holder et al. |
| 7,695,165 B2 | 4/2010 | Chang |
| 7,696,531 B2 | 4/2010 | Miyao |
| 7,703,945 B2 | 4/2010 | Leung et al. |
| 7,703,950 B2 | 4/2010 | Ewert et al. |
| 7,703,967 B2 | 4/2010 | Parker |
| 7,710,663 B2 | 5/2010 | Barnes et al. |
| 7,722,224 B1 | 5/2010 | Coleman et al. |
| 7,722,241 B2 | 5/2010 | Chang |
| 7,724,321 B2 | 5/2010 | Hsieh et al. |
| 7,730,967 B2 | 6/2010 | Ballantyne et al. |
| 7,736,019 B2 | 6/2010 | Shimada et al. |
| 7,736,045 B2 | 6/2010 | Yamashita et al. |
| 7,750,982 B2 | 7/2010 | Nelson et al. |
| 7,753,551 B2 | 7/2010 | Yaphe et al. |
| 7,758,227 B1 | 7/2010 | Coleman |
| 7,760,290 B2 | 7/2010 | Kang et al. |
| 7,762,705 B2 | 7/2010 | Sakai et al. |
| 7,766,515 B2 | 8/2010 | Condon et al. |
| 7,771,087 B2 | 8/2010 | Wilcox et al. |
| 7,775,697 B2 | 8/2010 | Hirano et al. |
| 7,776,236 B2 | 8/2010 | Shih et al. |
| 7,780,306 B2 | 8/2010 | Hoshi |
| 7,784,954 B1 | 8/2010 | Coleman |
| 7,798,695 B2 | 9/2010 | Parker |
| 7,806,581 B2 | 10/2010 | Lee |
| 7,810,949 B2 | 10/2010 | Chang |
| 7,810,960 B1 | 10/2010 | Soderman et al. |
| 7,810,968 B1 | 10/2010 | Walker et al. |
| 7,813,131 B2 | 10/2010 | Liang |
| 7,821,982 B2 | 10/2010 | Chen et al. |
| 7,826,698 B1 | 11/2010 | Meir et al. |
| 7,845,826 B2 | 12/2010 | Aylward et al. |
| 7,850,357 B2 | 12/2010 | Kim et al. |
| 7,857,487 B2 | 12/2010 | Wu et al. |
| 7,857,619 B2 | 12/2010 | Liu |

(56) References Cited

U.S. PATENT DOCUMENTS

| | | |
|---|---|---|
| 7,866,871 B2 | 1/2011 | Couzin et al. |
| 7,905,646 B2 | 3/2011 | Adachi et al. |
| 7,907,804 B2 | 3/2011 | Meir et al. |
| 7,909,496 B2 | 3/2011 | Matheson et al. |
| 7,914,192 B2 | 3/2011 | Coleman |
| 7,914,193 B2 | 3/2011 | Peifer et al. |
| 7,914,196 B2 | 3/2011 | Parker et al. |
| 7,929,816 B2 | 4/2011 | Meir et al. |
| 7,934,851 B1 | 5/2011 | Boissevain et al. |
| 7,967,477 B2 | 6/2011 | Bloemen et al. |
| 7,969,531 B1 | 6/2011 | Li et al. |
| 7,970,246 B2 | 6/2011 | Travis et al. |
| 7,976,204 B2 | 7/2011 | Li et al. |
| 7,991,257 B1 | 8/2011 | Coleman |
| 7,997,784 B2 | 8/2011 | Tsai |
| 8,002,450 B2 | 8/2011 | Van Ostrand et al. |
| 8,033,674 B1 | 10/2011 | Coleman et al. |
| 8,033,706 B1 | 10/2011 | Kelly et al. |
| 8,038,308 B2 | 10/2011 | Greiner |
| 8,047,673 B2 | 11/2011 | Santoro |
| 8,047,696 B2 | 11/2011 | Ijzerman et al. |
| 8,052,316 B2 | 11/2011 | Lee |
| 8,054,409 B2 | 11/2011 | Hsieh et al. |
| 8,057,056 B2 | 11/2011 | Zhu et al. |
| 8,061,877 B2 | 11/2011 | Chang |
| 8,064,743 B2 | 11/2011 | Meir et al. |
| 8,067,884 B2 | 11/2011 | Li |
| 8,070,345 B2 | 12/2011 | Zhang et al. |
| 8,075,157 B2 | 12/2011 | Zhang et al. |
| 8,087,807 B2 | 1/2012 | Liu et al. |
| 8,092,068 B2 | 1/2012 | Parker et al. |
| 8,096,671 B1 | 1/2012 | Cronk et al. |
| 8,096,681 B2 | 1/2012 | Fang et al. |
| 8,113,704 B2 | 2/2012 | Bae et al. |
| 8,128,272 B2 | 3/2012 | Fine et al. |
| 8,129,731 B2 | 3/2012 | Vissenberg et al. |
| 8,152,339 B2 | 4/2012 | Morgan |
| 8,152,352 B2 | 4/2012 | Richardson |
| 8,162,524 B2 | 4/2012 | Van Ostrand et al. |
| 8,172,447 B2 | 5/2012 | Meir et al. |
| 8,177,408 B1 | 5/2012 | Coleman |
| 8,182,128 B2 | 5/2012 | Meir et al. |
| 8,183,519 B2 | 5/2012 | Lin et al. |
| 8,186,847 B2 | 5/2012 | Hu et al. |
| 8,189,973 B2 | 5/2012 | Travis et al. |
| 8,192,051 B2 | 6/2012 | Dau et al. |
| 8,198,109 B2 | 6/2012 | Lerman et al. |
| 8,210,716 B2 | 7/2012 | Lerman et al. |
| 8,212,263 B2 | 7/2012 | Bierhuizen et al. |
| 8,218,920 B2 | 7/2012 | Van Ostrand et al. |
| 8,220,955 B2 | 7/2012 | Kwak et al. |
| 8,220,980 B2 | 7/2012 | Gingrich, III |
| 8,226,287 B2 | 7/2012 | Teng et al. |
| 8,231,256 B1 | 7/2012 | Coleman et al. |
| 8,231,258 B2 | 7/2012 | Kim et al. |
| 8,231,259 B2 | 7/2012 | Keller et al. |
| 8,242,518 B2 | 8/2012 | Lerman et al. |
| 8,246,187 B2 | 8/2012 | Cheong et al. |
| 8,246,197 B2 | 8/2012 | Huang |
| 8,249,408 B2 | 8/2012 | Coleman |
| 8,258,524 B2 | 9/2012 | Tan et al. |
| 8,272,756 B1 | 9/2012 | Patrick |
| 8,272,770 B2 | 9/2012 | Richardson |
| 8,277,106 B2 | 10/2012 | Van Gorkom et al. |
| 8,282,261 B2 | 10/2012 | Pance et al. |
| 8,282,853 B2 | 10/2012 | Mori et al. |
| 8,283,354 B2 | 10/2012 | Wilson et al. |
| 8,283,853 B2 | 10/2012 | Yan et al. |
| 8,287,152 B2 | 10/2012 | Gill |
| 8,292,467 B2 | 10/2012 | Vissenberg et al. |
| 8,297,786 B2 | 10/2012 | Shani et al. |
| 8,297,801 B2 | 10/2012 | Coushaine et al. |
| 8,297,818 B2 | 10/2012 | Richardson |
| 8,301,002 B2 | 10/2012 | Shani |
| 8,310,158 B2 | 11/2012 | Coplin et al. |
| 8,314,566 B2 | 11/2012 | Steele et al. |
| 8,317,363 B2 | 11/2012 | Zheng |
| 8,317,366 B2 | 11/2012 | Dalton et al. |
| 8,319,130 B2 | 11/2012 | Lee et al. |
| 8,328,403 B1 | 12/2012 | Morgan et al. |
| 8,328,406 B2 | 12/2012 | Zimmermann |
| 8,331,746 B2 | 12/2012 | Bogner et al. |
| 8,338,199 B2 | 12/2012 | Lerman et al. |
| 8,338,839 B2 | 12/2012 | Lerman et al. |
| 8,338,840 B2 | 12/2012 | Lerman et al. |
| 8,338,841 B2 | 12/2012 | Lerman et al. |
| 8,338,842 B2 | 12/2012 | Lerman et al. |
| 8,344,397 B2 | 1/2013 | Lerman et al. |
| 8,348,446 B2 | 1/2013 | Nakamura |
| 8,348,489 B2 | 1/2013 | Holman et al. |
| 8,351,744 B2 | 1/2013 | Travis et al. |
| 8,353,606 B2 | 1/2013 | Jeong |
| 8,369,678 B2 | 2/2013 | Chakmakjian et al. |
| 8,371,735 B2 | 2/2013 | Chen et al. |
| 8,376,582 B2 | 2/2013 | Catone et al. |
| 8,382,354 B2 | 2/2013 | Kim et al. |
| 8,382,387 B1 | 2/2013 | Sandoval |
| 8,388,173 B2 | 3/2013 | Sloan et al. |
| 8,388,190 B2 | 3/2013 | Li et al. |
| 8,398,259 B2 | 3/2013 | Kwak et al. |
| 8,398,262 B2 | 3/2013 | Sloan et al. |
| 8,408,737 B2 | 4/2013 | Wright et al. |
| 8,410,726 B2 | 4/2013 | Dau et al. |
| 8,412,010 B2 | 4/2013 | Ghosh et al. |
| 8,414,154 B2 | 4/2013 | Dau et al. |
| 8,419,224 B2 | 4/2013 | Wan-Chih et al. |
| 8,430,536 B1 | 4/2013 | Zhao |
| 8,430,548 B1 | 4/2013 | Kelly et al. |
| 8,432,628 B2 | 4/2013 | Shiau et al. |
| 8,434,892 B2 | 5/2013 | Zwak et al. |
| 8,434,893 B2 | 5/2013 | Boyer et al. |
| 8,434,913 B2 | 5/2013 | Vissenberg |
| 8,434,914 B2 | 5/2013 | Li et al. |
| 8,449,128 B2 | 5/2013 | Ko et al. |
| 8,449,142 B1 | 5/2013 | Martin et al. |
| 8,454,218 B2 | 6/2013 | Wang et al. |
| 8,461,602 B2 | 6/2013 | Lerman et al. |
| 8,469,559 B2 | 6/2013 | Williams |
| 8,475,010 B2 | 7/2013 | Vissenberg et al. |
| 8,482,186 B2 | 7/2013 | Wang et al. |
| 8,485,684 B2 | 7/2013 | Lou et al. |
| 8,506,112 B1 | 8/2013 | Dau et al. |
| 8,511,868 B2 | 8/2013 | Haugaard et al. |
| 8,534,896 B2 | 9/2013 | Boonekamp |
| 8,534,901 B2 | 9/2013 | Panagotacos et al. |
| 8,541,795 B2 | 9/2013 | Keller et al. |
| 8,547,022 B2 | 10/2013 | Summerford et al. |
| 8,564,004 B2 | 10/2013 | Tarsa et al. |
| 8,567,983 B2 | 10/2013 | Boyer et al. |
| 8,567,986 B2 | 10/2013 | Szprengiel et al. |
| 8,573,823 B2 | 11/2013 | Dau et al. |
| 8,585,253 B2 | 11/2013 | Duong et al. |
| 8,591,072 B2 | 11/2013 | Shani et al. |
| 8,591,090 B2 | 11/2013 | Lin |
| 8,593,070 B2 | 11/2013 | Wang et al. |
| D695,431 S | 12/2013 | Lay |
| 8,598,778 B2 | 12/2013 | Allen et al. |
| 8,602,586 B1 | 12/2013 | Dau et al. |
| 8,608,351 B2 | 12/2013 | Peifer |
| 8,616,746 B2 | 12/2013 | Shinohara |
| 8,618,735 B2 | 12/2013 | Coplin et al. |
| 8,632,214 B1 | 1/2014 | Tickner et al. |
| 8,632,217 B2 | 1/2014 | Zeng et al. |
| 8,641,219 B1 | 2/2014 | Johnson et al. |
| 8,657,479 B2 | 2/2014 | Morgan et al. |
| D702,377 S | 4/2014 | Lay |
| 8,696,173 B2 | 4/2014 | Urtiga et al. |
| 8,702,281 B2 | 4/2014 | Okada et al. |
| 8,724,052 B2 | 5/2014 | Hsieh et al. |
| 8,736,186 B2 | 5/2014 | Chobot |
| 8,740,440 B2 | 6/2014 | Mizuno et al. |
| 8,755,005 B2 | 6/2014 | Bierhuizen et al. |
| 8,770,821 B2 | 7/2014 | Ijzerman et al. |
| 8,780,299 B2 | 7/2014 | Ryu et al. |

(56) References Cited

U.S. PATENT DOCUMENTS

| | | |
|---|---|---|
| 8,829,821 B2 | 9/2014 | Chobot et al. |
| 8,833,996 B2 | 9/2014 | Dau et al. |
| 8,833,999 B2 | 9/2014 | Wang et al. |
| 8,840,276 B2 | 9/2014 | Shani et al. |
| 8,851,712 B2 | 10/2014 | Shani et al. |
| 8,864,360 B2 | 10/2014 | Parker et al. |
| 8,870,430 B2 | 10/2014 | Kamikatano et al. |
| 8,870,431 B2 | 10/2014 | Lin et al. |
| 8,882,323 B2 | 11/2014 | Solomon et al. |
| 8,905,569 B2 | 12/2014 | Thomas et al. |
| 8,912,735 B2 | 12/2014 | Chobot et al. |
| 8,915,611 B2 | 12/2014 | Zhang |
| 8,917,962 B1 | 12/2014 | Nichol et al. |
| 8,950,919 B2 | 2/2015 | Chen |
| 8,960,969 B2 | 2/2015 | Freund |
| 8,975,827 B2 | 3/2015 | Chobot et al. |
| 9,046,225 B2 | 6/2015 | Meyers et al. |
| 9,081,125 B2 | 7/2015 | Dau et al. |
| 9,081,190 B2 * | 7/2015 | Holman ............... G02B 6/0053 |
| 9,097,824 B2 | 8/2015 | Vissenberg et al. |
| 9,155,165 B2 | 10/2015 | Chobot |
| 9,155,166 B2 | 10/2015 | Chobot |
| 9,303,823 B2 | 4/2016 | Hu et al. |
| 9,433,061 B2 | 8/2016 | Chobot |
| 9,572,226 B2 | 2/2017 | Motley et al. |
| 10,310,162 B2 | 6/2019 | Lee et al. |
| 2001/0019479 A1 | 9/2001 | Nakabayashi et al. |
| 2002/0061178 A1 | 5/2002 | Winston et al. |
| 2002/0172039 A1 | 11/2002 | Inditsky |
| 2003/0034985 A1 | 2/2003 | Riddle et al. |
| 2003/0146688 A1 | 8/2003 | Kitazawa et al. |
| 2004/0008952 A1 | 1/2004 | Kragl |
| 2004/0080938 A1 | 4/2004 | Holman et al. |
| 2004/0135933 A1 | 7/2004 | Leu et al. |
| 2004/0146241 A1 | 7/2004 | Deladurantaye et al. |
| 2004/0213003 A1 | 10/2004 | Lauderdale et al. |
| 2004/0240217 A1 | 12/2004 | Rice |
| 2005/0024744 A1 | 2/2005 | Falicoff et al. |
| 2005/0111235 A1 | 5/2005 | Suzuki et al. |
| 2005/0140848 A1 | 6/2005 | Yoo et al. |
| 2005/0201103 A1 | 9/2005 | Saccomanno et al. |
| 2005/0210643 A1 | 9/2005 | Mezei et al. |
| 2005/0286251 A1 | 12/2005 | Smith |
| 2006/0002146 A1 | 1/2006 | Baba |
| 2006/0072203 A1 | 4/2006 | Lee |
| 2006/0076568 A1 | 4/2006 | Keller et al. |
| 2006/0147151 A1 | 7/2006 | Wanninger et al. |
| 2006/0187651 A1 | 8/2006 | Kim et al. |
| 2006/0262521 A1 | 11/2006 | Piepgras et al. |
| 2007/0058391 A1 | 3/2007 | Wilson et al. |
| 2007/0081780 A1 | 4/2007 | Scholl |
| 2007/0086179 A1 | 4/2007 | Chen et al. |
| 2007/0121340 A1 | 5/2007 | Hoshi |
| 2007/0139905 A1 | 6/2007 | Birman et al. |
| 2007/0139965 A1 | 6/2007 | Liao |
| 2007/0189033 A1 | 8/2007 | Watanabe et al. |
| 2007/0223247 A1 | 9/2007 | Lee et al. |
| 2007/0245607 A1 | 10/2007 | Awai et al. |
| 2007/0253058 A1 | 11/2007 | Wood |
| 2007/0274654 A1 | 11/2007 | Choudhury et al. |
| 2007/0279933 A1 | 12/2007 | Shiau et al. |
| 2008/0002399 A1 | 1/2008 | Villard et al. |
| 2008/0030650 A1 | 2/2008 | Kitagawa et al. |
| 2008/0037284 A1 | 2/2008 | Rudisill |
| 2008/0094853 A1 | 4/2008 | Kim et al. |
| 2008/0137695 A1 | 6/2008 | Takahashi et al. |
| 2008/0186273 A1 | 8/2008 | Krijn et al. |
| 2008/0192458 A1 | 8/2008 | Li |
| 2008/0199143 A1 | 8/2008 | Turner |
| 2008/0211990 A1 | 9/2008 | Sakai |
| 2008/0232135 A1 | 9/2008 | Kinder et al. |
| 2008/0266879 A1 | 10/2008 | Chang |
| 2008/0266901 A1 | 10/2008 | Chang |
| 2008/0285304 A1 | 11/2008 | Rankin, Jr. et al. |
| 2008/0285310 A1 | 11/2008 | Aylward et al. |
| 2009/0027893 A1 | 1/2009 | Chang |
| 2009/0091948 A1 | 4/2009 | Wang et al. |
| 2009/0103293 A1 | 4/2009 | Harbers et al. |
| 2009/0175050 A1 | 7/2009 | Marttila et al. |
| 2009/0196071 A1 | 8/2009 | Matheson et al. |
| 2009/0257242 A1 | 10/2009 | Wendman |
| 2009/0297090 A1 | 12/2009 | Bogner et al. |
| 2009/0309494 A1 | 12/2009 | Patterson et al. |
| 2009/0310367 A1 | 12/2009 | Kuo |
| 2009/0316414 A1 | 12/2009 | Yang et al. |
| 2010/0008088 A1 | 1/2010 | Koizumi et al. |
| 2010/0008628 A1 | 1/2010 | Shani |
| 2010/0027257 A1 | 2/2010 | Boonekamp et al. |
| 2010/0046219 A1 | 2/2010 | Pijlman et al. |
| 2010/0053959 A1 | 3/2010 | Ijzerman et al. |
| 2010/0073597 A1 | 3/2010 | Bierhuizen et al. |
| 2010/0073911 A1 | 3/2010 | Ohkawa |
| 2010/0079843 A1 | 4/2010 | Derichs et al. |
| 2010/0079980 A1 | 4/2010 | Sakai |
| 2010/0110673 A1 | 5/2010 | Bergman et al. |
| 2010/0110679 A1 | 5/2010 | Teng et al. |
| 2010/0118531 A1 | 5/2010 | Montagne |
| 2010/0128483 A1 | 5/2010 | Reo et al. |
| 2010/0157577 A1 | 6/2010 | Montgomery et al. |
| 2010/0208460 A1 | 8/2010 | Ladewig et al. |
| 2010/0220484 A1 | 9/2010 | Shani et al. |
| 2010/0220497 A1 | 9/2010 | Ngai |
| 2010/0231143 A1 | 9/2010 | May et al. |
| 2010/0238645 A1 | 9/2010 | Bailey |
| 2010/0238671 A1 | 9/2010 | Catone et al. |
| 2010/0246158 A1 | 9/2010 | Van Gorkom et al. |
| 2010/0253881 A1 | 10/2010 | Han et al. |
| 2010/0254129 A1 | 10/2010 | Le Toquin et al. |
| 2010/0301360 A1 | 12/2010 | Van De Ven et al. |
| 2010/0302135 A1 | 12/2010 | Larson et al. |
| 2010/0302218 A1 | 12/2010 | Bita et al. |
| 2010/0302616 A1 | 12/2010 | Bita et al. |
| 2010/0302783 A1 | 12/2010 | Shastry et al. |
| 2010/0302803 A1 | 12/2010 | Bita et al. |
| 2010/0315833 A1 | 12/2010 | Holman et al. |
| 2010/0320904 A1 | 12/2010 | Meir |
| 2010/0328936 A1 | 12/2010 | Pance et al. |
| 2011/0007505 A1 | 1/2011 | Wang |
| 2011/0013397 A1 | 1/2011 | Catone et al. |
| 2011/0013420 A1 | 1/2011 | Coleman et al. |
| 2011/0013421 A1 | 1/2011 | Um |
| 2011/0037388 A1 | 2/2011 | Lou et al. |
| 2011/0044022 A1 | 2/2011 | Ko et al. |
| 2011/0044582 A1 | 2/2011 | Travis et al. |
| 2011/0051457 A1 | 3/2011 | Chen |
| 2011/0058372 A1 | 3/2011 | Lerman et al. |
| 2011/0063830 A1 | 3/2011 | Narendran et al. |
| 2011/0063838 A1 | 3/2011 | Dau et al. |
| 2011/0063855 A1 | 3/2011 | Vissenberg |
| 2011/0069843 A1 | 3/2011 | Cohen et al. |
| 2011/0122616 A1 | 5/2011 | Hochstein |
| 2011/0163681 A1 | 7/2011 | Dau et al. |
| 2011/0163683 A1 | 7/2011 | Steele et al. |
| 2011/0170289 A1 | 7/2011 | Allen et al. |
| 2011/0180818 A1 | 7/2011 | Lerman et al. |
| 2011/0187273 A1 | 8/2011 | Summerford et al. |
| 2011/0193105 A1 | 8/2011 | Lerman et al. |
| 2011/0193106 A1 | 8/2011 | Lerman et al. |
| 2011/0193114 A1 | 8/2011 | Lerman et al. |
| 2011/0195532 A1 | 8/2011 | Lerman et al. |
| 2011/0198631 A1 | 8/2011 | Lerman et al. |
| 2011/0198632 A1 | 8/2011 | Lerman et al. |
| 2011/0199769 A1 | 8/2011 | Bretschneider et al. |
| 2011/0204390 A1 | 8/2011 | Lerman et al. |
| 2011/0204391 A1 | 8/2011 | Lerman et al. |
| 2011/0210861 A1 | 9/2011 | Winton et al. |
| 2011/0228527 A1 | 9/2011 | Van Gorkom et al. |
| 2011/0233568 A1 | 9/2011 | An et al. |
| 2011/0248287 A1 | 10/2011 | Yuan et al. |
| 2011/0249467 A1 | 10/2011 | Boonekamp |
| 2011/0255303 A1 | 10/2011 | Nichol et al. |
| 2011/0261570 A1 | 10/2011 | Okada et al. |
| 2011/0273079 A1 | 11/2011 | Pickard et al. |
| 2011/0273882 A1 | 11/2011 | Pickard |

(56) References Cited

U.S. PATENT DOCUMENTS

| | | |
|---|---|---|
| 2011/0280043 A1 | 11/2011 | Van Ostrand et al. |
| 2011/0299807 A1 | 12/2011 | Kim et al. |
| 2011/0305018 A1 | 12/2011 | Angelini et al. |
| 2011/0305027 A1 | 12/2011 | Ham |
| 2011/0317436 A1 | 12/2011 | Kuan |
| 2012/0008338 A1 | 1/2012 | Ono et al. |
| 2012/0014128 A1 | 1/2012 | Lin |
| 2012/0020108 A1 | 1/2012 | Chang |
| 2012/0026728 A1 | 2/2012 | Lou et al. |
| 2012/0026828 A1 | 2/2012 | Fjellstad et al. |
| 2012/0033445 A1 | 2/2012 | Desmet et al. |
| 2012/0039073 A1 | 2/2012 | Tong |
| 2012/0051041 A1 | 3/2012 | Edmond et al. |
| 2012/0057325 A1 | 3/2012 | Hikmet |
| 2012/0068615 A1 | 3/2012 | Duong et al. |
| 2012/0069575 A1 | 3/2012 | Koh et al. |
| 2012/0069579 A1 | 3/2012 | Koh et al. |
| 2012/0069595 A1 | 3/2012 | Catalano |
| 2012/0075873 A1 | 3/2012 | Cooper |
| 2012/0113676 A1 | 5/2012 | Van Dijk et al. |
| 2012/0114284 A1 | 5/2012 | Ender |
| 2012/0120651 A1 | 5/2012 | Peck |
| 2012/0140461 A1 | 6/2012 | Pickard |
| 2012/0147624 A1 | 6/2012 | Li et al. |
| 2012/0152490 A1 | 6/2012 | Wen et al. |
| 2012/0161009 A1 | 6/2012 | Kothari et al. |
| 2012/0170266 A1 | 7/2012 | Germain et al. |
| 2012/0170316 A1 | 7/2012 | Lee et al. |
| 2012/0170318 A1 | 7/2012 | Tsai et al. |
| 2012/0182767 A1 | 7/2012 | Petcavich et al. |
| 2012/0188774 A1 | 7/2012 | Okada |
| 2012/0212957 A1 | 8/2012 | Hyun et al. |
| 2012/0230019 A1 | 9/2012 | Peifer |
| 2012/0242930 A1 | 9/2012 | Ryu et al. |
| 2012/0243259 A1 | 9/2012 | Zhou et al. |
| 2012/0250296 A1 | 10/2012 | Lu et al. |
| 2012/0250319 A1 | 10/2012 | Dau et al. |
| 2012/0257383 A1 | 10/2012 | Zhang |
| 2012/0268931 A1 | 10/2012 | Lerman et al. |
| 2012/0268932 A1 | 10/2012 | Lerman et al. |
| 2012/0287619 A1 | 11/2012 | Pickard et al. |
| 2012/0287654 A1 | 11/2012 | He et al. |
| 2012/0287668 A1 | 11/2012 | Richardson et al. |
| 2012/0287677 A1 | 11/2012 | Wheatley et al. |
| 2012/0298181 A1 | 11/2012 | Cashion et al. |
| 2012/0307496 A1 | 12/2012 | Phillips, III et al. |
| 2012/0320626 A1 | 12/2012 | Quilici et al. |
| 2012/0326614 A1 | 12/2012 | Tsuji et al. |
| 2013/0003348 A1 | 1/2013 | Meir et al. |
| 2013/0003363 A1 | 1/2013 | Lu et al. |
| 2013/0003409 A1 | 1/2013 | Vissenberg et al. |
| 2013/0010464 A1 | 1/2013 | Shuja et al. |
| 2013/0028557 A1 | 1/2013 | Lee et al. |
| 2013/0033867 A1 | 2/2013 | Coplin et al. |
| 2013/0037838 A1 | 2/2013 | Speier et al. |
| 2013/0038219 A1 | 2/2013 | Dau et al. |
| 2013/0039050 A1 | 2/2013 | Dau et al. |
| 2013/0039090 A1 | 2/2013 | Dau et al. |
| 2013/0044480 A1 | 2/2013 | Sato et al. |
| 2013/0077298 A1 | 3/2013 | Steele et al. |
| 2013/0107518 A1 | 5/2013 | Boyer et al. |
| 2013/0107527 A1 | 5/2013 | Boyer et al. |
| 2013/0107528 A1 | 5/2013 | Boyer et al. |
| 2013/0128593 A1 | 5/2013 | Luo |
| 2013/0141937 A1 | 6/2013 | Katsuta et al. |
| 2013/0170210 A1 | 7/2013 | Athalye |
| 2013/0201715 A1 | 8/2013 | Dau et al. |
| 2013/0208461 A1 | 8/2013 | Warton et al. |
| 2013/0208495 A1 | 8/2013 | Dau et al. |
| 2013/0214300 A1 | 8/2013 | Lerman et al. |
| 2013/0215612 A1 | 8/2013 | Garcia |
| 2013/0223057 A1 | 8/2013 | Gassner et al. |
| 2013/0229804 A1 | 9/2013 | Holder et al. |
| 2013/0229810 A1 | 9/2013 | Pelka et al. |
| 2013/0250584 A1 | 9/2013 | Wang et al. |
| 2013/0279198 A1 | 10/2013 | Lin et al. |
| 2013/0294059 A1 | 11/2013 | Galluccio et al. |
| 2013/0294063 A1 | 11/2013 | Lou et al. |
| 2013/0300310 A1 | 11/2013 | Hu |
| 2013/0317784 A1 | 11/2013 | Huang et al. |
| 2013/0322116 A1 | 12/2013 | Pijlman et al. |
| 2013/0328073 A1 | 12/2013 | Lowes et al. |
| 2013/0336001 A1 | 12/2013 | Boonekamp |
| 2013/0343045 A1 | 12/2013 | Lodhie et al. |
| 2013/0343055 A1 | 12/2013 | Eckert et al. |
| 2013/0343079 A1 | 12/2013 | Unger et al. |
| 2014/0003041 A1 | 1/2014 | Dau et al. |
| 2014/0029257 A1 | 1/2014 | Boyer et al. |
| 2014/0036510 A1 | 2/2014 | Preston et al. |
| 2014/0043850 A1 | 2/2014 | Thompson et al. |
| 2014/0071687 A1 | 3/2014 | Tickner et al. |
| 2014/0168955 A1 | 6/2014 | Gershaw |
| 2014/0211457 A1 | 7/2014 | Tarsa et al. |
| 2014/0211462 A1 | 7/2014 | Keller et al. |
| 2014/0211476 A1 | 7/2014 | Yuan et al. |
| 2014/0211495 A1 | 7/2014 | Yuan et al. |
| 2014/0211496 A1 | 7/2014 | Durkee |
| 2014/0211497 A1 | 7/2014 | Yuan et al. |
| 2014/0211502 A1 | 7/2014 | Keller et al. |
| 2014/0211503 A1 | 7/2014 | Tarsa |
| 2014/0211504 A1 | 7/2014 | Yuan et al. |
| 2014/0211508 A1 | 7/2014 | Yuan et al. |
| 2014/0212090 A1 | 7/2014 | Wilcox et al. |
| 2014/0268762 A1 | 9/2014 | Raleigh et al. |
| 2014/0268790 A1 | 9/2014 | Chobot et al. |
| 2014/0268875 A1 | 9/2014 | Durkee |
| 2014/0268879 A1 | 9/2014 | Mizuyama et al. |
| 2014/0270672 A1 | 9/2014 | Durkee |
| 2014/0286052 A1 | 9/2014 | McCollum et al. |
| 2014/0334126 A1 | 11/2014 | Speier et al. |
| 2014/0347885 A1 | 11/2014 | Wilcox et al. |
| 2014/0355297 A1 | 12/2014 | Castillo et al. |
| 2014/0355302 A1 | 12/2014 | Wilcox et al. |
| 2015/0003059 A1 | 1/2015 | Haitz et al. |
| 2015/0008827 A1 | 1/2015 | Carrigan et al. |
| 2015/0008828 A1 | 1/2015 | Carrigan et al. |
| 2015/0008831 A1 | 1/2015 | Carrigan et al. |
| 2015/0015145 A1 | 1/2015 | Carrigan et al. |
| 2015/0048758 A1 | 2/2015 | Carrigan et al. |
| 2015/0049507 A1 | 2/2015 | Shani et al. |
| 2015/0049511 A1 | 2/2015 | Tarsa et al. |
| 2015/0055369 A1 | 2/2015 | Tarsa et al. |
| 2015/0055371 A1 | 2/2015 | Van De Ven et al. |
| 2015/0102729 A1 | 4/2015 | Creasman et al. |
| 2015/0109820 A1 | 4/2015 | Wilcox et al. |
| 2015/0160396 A1 | 6/2015 | Wilcox et al. |
| 2015/0177439 A1 | 6/2015 | Durkee et al. |
| 2015/0192742 A1 | 7/2015 | Tarsa et al. |
| 2015/0195883 A1 | 7/2015 | Harris et al. |
| 2015/0198760 A1 | 7/2015 | Wilcox et al. |
| 2015/0204491 A1 | 7/2015 | Yuan et al. |
| 2015/0260905 A1 | 9/2015 | Yuan et al. |
| 2015/0260971 A1 | 9/2015 | Paulus et al. |
| 2015/0264780 A1 | 9/2015 | Harris et al. |
| 2015/0312983 A1 | 10/2015 | Hu et al. |
| 2015/0351187 A1 | 12/2015 | McBryde et al. |
| 2016/0154171 A1 | 6/2016 | Kato et al. |
| 2017/0205552 A1 | 7/2017 | Gierens et al. |

FOREIGN PATENT DOCUMENTS

| | | |
|---|---|---|
| DE | 10203106 | 7/2003 |
| DE | 10302563 | 7/2004 |
| DE | 10302564 | 7/2004 |
| DE | 02006009325 | 9/2007 |
| DE | 102006011296 | 9/2007 |
| DE | 102006013343 | 9/2007 |
| DE | 20107425 | 7/2011 |
| JP | 10173870 | 6/1998 |
| JP | 2000147264 | 5/2000 |
| JP | 3093080 | 4/2003 |
| JP | 2004227934 | 8/2004 |
| JP | 2006131444 | 5/2006 |
| JP | 2006221922 | 8/2006 |

(56) References Cited

FOREIGN PATENT DOCUMENTS

| JP | 2007123130 | 5/2007 |
|---|---|---|
| WO | 9621122 | 7/1996 |
| WO | 9621884 | 7/1996 |
| WO | 9904531 | 1/1999 |
| WO | 0102772 | 2/2001 |
| WO | 03031869 | 4/2003 |
| WO | 2004005983 | 1/2004 |
| WO | 2008152561 | 12/2008 |
| WO | 2009012484 | 1/2009 |
| WO | 2011130648 | 10/2011 |
| WO | 2013078463 | 5/2013 |
| WO | 2013082537 | 6/2013 |
| WO | 2014120672 | 8/2014 |
| WO | 2014120968 | 8/2014 |
| WO | 2014145283 | 9/2014 |
| WO | 2015028328 | 3/2015 |

OTHER PUBLICATIONS

Non-final Office action dated Jul. 31, 2015, for U.S. Appl. No. 14/015,801, Applicant, Cree, Inc. (48 pages).
Non-final Office action dated Jun. 10, 2015, for U.S. Appl. No. 13/842,521, Applicant, Cree, Inc. (53 pages).
Non-final Office action dated Apr. 1, 2015, for U.S. Appl. No. 13/841,074, Applicant, Cree, Inc. (57 pages).
Final Office action dated Jun. 2, 2015, for U.S. Appl. No. 13/841,622, Applicant, Cree, Inc. (58 pages).
Non-final Office action dated Mar. 24, 2015, for U.S. Appl. No. 13/840,563, Applicant, Cree, Inc. (36 pages).
Final Office action dated Jun. 11, 2015, for U.S. Appl. No. 13/938,877, Applicant, Cree, Inc. (40 pages).
Non-final Office action dated Apr. 30, 2015, for U.S. Appl. No. 14/101,132, Applicant, Cree, Inc. (21 pages).
Non-final Office action dated Aug. 12, 2015, for U.S. Appl. No. 14/577,730, Applicant, Cree, Inc. (52 pages).
Non-final Office action dated May 20, 2015, for U.S. Appl. No. 14/101,051, Applicant, Cree, Inc. (17 pages).
Non-final Office action dated Feb. 27, 2015, for U.S. Appl. No. 14/292,778, Applicant, Cree, Inc. (10 pages).
Non-final Office action dated Sep. 4, 2015, for U.S. Appl. No. 14/101,132, Applicant, Cree, Inc. (48 pages).
Non-final Office action dated Aug. 31, 2015, for U.S. Appl. No. 14/292,778, Applicant, Cree, Inc. (49 pages).
Invitation to Pay Additional Fees for International Application No. PCT/US2015/032011 dated Aug. 6, 2015, Applicant, Cree, Inc. (2 pages).
Invitation to Pay Additional Fees for International Application No. PCT/US2015/020601 dated Jun. 5, 2015, Applicant, Cree, Inc. (2 pages).
Non-final Office action dated Jun. 30, 2015, for U.S. Appl. No. 14/583,415, Applicant, Cree, Inc. (216 pages).
U.S. Appl. No. 62/292,528, filed Feb. 8, 2016.
U.S. Appl. No. 15/450,578, filed Mar. 6, 2017.
Iijima et al., "Document Scanner Using Polymer Waveguides With a Microlens Array," Optical Engineering, vol. 41, Issue 11, pp. 2743-2748, Oct. 28, 2002 (4 pages).
Ji et al., "Electrically Controllable Microlens Array Fabricated by Anisotropic Phase Separation From Liquid-Crystal and Polymer Composite Materials," vol. 28, No. 13, Optics Letters, pp. 1147-1149, Jul. 1, 2003 (4 pages).
Drain, Kieran, "Transformations in Lighting: 2011 DOE Solid-State Lighting R&D Workshop, Panel 3: Novel Lighting Concepts for Large Interior Spaces," PowerPoint presentation printed Nov. 2013 (23 pages).
Web page at http://www.oluce.com/en/lamps/table/colombo-281-detail, printed Nov. 19, 2013 (2 pages).
International Search Report and Written Opinion for International Application No. PCT/US2014/013840, dated Jul. 28, 2014, Applicant, Cree, Inc. (17 pages).

International Search Report and Written Opinion for International Application No. PCT/US14/30017, dated Aug. 1, 2014, Applicant, Cree, Inc., (21 pages).
International Search Report and Written Opinion for International Application No. PCT/US2014/072848, dated Mar. 25, 2015, Applicant, Cree, Inc., (17 pages).
International Search Report and Written Opinion for International Application No. PCT/US2014/013408, dated Jul. 17, 2014, Applicant, Cree, Inc. (21 pages).
IPRP for International Application No. PCT/US2014/013400, dated Sep. 24, 2015, Applicant, Cree, Inc., (14 pages).
International Search Report and Written Opinion dated Jul. 28, 2014, for International Application No. PCT/US2014/28938, Applicant, Cree, Inc. (19 pages).
International Search Report and Written Opinion dated Jul. 24, 2014, for International Application No. PCT/US2014/28887, Applicant, Cree, Inc. (15 pages).
International Search Report and Written Opinion for International Application No. PCT/US2015/020601, dated Jul. 31, 2015, Applicant, Cree, Inc. (23 pages).
European Extended Search Report dated May 19, 2015 for EP Application No. 14192325.0, Applicant, Cree, Inc. (5 pages).
International Search Report and Written Opinion dated Mar. 25, 2015, for International Application No. PCT/US2014/072860, Applicant, Cree, Inc. (14 pages).
International Search Report and Written Opinion for International Application No. PCT/US15/32050, Applicant, Cree, Inc., dated Oct. 19, 2015 (19 pages).
International Search Report and Written Opinion dated Jan. 11, 2016, for International Application No. PCT/US2015/032040, Applicant, Cree, Inc., (16 pages).
USPTO Office Action dated Nov. 13, 2015, for U.S. Appl. No. 13/841,622, Applicant, Cree, Inc. (7 pages).
Web page at http://www.fusionoptix.com/lighting/components/array-optics.htm, printed May 9, 2013 (2 pages).
Invitation to Pay Additional Fees for International Application No. PCT/US2014/013840, issued May 8, 2014, Applicant, Cree, Inc. (2 pages).
Invitation to Pay Additional Fees for International Application No. PCT/US2014/013408, issued May 8, 2014, Applicant, Cree, Inc. (2 pages).
U.S. Appl. No. 13/657,421, filed Oct. 22, 2012 (38 pages).
Invitation to Pay Additional Fees for International Application No. PCT/US2015/032040 dated Aug. 6, 2015, Applicant, Cree, Inc. (2 pages).
U.S. Appl. No. 14/291,829, filed May 30, 2014, Inventors, Yuan et al. (65 pages).
U.S. Appl. No. 14/292,001, filed May 30, 2014, Inventors, Hu et al. (38 pages).
U.S. Appl. No. 14/292,286, filed May 30, 2014, Inventors, McBryde et al. (103 pages).
U.S. Appl. No. 61/932,058, filed Jan. 27, 2014, Inventors, Carrigan et al.
U.S. Appl. No. 14/618,884, filed Feb. 10, 2015, Inventors, Castillo et al. (56 pages).
U.S. Appl. No. 14/462,322, filed Aug. 18, 2014, Inventors, Castillo et al. (31 pages).
U.S. Appl. No. 62/088,375, filed Dec. 5, 2014, Inventors, Hussell et al. (51 pages).
U.S. Appl. No. 14/618,819, filed Feb. 10, 2015, Inventors, Bendtsen et al. (37 pages).
U.S. Appl. No. 14/801,476, filed Jul. 16, 2015, Inventors, de Sugny et al. (38 pages).
U.S. Appl. No. 14/472,078, filed Aug. 28, 2014, Inventors, Tarsa et al. (60 pages).
PRP for International Application No. PCT/US2014/013840, dated Aug. 13, 2015, Applicant, Cree, Inc. (10 pages).
IPRP for International Application No. PCT/US2014/013891, dated Aug. 13, 2015, Applicant, Cree, Inc., (8 pages).
IPRP for International Application No. PCT/US2014/013934, dated Aug. 13, 2015, Applicant, Cree, Inc., (11 pages).
IPRP for International Application No. PCT/US2014/013854, dated Aug. 13, 2015, Applicant, Cree, Inc., (9 pages).

(56) References Cited

OTHER PUBLICATIONS

IPRP for International Application No. PCT/US2014/013931, dated Aug. 13, 2015, Applicant, Cree, Inc., (15 pages).
IPRP for International Application No. PCT/US2014/013408, dated Aug. 13, 2015, Applicant, Cree, Inc., (15 pages).
U.S. Appl. No. 14/839,557, filed Aug. 28, 2015, Inventors, Wilcenski et al. (63 pages).
IPRP for International Application No. PCT/US2014/028887, dated Sep. 24, 2015, Applicant, Cree, Inc., (9 pages).
U.S. Appl. No. 15/450,578, Office Action, dated Aug. 9, 2018.
U.S. Appl. No. 14/472,064, Notice of Allowance, dated Sep. 27, 2018.
U.S. Appl. No. 14/472,064, Office Action, dated Mar. 9, 2018.
U.S. Appl. No. 14/472,064, Restriction Requirement, dated Jan. 30, 2017.
U.S. Appl. No. 14/472,064, Office Action, dated Jun. 22, 2017.
U.S. Appl. No. 14/472,064, Final Office Action, dated Oct. 16, 2017.

\* cited by examiner

FIG. 7A
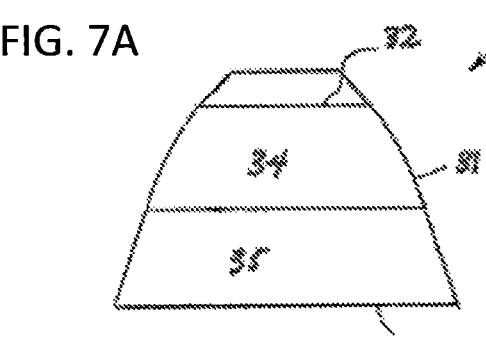
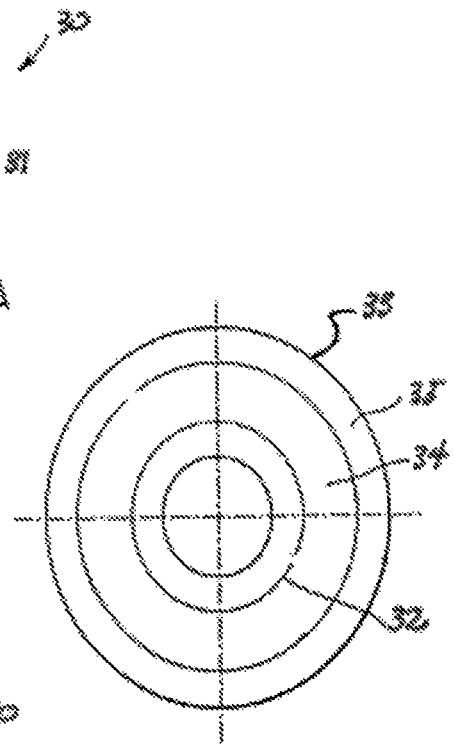
FIG. 7B
FIG. 8A
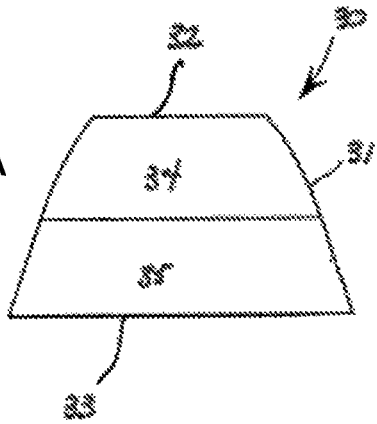
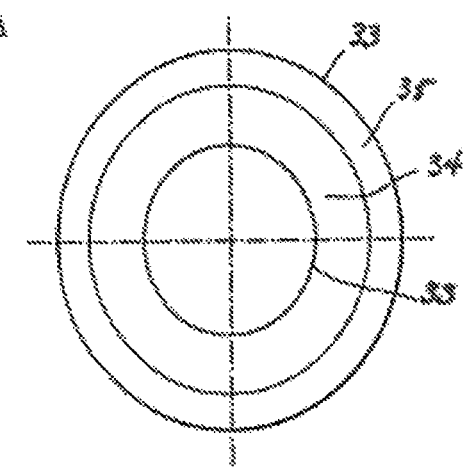
FIG. 8B

WAVEGUIDE-BASED LIGHT SOURCES WITH DYNAMIC BEAM SHAPING

RELATED APPLICATIONS

The present application is a continuation of U.S. patent application Ser. No. 15/587,442, filed May 5, 2017, which claims priority under 35 U.S.C. § 119 to U.S. Provisional Application No. 62/333,000, as filed on May 6, 2016, both of which are incorporated herein by reference in their entirety.

FIELD

The present invention relates to lighting assemblies and, in particular, to lighting assemblies employing waveguides and associated architectures for dynamic alteration of illuminance distribution patterns.

BACKGROUND

An optical waveguide mixes and directs light emitted by one or more light sources, such as one or more light emitting diodes (LEDs). A typical optical waveguide includes three main components: one or more coupling elements, one or more distribution elements, and one or more extraction elements. The coupling component(s) direct light into the distribution element(s), and condition the light to interact with the subsequent components. The one or more distribution elements control how light flows through the waveguide and is dependent on the waveguide geometry and material. The extraction element(s) determine how light is removed by controlling where and in what direction the light exits the waveguide.

In order for an extraction element to remove light from the waveguide, the light must first contact the feature comprising the element. By appropriately shaping waveguide surfaces, one can control the flow of light across the extraction feature(s). Selecting the spacing, shape and other characteristic(s) of the extraction elements affects the appearance of the waveguide and its resulting angular distribution of emitted light and efficiency. However, waveguide shape and extraction feature characteristics are generally fixed, thereby producing a static illuminance distribution pattern of the lighting device. Alteration of the illuminance distribution pattern, therefore, requires the lighting device to be adjusted via one or more means external to the device, such as by an individual manually moving, adding or removing optical element(s) of the lighting device. Such external modification can be time consuming and precludes real-time adjustments in response to changes in the lighting environment.

SUMMARY

In view of these disadvantages, luminaires are described herein employing waveguides and associated architectures for dynamic alteration of illuminance distribution patterns. In one aspect, a luminaire described herein comprises a waveguide body and light sources having differing angular positions relative to the waveguide body for altering illuminance distribution patterns of the luminaire according to one or more activation patterns of the light sources. The differing angular positions can be located at the perimeter of the waveguide body and/or at one or more internal locations of the waveguide body. Moreover, the light sources can be coupled into a side edge of the waveguide body and/or at internal coupling cavities. Depending on the embodiment, the activation pattern of the light sources can alter the illuminance distribution pattern of the luminaire azimuthally, longitudinally or various combinations thereof.

In another aspect, a luminaire described herein comprises a waveguide body and light extraction component(s) on and/or in the waveguide body, wherein the light extraction component(s) include one or more reversibly moveable surfaces for altering illuminance distribution patterns of the luminaire. As detailed further herein, forces can be applied mechanically, electrically and/or magnetically to reversibly movable surfaces of the light extraction component(s).

In a further aspect, luminaires of hybrid construction are described, which include at least one waveguide in conjunction with one or more conventional optics. In some embodiments, for example, a luminaire comprises at least one light source and a waveguide including a waveguide body and light extraction component(s) on and/or in the waveguide body. At least one optic external to the waveguide is arranged to receive at least a portion of light from the waveguide and/or a portion of light directly from the light source. The external optic can be a reflector or lens.

Importantly, elements and features of luminaries described herein can be combined in any number of ways to provide luminaires of various construction and design. In non-limiting embodiments, for example, a luminaire of hybrid construction can incorporate waveguide light extraction components including one or more reversibly moveable surfaces for altering illuminance distribution patterns of the luminaire. The hybrid luminaire may also include selectable banks of LEDs having differing angular positions relative to one or more waveguide bodies, such as stacked waveguides and/or waveguides having lateral arrangement. For example, the hybrid luminaire can employ banks of LEDs having differing angular positions along the waveguide body perimeter for steering an azimuthal component of illuminance distribution patterns of the luminaire in conjunction with the light extraction component. In additional embodiments, a luminaire having a non-hybrid construction can employ a waveguide light extraction component including one or more reversibly moveable surfaces in conjunction with radial spacing of light sources along the waveguide body perimeter for steering an azimuthal component of illuminance distribution patterns of the luminaire.

Methods of dynamic lighting are also provided herein. In some embodiments, a method of dynamic lighting comprises providing a luminaire including a waveguide body and light extraction component(s), wherein light sources of the luminaire have differing angular positions relative to the waveguide body. An illuminance distribution pattern of the luminaire is altered by selectively lighting one or more of the light sources. For example, azimuthal and/or longitudinal components of the luminaire illuminance distribution patterns can be steered by selectively lighting one or more of the light sources.

In another aspect, a method of dynamic lighting includes providing a luminaire comprising one or more light sources, a waveguide body and light extraction component(s) on and/or in the waveguide body, wherein the light extraction component(s) include one or more reversibly moveable surfaces. An illuminance distribution pattern of the luminaire is altered by application of one or more forces to the reversibly moveable surfaces.

These and other embodiments are described further in the following detailed description.

BRIEF DESCRIPTION OF THE DRAWINGS

FIGS. 2A-2F illustrate varying illuminance distribution patterns from a set of luminaires according to some embodiments.

FIGS. 7A and 7B illustrate geometry and features of a light extraction element according to some embodiments.

FIGS. 8A and 8B illustrate geometry and features of a light extraction element according to some embodiments.

DETAILED DESCRIPTION

Figure 1:
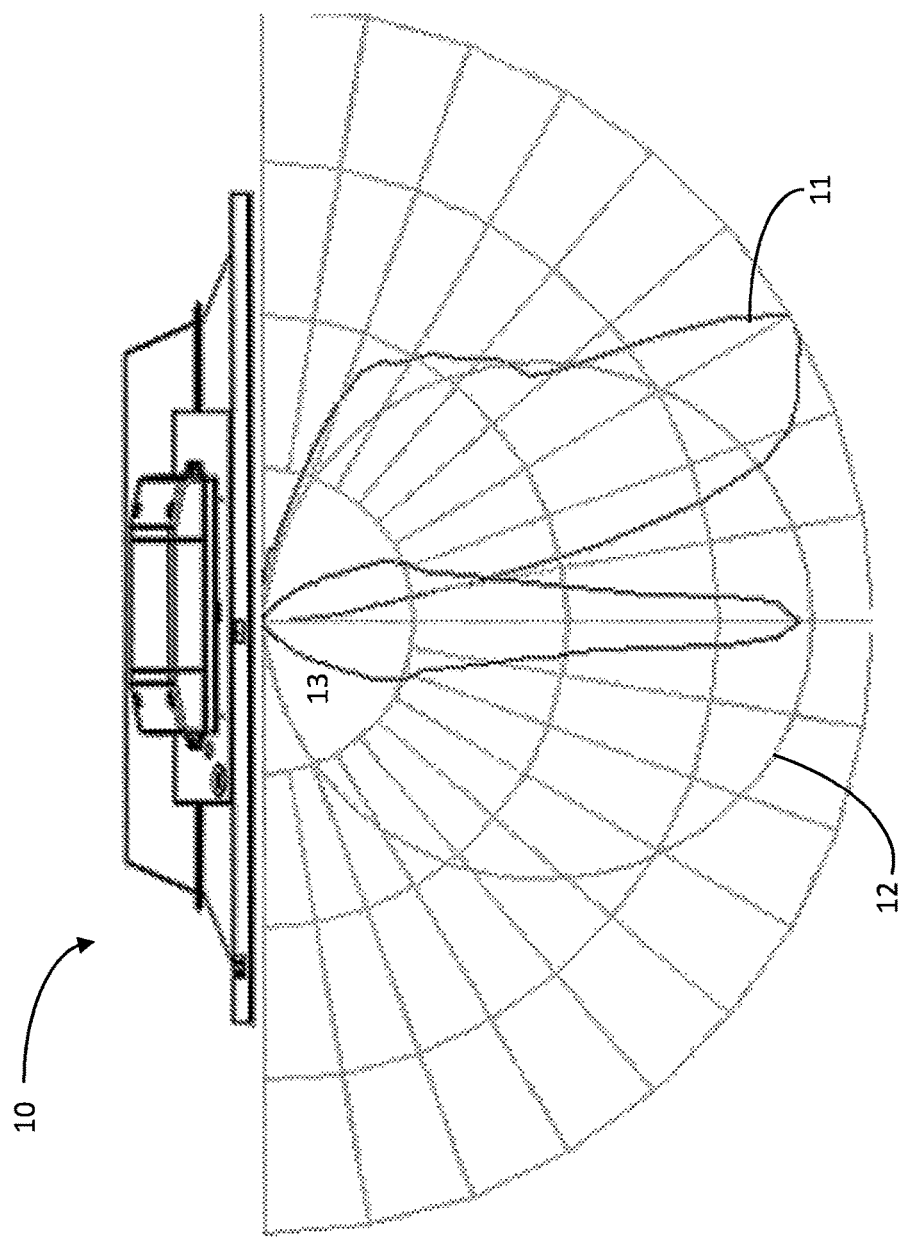
FIG. 1 illustrates a luminaire having multiple illuminance distribution patterns according to some embodiments.
Figure 2A:
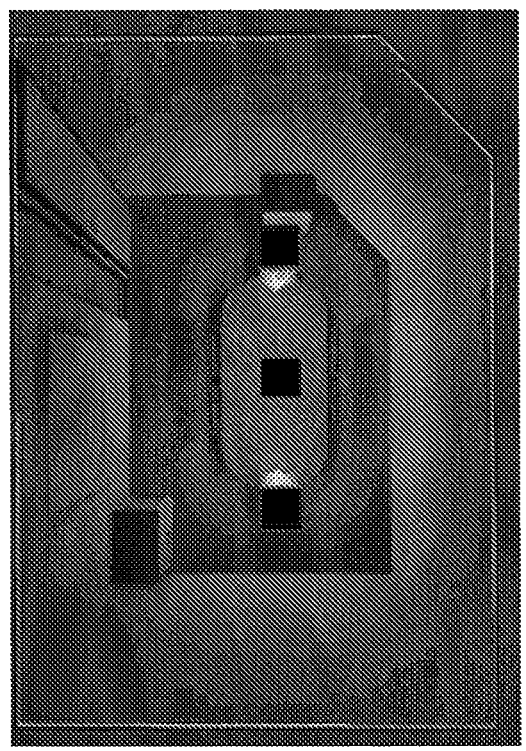
Figure 2A:
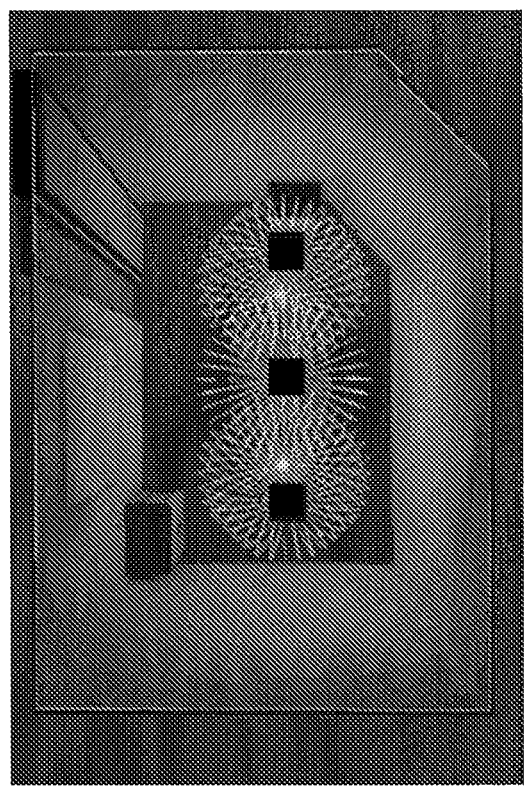
Figure 2D:
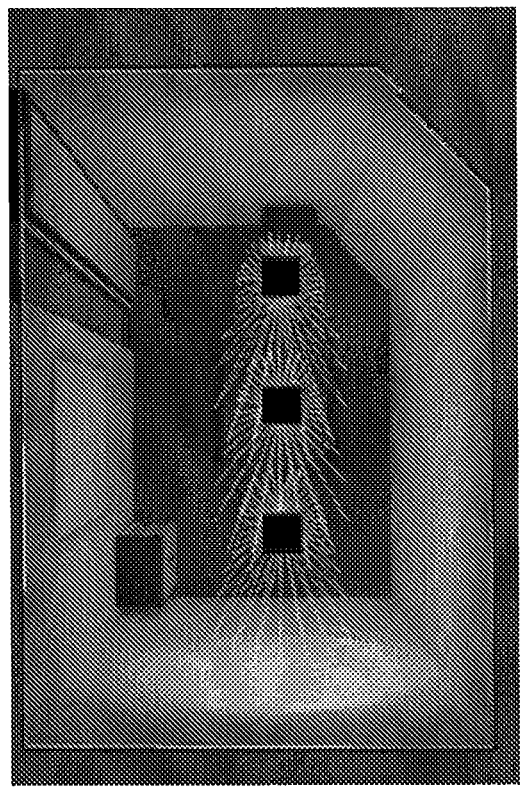
Figure 2C:
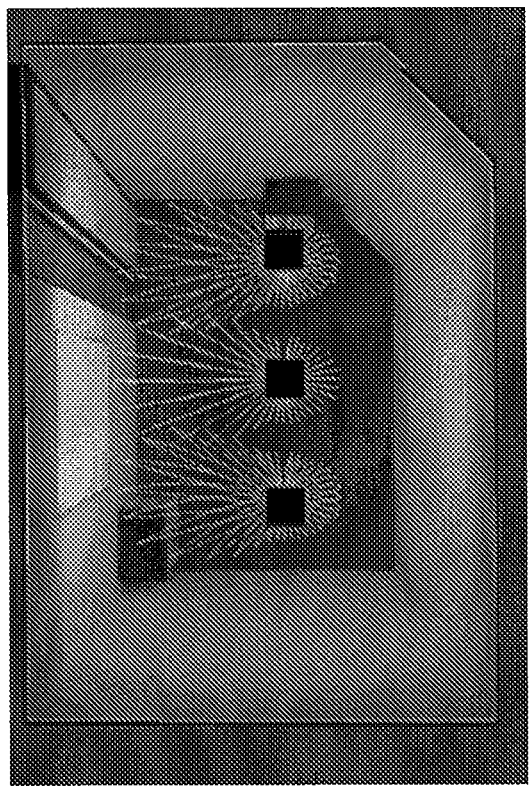
Figure 2F:
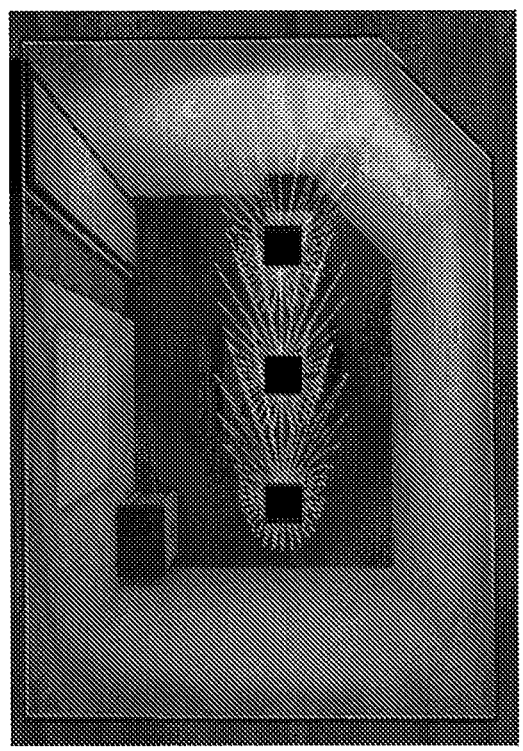
Figure 2E:
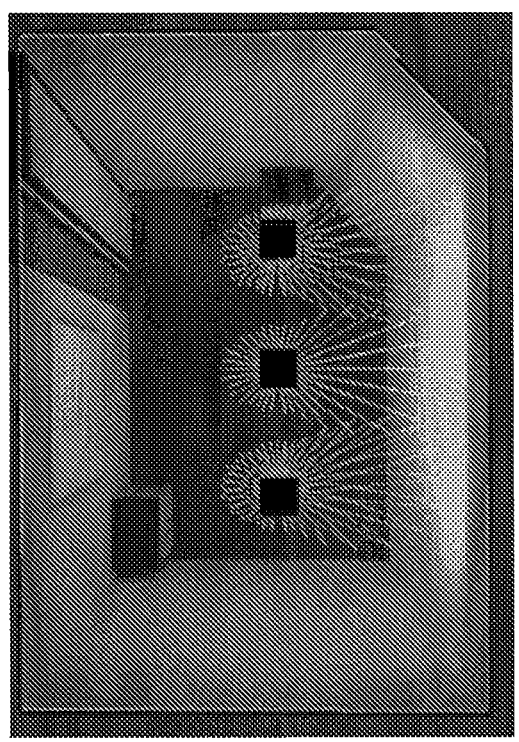

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" or "top" or "bottom" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Unless otherwise expressly stated, comparative, quantitative terms such as "less" and "greater", are intended to encompass the concept of equality. As an example, "less" can mean not only "less" in the strictest mathematical sense, but also, "less than or equal to."

The terms "LED" and "LED device" as used herein may refer to any solid-state light emitter. The terms "solid state light emitter" or "solid state emitter" may include a light emitting diode, laser diode, organic light emitting diode, and/or other semiconductor device which includes one or more semiconductor layers, which may include silicon, silicon carbide, gallium nitride and/or other semiconductor materials, a substrate which may include sapphire, silicon, silicon carbide and/or other microelectronic substrates, and one or more contact layers which may include metal and/or other conductive materials. A solid-state lighting device produces light (ultraviolet, visible, or infrared) by exciting electrons across the band gap between a conduction band and a valence band of a semiconductor active (light-emitting) layer, with the electron transition generating light at a wavelength that depends on the band gap. Thus, the color (wavelength) of the light emitted by a solid-state emitter depends on the materials of the active layers thereof. In various embodiments, solid-state light emitters may have peak wavelengths in the visible range and/or be used in combination with lumiphoric materials having peak wavelengths in the visible range. Multiple solid state light emitters and/or multiple lumiphoric materials (i.e., in combination with at least one solid state light emitter) may be used in a single device, such as to produce light perceived as white or near white in character. In certain embodiments, the aggregated output of multiple solid-state light emitters and/or lumiphoric materials may generate warm white light output having a color temperature range of from about 1200K to about 5700K.

Solid state light emitters may be used individually or in combination with one or more lumiphoric materials (e.g., phosphors, scintillators, lumiphoric inks) and/or optical elements to generate light at a peak wavelength, or of at least one desired perceived color (including combinations of colors that may be perceived as white). Inclusion of lumiphoric (also called 'luminescent') materials in lighting devices as described herein may be accomplished by direct coating on solid state light emitter, adding such materials to encapsulants, adding such materials to lenses, by embedding or dispersing such materials within lumiphor support elements, and/or coating such materials on lumiphor support elements. Other materials, such as light scattering elements (e.g., particles) and/or index matching materials, may be associated with a lumiphor, a lumiphor binding medium, or a lumiphor support element that may be spatially segregated from a solid state emitter.

Prior luminaire architectures are generally limited by static illuminance distribution patterns, thereby precluding such architectures from effectively responding to changes in the lighting environment. In view of this significant disadvantage, architectures are described herein offering multiple illuminance distribution patterns from a single luminaire. Accordingly, illuminance distribution patterns from the luminaire can be varied or altered in response to changing lighting conditions and/or requirements. FIG. 1 generally illustrates the concept of multiple illuminance distribution patterns from a single luminaire. As illustrated in FIG. 1, the luminaire 10 offers at least three different illuminance distribution patterns 11, 12, 13. Various structural features of the luminaire can be dynamically varied to provide the desired illuminance distribution pattern according to the requirements of a specific lighting environment. In some embodiments, a single structural feature is dynamically altered by the luminaire to provide the desired illuminance distribution pattern. Alternatively, multiple structural features can be varied in concert by the luminaire to provide the desired illuminance distribution pattern. As described further herein, the luminaire architectures can employ one or more light sources in conjunction with at least one waveguide to achieve multiple illuminance distribution patterns. For example, a luminaire can comprise multiple LEDs or banks of LEDs having differing angular positions relative to the waveguide, such differing positions located on the waveguide perimeter and/or waveguide interior. The LEDs can be selectively lit or switched to provide different illuminance distribution patterns in conjunction with the waveguide. Referring to FIG. 1, the luminaire 10 can comprise several banks of LEDs. The illuminance distribution pattern 11, 12 or 13 produced can be dependent on which bank of LEDs or combination of LED banks is providing light into waveguide.

Luminaires described herein are not limited to a single waveguide and can incorporate multiple waveguides in various configurations to achieve a variety of illuminance distribution patterns from a single luminaire. In some embodiments, waveguides having differing light extraction features and/or patterns are arranged in a lateral format. Alternatively, differing waveguides can have a vertical or stacked configuration. The waveguides can provide illuminance distributions independent of one another, such as one waveguide providing uplighting and another waveguide providing downlighting.

In other embodiments, multiple waveguides of a luminaire can work in concert to provide a cumulative illuminance distribution pattern. Moreover, multiple waveguides of a luminaire can share a single LED source. Alternatively, each waveguide can have a dedicated LED source. In such embodiments, the dedicated LED sources can be selectively lit to provide a variety of illuminance distribution patterns. Additionally, dedicated LED sources can have differing emission characteristics enabling waveguides of the luminaire to provide lighting of different color, color temperature and/or color rendering index.

The waveguide structure itself can also be dynamically altered to provide differing illuminance distribution patterns. In some embodiments, light extraction features of the waveguide are altered, resulting in changes to the illuminance distribution pattern. For example, the profile and/or pattern of light extraction elements can be varied to provide differing illuminance distribution patterns. As described further herein, changes to profile and/or pattern of light extraction elements can be reversible and administered in real-time. Structural alterations to light extraction elements of the waveguide can also be combined with any of the foregoing features, including LED switching, LED angular positioning and use of multiple waveguides, to alter illuminance distribution patterns of the luminaire.

In additional aspect, optics external to the waveguide can be employed to alter illuminance distribution patterns of a luminaire. One or more external optics, for example, can be positioned to redirect at least a portion of light exiting the waveguide. External optic(s) can also be positioned to receive light directly from one or more light sources of the luminaire. External optic(s) can be combined with any of the forgoing features for providing multiple illuminance distribution patterns from a single luminaire, including LED switching and spacing, use of multiple waveguides and dynamic alteration of waveguide structural elements.

The ability to dynamically alter illuminance distributions enables luminaires described herein to find application in a variety of lighting environments. For example, luminaires can find application in home, office or retail lighting wherein the illuminance distribution is specifically tailored to direct light where needed and minimize light where it is not. In such applications, illuminance distribution patterns can be based on real-time sensing of occupancy, occupant position, time of day and/or window number and positioning. FIGS. 2A-2F illustrate altering illuminance distribution patterns of luminaires to direct light to the desired areas of a conference room according to some embodiments. Luminaires described herein may also find application in architectural lighting and/or dynamic street lighting permitting real-time adjustments to illuminance distributions to match various conditions including roadway occupancy, weather and ambient lighting conditions.

The foregoing concepts and combinations thereof are implemented and further illustrated in the following sections detailing azimuthal and/or longitudinal beam alteration, waveguides with dynamic light extraction elements and luminaires of hybrid construction comprising waveguides and external or secondary optics.

I. Azimuthal/Longitudinal Beam Alteration

In one aspect, a luminaire described herein comprises a waveguide body and light sources having differing angular positions relative to the waveguide body for altering illuminance distribution patterns of the luminaire according to one or more activation patterns of the light sources. Depending on the embodiment, the activation pattern of the light sources can alter the illuminance distribution pattern of the luminaire azimuthally, longitudinally or various combinations thereof.

The differing angular positions can be located at the perimeter of the waveguide body and/or at one or more internal locations of the waveguide body. In having differing angular positions relative to the waveguide body, the light sources can be non-collinear. In some embodiments, the waveguide body has a polygonal shape, and the light sources have angular positions along two or more differing edges of the polygon. For example, the waveguide can be triangular, rectangular, hexagonal or octagonal, wherein banks of LEDs are positioned along two or more sides of the waveguide. In some embodiments, banks of LEDs are positioned on adjacent edges or sides of a polygonal waveguide. Banks of LEDs may also be along sides in facing opposition.

Figure 3A:
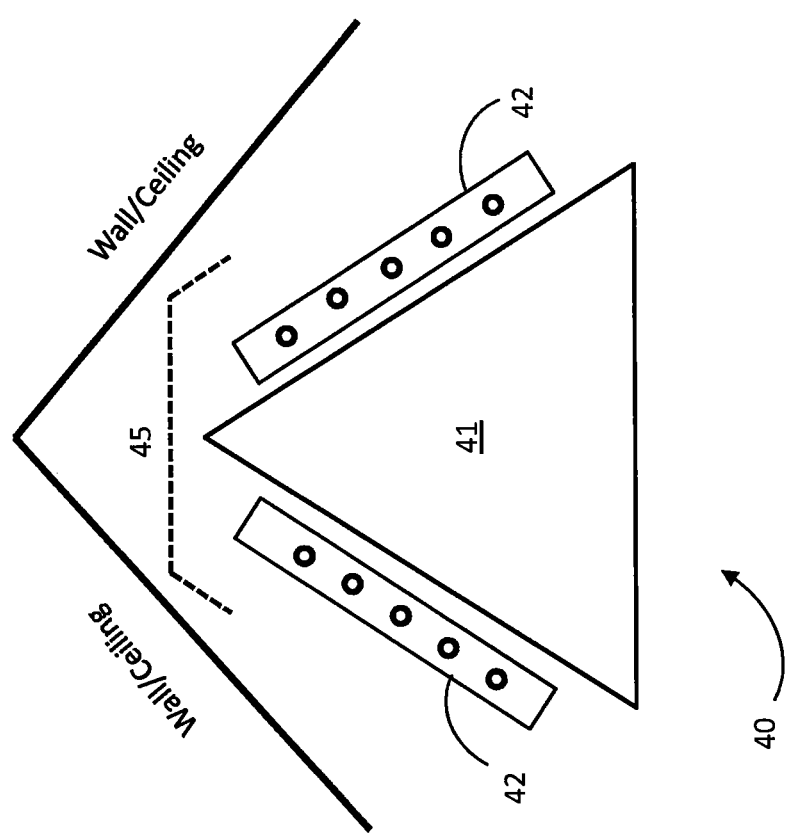
FIGS. 3A-3C illustrate luminaires comprising a waveguide body and light sources having differing angular positions relative to the waveguide body according to some embodiments.
Figure 3B:
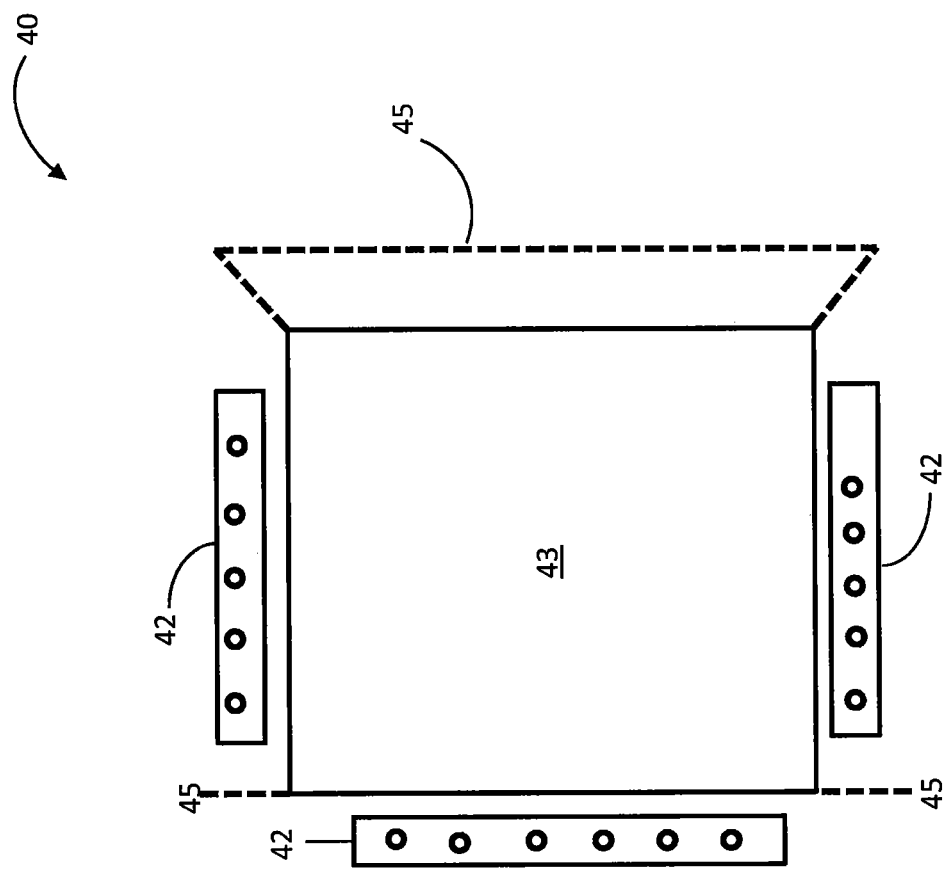
Figure 3C:
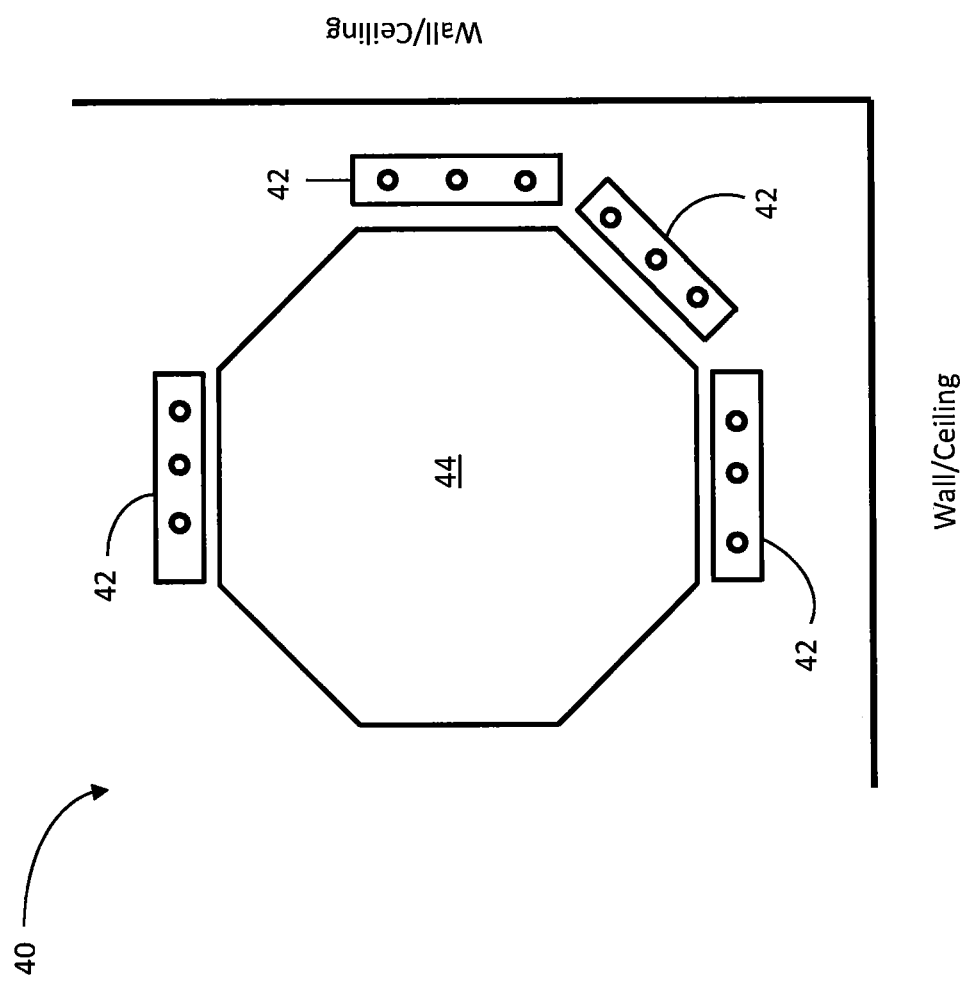

FIGS. 3A-3C illustrate luminaires comprising a polygonal waveguide body and light sources having differing angular positions relative to the waveguide body according to some embodiments. In the embodiment of FIG. 3A, LED banks 42 are arranged at differing sides of a triangular waveguide body 41. FIGS. 3B and 3C illustrate rectangular 43 and octagonal 44 waveguide bodies respectively having LED banks 42 arranged at differing sides. In some embodiments, the luminaire is oriented such that LED banks 41 are adjacent to wall(s) and/or ceiling(s) for directing the light distribution of the luminaire into a room or other environment. FIGS. 3A-3C illustrate various wall and/or ceiling configurations relative to orientation of the luminaire 40. As described herein, optics external to the waveguide can be employed to further alter illuminance distribution patterns of the luminaire in conjunction with light sources having differing angular positions. In the embodiments of FIGS. 3A-3B, optional reflectors 45 may be used to provide a hybrid luminaire construction.

Figure 4B:
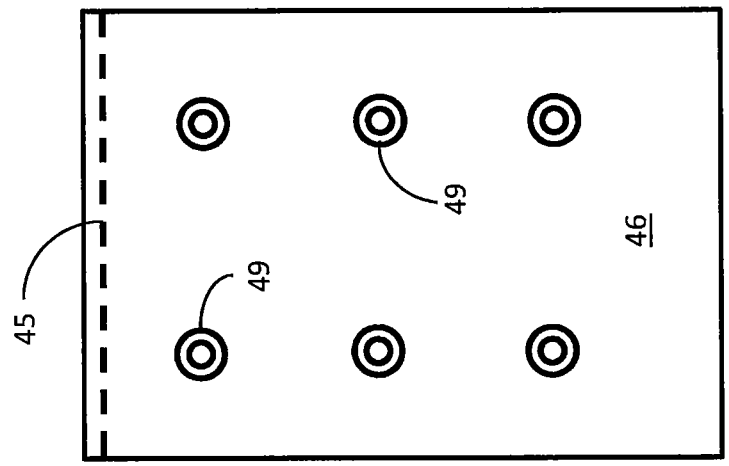
FIGS. 4A-4B illustrate luminaires comprising a waveguide body and light sources having differing angular positions relative to the waveguide body according to some embodiments.
Figure 4A:
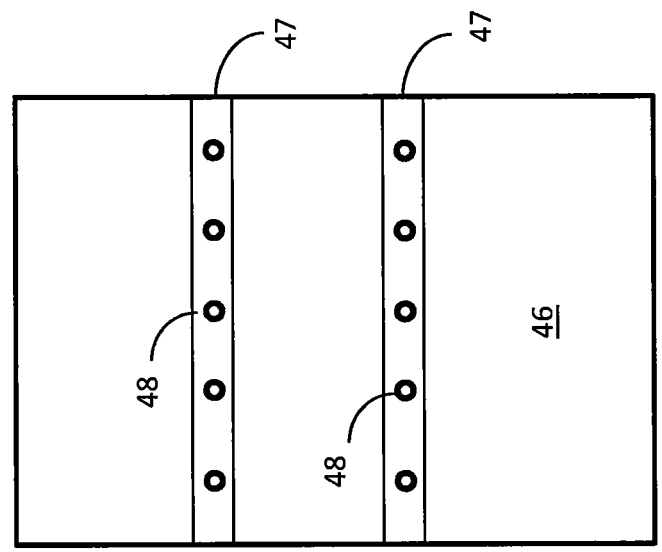

LEDs or banks of LEDs can also exhibit differing angular positions at one or more internal locations of the waveguide body. In some embodiments, LEDs or banks of LEDs are placed in troughs having differing angular positions at internal locations of the waveguide body. The troughs can include internal coupling cavities for the LEDs. FIG. 4A illustrates troughs 47 and associated LED banks 48 having different angular positions relative to the waveguide body 46 according to some embodiments. In the embodiment of FIG. 4A, the troughs 47 and LED banks 48 are parallel to two sides of the waveguide body 46 and normal to the remaining two sides. Other angular arrangements of the troughs relative to the waveguide body are contemplated. Moreover, internal coupling cavities can have differing positions at internal locations of the waveguide body as illustrated in FIG. 4B. The internal coupling cavities 49 can have dimensions for a single LED or banks of LEDs. The embodiment of FIG. 4B also includes an optional optic 45 external to the waveguide body 46 for further altering illuminance distribution patterns. Internal positioning of LEDs in conjunction with perimeter positioning of LEDs is also contemplated for altering illuminance distribution patterns of luminaires described herein.

In some embodiments, one or more banks of LEDs are shared between edges of differing waveguides. Waveguides, for example, are arranged in a lateral format, wherein bank(s) of LEDs can be shared between adjacent edges of the waveguides. The laterally arranged waveguides may further comprise banks of LEDs that are not shared. These unshared banks can be arranged at perimeter locations and/or internal locations of the waveguide body. For embodiments described herein, an LED bank can include a single LED or multiple LEDs.

Figure 5:
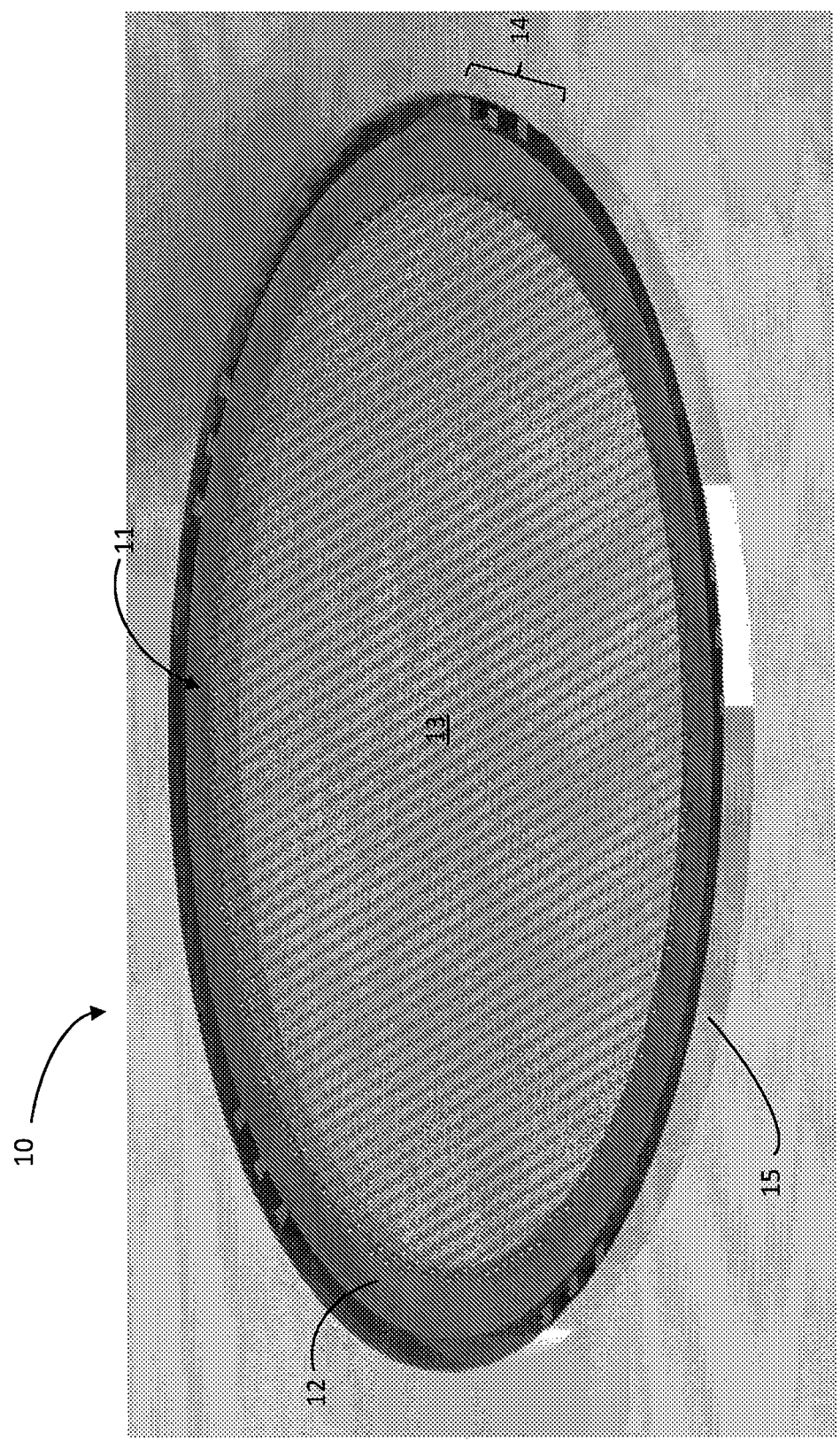
FIG. 5 illustrates a luminaire comprising a waveguide body and light sources having differing radial angular positions relative to the waveguide body according to some embodiments.

The waveguide can also exhibit curved surfaces and can have a circular or elliptical shape, wherein banks of LEDs have differing radial angular positions along the curvature. In some embodiments, radial positioning of the LED banks can be symmetrical or asymmetrical. Further, LED banks can have differing radial angular positioning along a portion of a curvature or over the entire curvature. Referring to the embodiment of FIG. 5, a luminaire 10, in one aspect, comprises a waveguide 11 including a circular waveguide body 12 and a light extraction component 13 on a surface of the waveguide body 12. Light sources 14 have differing radial angular positioning along the waveguide body perimeter for steering an azimuthal component of illuminance distribution patterns of the luminaire in conjunction with the light extraction component 13. The waveguide 11 and light sources 14 are positioned within a frame 15, which can be reflective Turning now to specific components, the waveguide body 12 can be formed of any suitable waveguide material including acrylic, silicone, polycarbonate, glass and/or other suitable optically transmissive materials operable to support total internal reflection (TIR). Moreover, the waveguide body 12 can have any desired thickness. In some embodiments, for example, the waveguide body 12 has thickness of 1 mm to 10 cm. Waveguide body thickness can be selected according to several considerations including, but not limited to, waveguide size and associated mechanical requirements, body material and/or desired geometry. The waveguide body can have any geometry consistent with steering an azimuthal component of illuminance distribution patterns of the luminaire in conjunction with spacing of the light sources along the waveguide perimeter. In the embodiment of FIG. 5, the waveguide body 12 has a circular geometry. However, in other embodiments, the waveguide body can exhibit an elliptical or polygonal geometry including, but not limited to, square, rectangular, pentagonal or hexagonal.

Figure 6A:
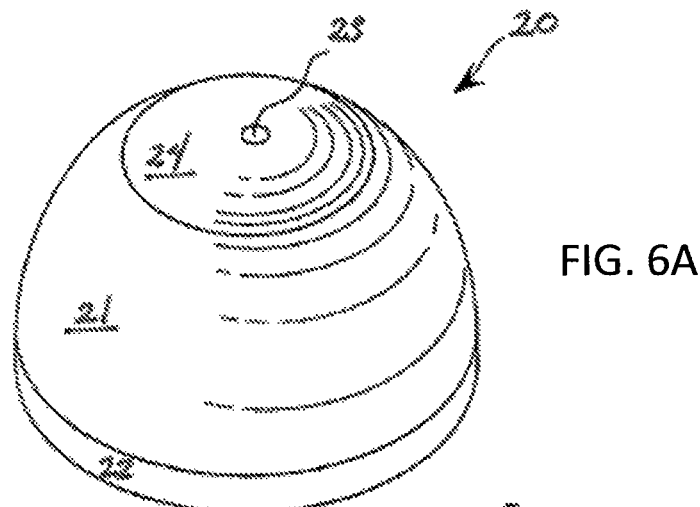
FIGS. 6A-6C illustrate geometry and features of a light extraction element according to some embodiments.
Figure 6B:
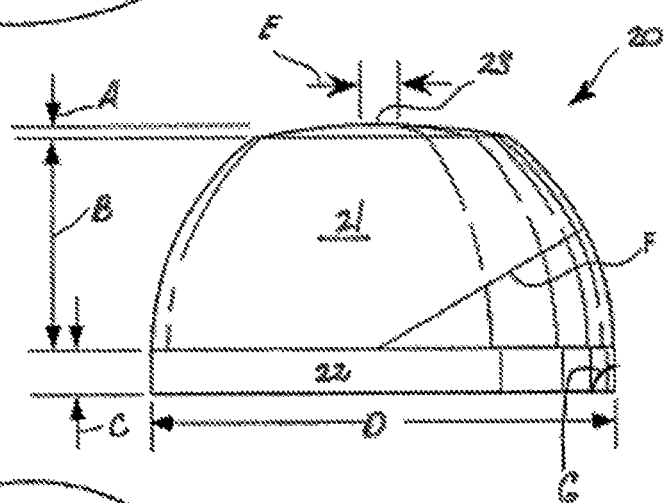
Figure 6C:
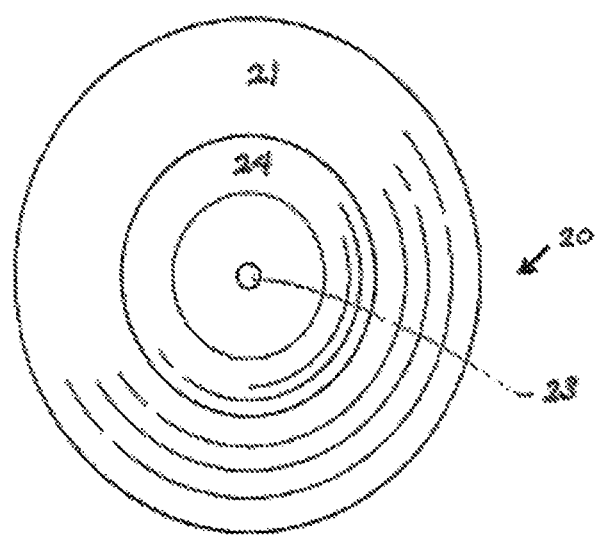

The waveguide 11 includes a light extraction component 13 on or along one or more surfaces of the waveguide body 12. In other embodiments, the light extraction component can be within the waveguide body. In some embodiments, the light extraction component resides on one or both faces of the waveguide body. The light extraction component can comprise a single light extraction element or a plurality of individual light extraction elements. The size, shape and/or density of individual light extraction elements can be uniform or vary across one or more surfaces of the waveguide body in a regular or irregular fashion to produce desired azimuthal steering in conjunction with spacing of the light sources. Light extraction elements can comprise indents, depressions, facets or holes extending into the waveguide, or bumps, facets or steps rising above the waveguide surface, or a combination of both bumps and depressions. As described further herein, light extraction elements can be part of the waveguide body or coupled to surfaces of the waveguide body. In some embodiments, individual light extraction elements have a symmetrical shape or geometry. For example, individual light extraction elements can have a hemispherical profile or polygonal profile. Another geometry which is particularly useful for a range of lighting applications includes a roughly "bullet shaped" profile as illustrated in FIGS. 6A-6C, consisting of a truncated curved surface 21 such as a truncated hemisphere with an adjacent cylindrical or conical base 22. This particular geometry provides a high degree of directionality as well as a range of possible illuminance distributions that may be realized by changing the height at which the curved surface is truncated. The height B of the hemispherical portion 21 affects the distribution of the light illumination of the waveguide 11 while the height C of the base 22 affects the percentage of light emitted downwardly relative to upward emitted light.

With reference to FIG. 6B, the light extraction element 20, in one embodiment, can have dimensions listed in Table I.

TABLE I

| | Light Extraction Element Dimensions |
|---|---|
| A | 0.025 mm |
| B | 0.415 mm |
| C | 0.085 mm |
| D | 1.0 mm |
| E | 0.050 mm |
| F | 0.510 mm radius of curvature |
| G | 89 degrees |

Additional embodiments of light extraction elements 30 are illustrated in FIGS. 7A, 7B, 8A, and 8B. Each extraction feature 30 includes a body 31 having a curved shape that extends between an aperture 32 adjacent a surface of the waveguide body 12 and a base 33 opposite the aperture 32. The aperture 32 and the base 33 may be parallel or disposed at an angle relative to one another, as may be desired for a specialized asymmetric distribution. The body 31 may include planar surfaces, curved surfaces, planar surfaces approximating one or more curved surfaces, or a combination thereof. The cross sectional outer profile of the body 31 may be symmetric in nature (e.g., as in the case of a hemisphere) or asymmetric (e.g., as in the case of an ellipse or other combination of shapes when viewed from above or below). The body 31 may include a first portion 34 adjacent the aperture 32 and a second portion 35 adjacent the base 33. In some embodiments, the first portion 34 may be designed to redirect incident light downward through total internal reflection (TIR). In some embodiments, shape of the extraction feature 30 may be determined by iteratively plotting the points defining an outer surface of the shape using a differential or quasi-differential equation.

Figure 9:
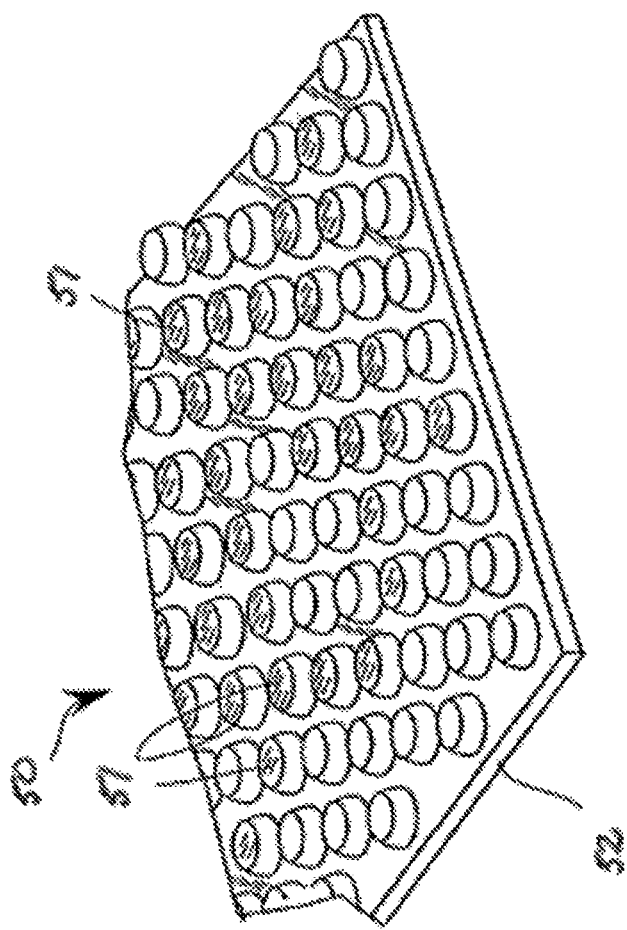
FIG. 9 is a fragmentary perspective view of a light extraction component of a waveguide comprising an array of light extraction elements on a substrate or film according to some embodiments.
Figure 10:
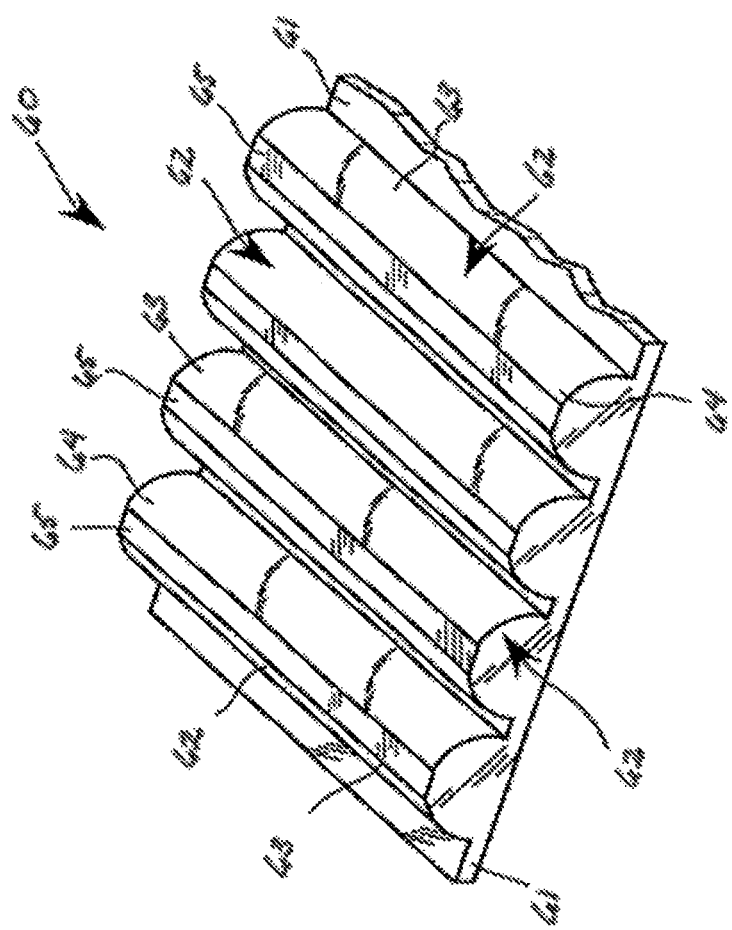
FIG. 10 is a fragmentary perspective view a light extraction component of a waveguide comprising parallel protrusions of light extraction elements according to some embodiments.

With reference to FIG. 9, the plurality of light extraction elements 51 of the light extraction component 50 can be arranged in an array, wherein the light extraction elements exhibit regular or irregular spacing. In the embodiment of FIG. 9, the light extraction elements 51 are positioned in a hexagonal array and are disposed on a substrate 52, which may be a planar member, such as a film, a plate, a block or material, or the like. Referring to FIG. 10, another example embodiment of an extraction film 60 includes a base 61 and undercut light extraction elements 62 disposed on the base 61. In this embodiment, the light extraction elements 62 form a series of elongate parallel protrusions 63 extending from the base 61. The elongate parallel protrusions 63 of the light extraction elements 62 seen in the embodiment of FIG. 10 may have a hemispherical cross section shape. A top portion 64 of the light extraction elements 62 may have a generally flattened surface 65 to provide a truncated hemispherical shape of the light extraction elements 62 extending from the base 61.

Figure 11:
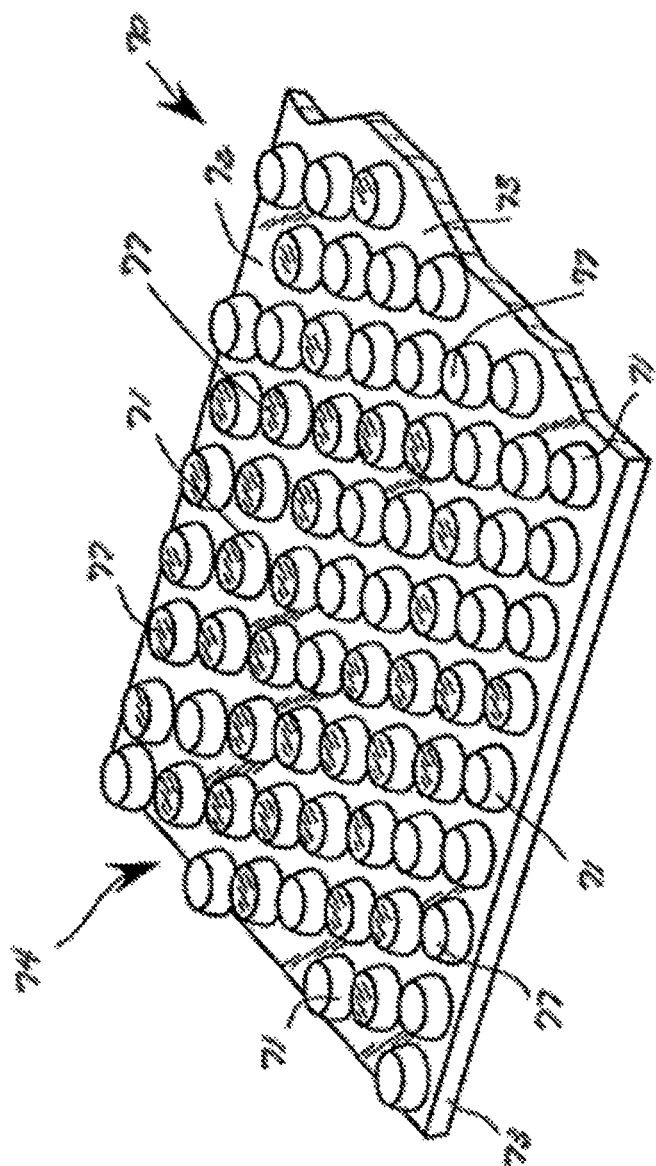
FIG. 11 is a fragmentary perspective view of a light extraction component of a waveguide comprising an array of light extraction elements on a substrate or film according to some embodiments.
Figure 12:
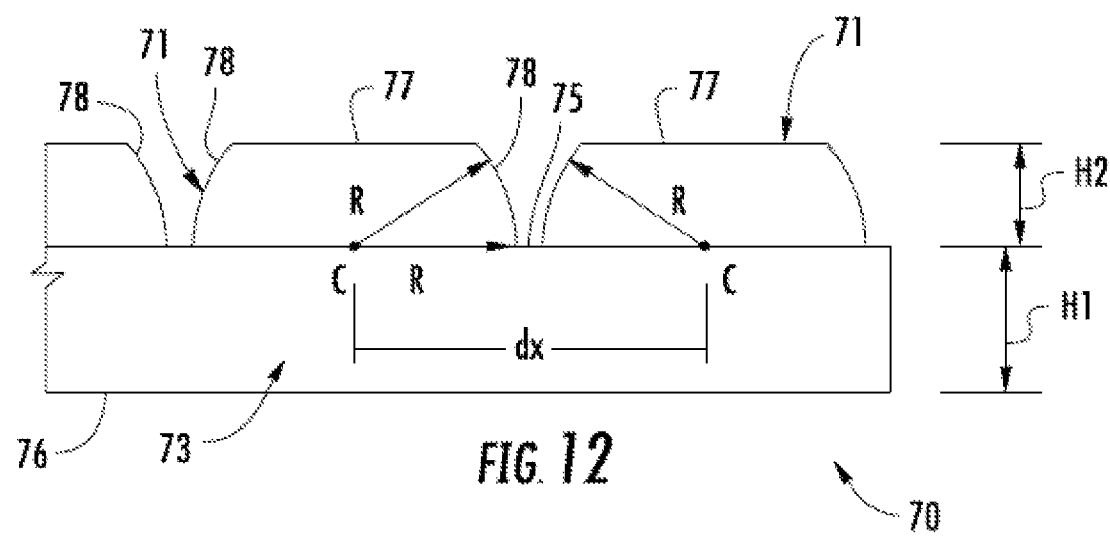
FIG. 12 is a fragmentary elevational view of an extraction film comprising a substrate and light extraction elements according to some embodiments.

FIGS. 11 and 12 illustrate an example embodiment of an extraction film 70 in which light extraction elements 71 are disposed in a regular pattern atop a surface 72 of the base 73. In this illustrated example, the extraction film 70 comprises an array 74 of regularly-spaced light extraction elements 71, although it should be noted that the light extraction elements may be irregularly spaced or some may be regularly spaced and others irregularly spaced, etc. Further, the geometry and size of the light extraction elements 71 may vary across the film 70 in either a regular or irregular fashion. In this example, the optically transmissive film 70 may be formed with the light extraction elements 71 disposed in a hexagonal array 74 on the top surface 72 of the base 73. The undercut light extraction elements 71 are of substantially the same size and have substantially the same shape within the same extraction film member 70 in this embodiment. The undercut light extraction elements 71 arranged in the hexagonal array 74, in this example, have a truncated hemispherical shape. The light extraction elements 71 may have other shape(s) necessary to produce a desired light distribution. The light extraction elements 71 may be formed using one of a variety of techniques typically applied to the formation of micro-optical films, including gray-scale lithography, micro-replication, injection/compression molding, reactive ion etching, chemical embossing during production of the optically transmissive film 70.

As seen in the embodiment of FIGS. 11 and 12, the base 73 has a constant height (H1) or thickness. In alternative embodiments, however, the thickness (H1) of the base 73 may vary at different points along the base. Further, it may be desirable to fabricate varying degrees of roughness, or specific optical features, such as a second set or array of geometrical light extraction elements on the back surface 76 of the film 70 (FIG. 12) in order to further provide control over the azimuthal steering and illuminance distributions. Still further, the thickness (H1) may be essentially zero (e.g., in cases where the light extraction elements 71 are fabricated directly on the waveguide surface. According to one embodiment, the thickness (H1) of the base 32 is about 1 μm to about 5 mm or more, and more preferably is between 250 μm and about 3 mm and most preferably is equal to about 500 μm. Further, as seen in the illustrated embodiment of FIGS. 7 and 8, each of the truncated light extraction elements 71 of the extraction film 70 may have a height (H2), FIG. 12, extending from the base 73 that is substantially the same for each light extraction element. In alternative arrangements, the height (H2) of the individual light extraction elements 71 may selectively vary within the same extraction film 70. In some embodiments, the extraction film 70 may be laminated or otherwise affixed to a surface of the waveguide body 12 such that the height (H2), FIG. 12, of the undercut light extraction elements 71 may be selectively varied to produce a wide range of illuminance distributions according to user preference.

The light extraction elements 71 extend from the top surface 72 of the base 73 to a generally flat surface 77 such that the curved shape of the light extraction member 71 is truncated by the flat surface. In this example, the truncated hemispherical light extraction elements 71 have a uniform rounded side surface 78, FIG. 12, which extends from the top surface 72 of the base 73 to the generally flat surface 77 of the light extraction element 71. As such, with the light extraction elements 71 having a uniform rounded side surface 78, each light extraction element 71 has a cross section dimension that is largest proximal the base 73 and the cross sectional dimension becomes smaller distal from the base as the rounded side surface 78 extends from the base towards the flat portion 77. The hemispherical light extraction elements 71 may have a radius (R) at a preselected length that is truncated by the flat surface 77 to a preselected height (H2). In one example, the hemispherical shaped light extraction elements 71 may have a 600 μm radius that is truncated to a height that may range, for example, between 100-590 μm. Of course, other radial lengths and truncated heights may selectively be employed. Still further, the minimum distances between adjacent light extraction elements 71 may selectively depend on the radius (R) of the light extraction element and the limitations of the film fabrication method employed, with an example minimum distance being twice the radius (2×(R)) or greater. In other examples, values less than twice the radius (2×(R)) may be used where overlapping of the extraction elements is desired for optical reasons (e.g., to improve extraction efficiency).

In the embodiment of FIG. 12, the distances (dx) between the center points (C) of adjacent extraction elements 71 may be consistent throughout the array. The center-to-center spacing (dx) of the protruding light extraction elements 71 may selectively have a value of about twice the radius (2×(R)) in regions where a high level of extraction (and hence a luminance approaching the maximum possible light output for that region) is desired with the bases of the extraction elements just in contact. In regions where reduced luminance are desired, values greater than twice the radius (2×R)) can be used.

In some embodiments, the extraction elements 71 may be disposed on the waveguide body without a base 73 or substrate. For example, the extraction elements 71 may be fabricated directly on surfaces of the waveguide body 12 by means of an intermediate patterning layer as described in U.S. Pat. No. 8,564,004, issued Oct. 22, 2013, entitled "Complex Primary Optics with Intermediate Elements" by Tarsa et al. (Cree docket No. P1445), incorporated by reference herein. Using this method of manufacture, the extraction elements 71 are optically joined to the waveguide body 12 without the need for the base 73. The patterning layer may be used with any method such as molding, injection molding, compression molding, dispensing, stencil printing, three-dimensional printing, photolithography, deposition, or the like. Specifically, the patterning layer is formed on surface(s) of the waveguide body 12 and includes holes or openings where the waveguide body 12 is exposed. The openings of the patterning layer correspond to locations where the extraction elements 71 are to be formed on the waveguide body 12. In some embodiments, a mold is then placed over the patterning layer and surface(s) of the waveguide body 12. The mold includes voids that are aligned with the openings of the patterning layer to define cavities. The cavities are filled with the material of the extraction elements. In other embodiments, the material of the extraction elements is applied to the openings of the patterning layer prior to placement of the mold on the patterning layer. In either case, the material of the extraction feature is then at least partially cured and the mold is removed. The material of the patterning layer may comprise polyvinyl alcohol, a poly(methyl methacrylate) (PMMA) one or more photoresist materials, or other suitable materials. The patterning layer may be removed by a water rinse, heat, vaporization, machining, developers and solvents, chemical etching/solvent, plasma etching, or any method that does not interfere with the material of the waveguide body 12 and/or extraction elements 71. Alternatively, the waveguide body 12, the extraction elements 71, and/or the base 73 may be bonded to one another through one or more supplemental layers such as an adhesive layer or pressure-sensitive adhesive film.

Figure 13:
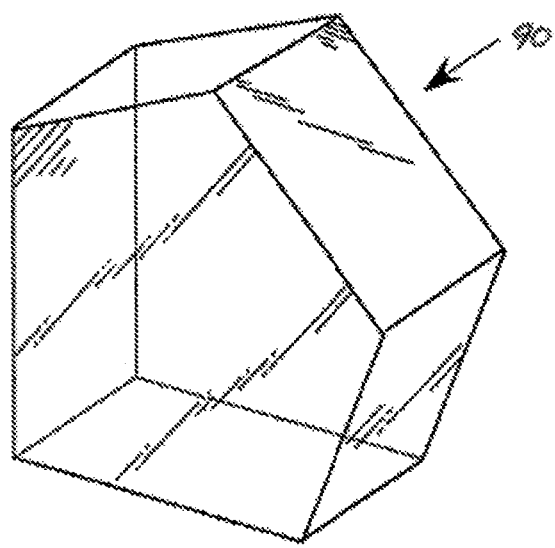
FIGS. 13-15 are perspective views of prismatic shaped light extraction elements according to some embodiments.
Figure 14:
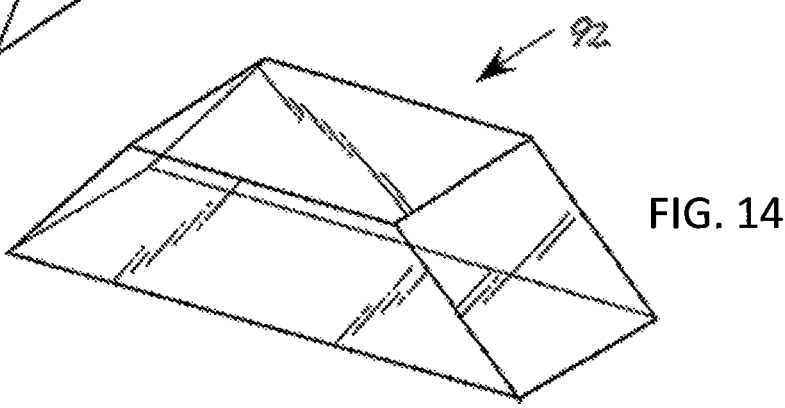
Figure 15:
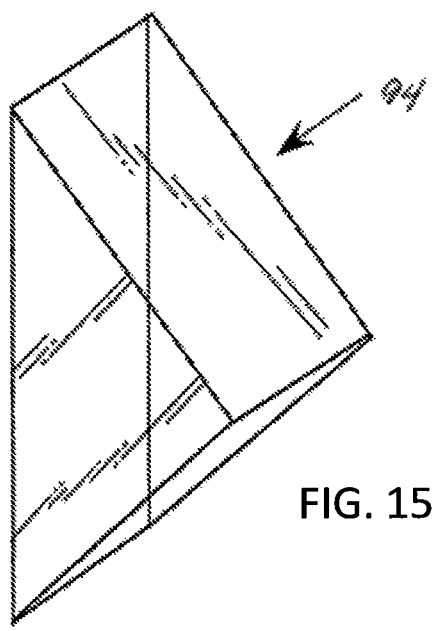

FIGS. 13-15 illustrate alternative shaped light extraction elements. The light extraction elements in FIGS. 13-15 have prismatic shapes providing for alternative undercut geometries for light extraction. In particular, a penta prism shape 90 is shown in FIG. 13, a dove prism shape 92 is shown in FIG. 14 and a porro prism shape 94 is shown in FIG. 15. The prismatic shaped light extraction elements may be formed on the top surface 75 of the base 73 in alternative embodiments of the extraction film. The prismatic shaped light extraction elements may also be included with the truncated hemispherical light extraction elements 71 on the top surface 75 of the base of the extraction film 70. For example a hexagonal array 74, FIGS. 11 and 12, of light extraction elements disposed on the base 73 of the extraction member 37 may have both truncated hemispherical and prismatic shaped light extraction elements arranged in the array. Various arrangements and combinations of truncated curved and prismatic shaped light extraction elements may be selectively employed.

Light extraction elements may be of the same material as the base or substrate and/or the waveguide body, or the materials of the light extraction elements, the base, and/or the waveguide body may be different. In any event, the material(s) of the light extraction elements, the base and/or the waveguide body, preferably comprise optical grade materials that exhibit TIR characteristics including, but not limited to, one or more of acrylic, air, polycarbonate, molded silicone, glass, and/or cyclic olefin copolymers, and combinations thereof, possibly in a layered arrangement, to achieve a desired effect and/or appearance.

Referring again to FIG. 5, the light sources 14 have differing radial angular positions along the waveguide body perimeter for steering an azimuthal component of illuminance distribution patterns of the luminaire in conjunction with the light extraction component 13. Any number of light sources can be spaced along the waveguide body perimeter. Number of light sources can be chosen according to several considerations including, but not limited to, geometry of the waveguide body, geometry of the array of light extraction elements and/or degrees of freedom for azimuthal steering.

Any light sources not inconsistent with the objectives of the present invention can be employed. Fluorescent and/or LED light sources, for example, can be used in the luminaire construction. LED light sources may comprise packaged LED chip(s) or unpackaged LED chip(s). LED elements or modules can use LEDs of the same or different types and/or configurations. The LEDs can comprise single or multiple phosphor-converted white and/or color LEDs, and/or bare LED chip(s) mounted separately or together on a single substrate or package that comprises, for example, at least one phosphor-coated LED chip either alone or in combination with at least one color LED chip, such as a green LED, a yellow LED, a red LED, etc. The LED module can comprise phosphor-converted white or color LED chips and/or bare LED chips of the same or different colors mounted directly on a printed circuit board (e.g., chip on board) and/or packaged phosphor-converted white or color LEDs mounted on the printed circuit board, such as a metal core printed circuit board or FR4 board. In some embodiments, the LEDs can be mounted directly to a heat sink or another type of board or substrate. Depending on the embodiment, the luminaire can employ LED arrangements or lighting arrangements using remote phosphor technology as would be understood by one of ordinary skill in the art, and examples of remote phosphor technology are described in U.S. Pat. No. 7,614,759, assigned to the assignee of the present invention and hereby incorporated by reference.

In those cases where a soft white illumination with improved color rendering is to be produced, each LED element or module or a plurality of such elements or modules may include one or more blue shifted yellow LEDs and one or more red or red/orange LEDs as described in U.S. Pat. No. 7,213,940, assigned to the assignee of the present invention and hereby incorporated by reference. The LEDs may be disposed in different configurations and/or layouts as desired. Different color temperatures and appearances could be produced using other LED combinations of single and/or multiple LED chips packaged into discrete packages and/or directly mounted to a printed circuit board as a chip-on board arrangement. In one embodiment, the light sources can comprise any LED, for example, an XP-Q LED incorporating TrueWhite® LED technology or as disclosed in U.S. patent application Ser. No. 13/649,067, filed Oct. 10, 2012, entitled "LED Package with Multiple Element Light Source and Encapsulant Having Planar Surfaces" by Lowes et al., (Cree Docket No. P1912US1-7), the disclosure of which is hereby incorporated by reference herein, as developed and manufactured by Cree, Inc., the assignee of the present application. In another embodiment, the light sources can comprise XQ-E LEDs developed by Cree, Inc.

Any of the embodiments disclosed herein incorporating LED light sources may include power or driver circuitry having a buck regulator, a boost regulator, a buck-boost regulator, a fly-back converter, a SEPIC power supply or the like and/or multiple stage power converter employing the like, and may comprise a driver circuit as disclosed in U.S. patent application Ser. No. 14/291,829, filed May 30, 2014, entitled "High Efficiency Driver Circuit with Fast Response" by Hu et al. (Cree docket no. P2276US1, attorney docket no. 034643-000618) or U.S. patent application Ser. No. 14/292,001, filed May 30, 2014, entitled "SEPIC Driver Circuit with Low Input Current Ripple" by Hu et al. (Cree docket no. P2291US1, attorney docket no. 034643-000616) incorporated by reference herein. The circuit may further be used with light control circuitry that controls color temperature of any of the embodiments disclosed herein, such as disclosed in U.S. patent application Ser. No. 14/292,286, filed May 30, 2014, entitled "Lighting Fixture Providing Variable CCT" by Pope et al. (Cree docket no. P2301US1) incorporated by reference herein.

In some embodiments, each LED element or module may comprise one or more LEDs disposed within a coupling cavity with an air gap being disposed between the LED element or module and a light input surface. In any of the embodiments disclosed herein each of the LED element(s) or module(s) can have different or the same light distribution, although each may have a directional emission distribution (e.g., a side emitting distribution), as necessary for coupling with the waveguide.

Figure 16:
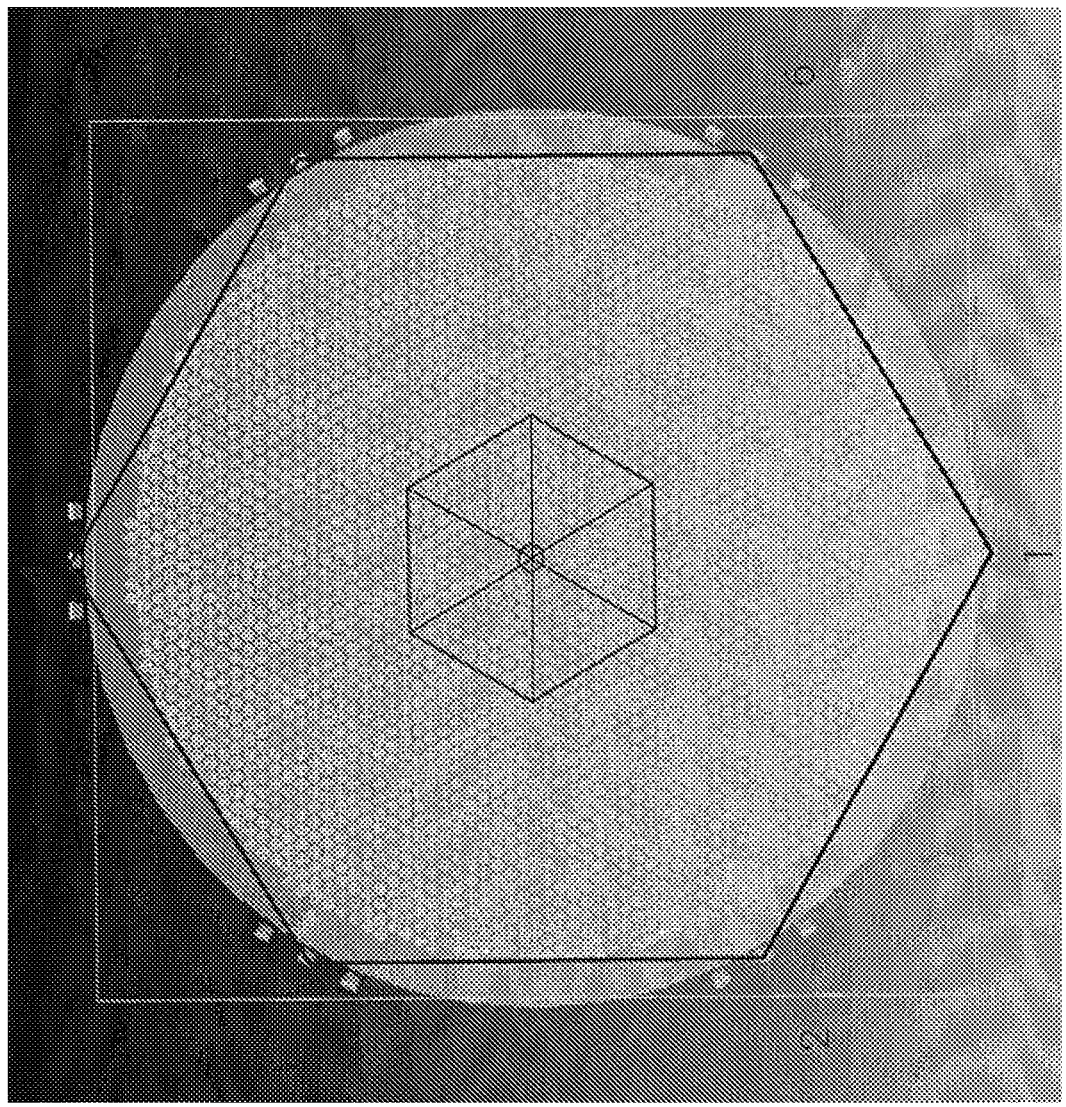
FIG. 16 illustrates a plan view of a luminaire wherein spacing of the light sources matches the polygonal geometry of the array of light extraction elements.
Figure 17:
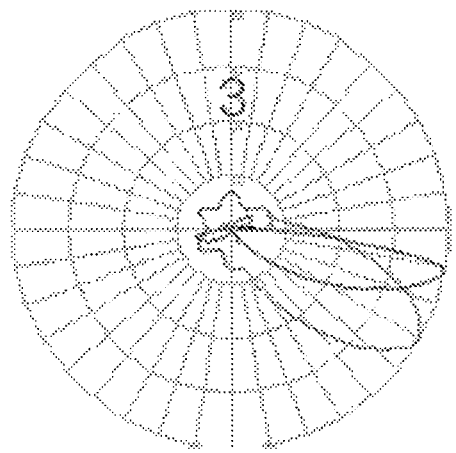
FIG. 17 provides illuminance distribution patterns of the luminaire of FIG. 12 illustrating azimuthal steering according to some embodiments.
Figure 17:
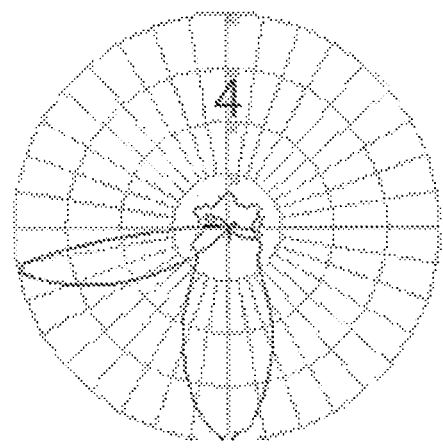
Figure 17:
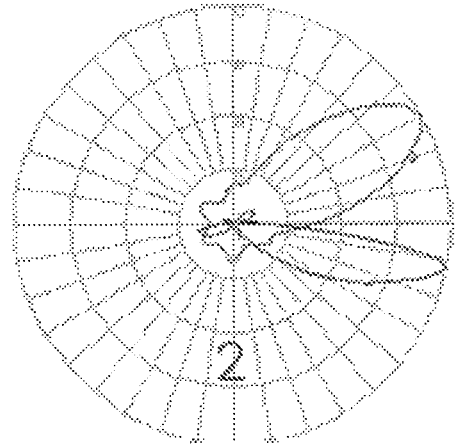
Figure 17:
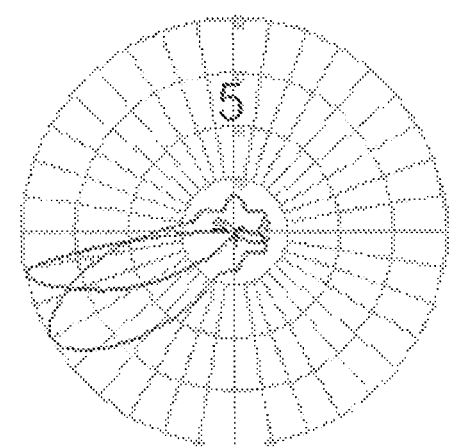
Figure 17:
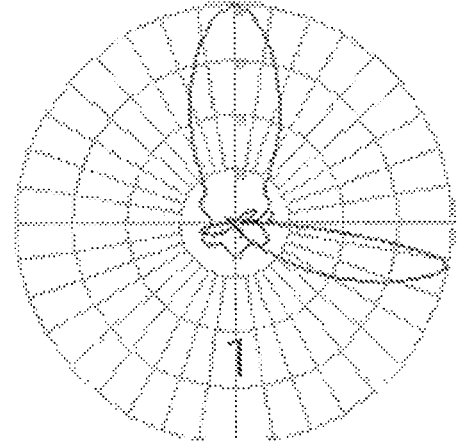
Figure 17:
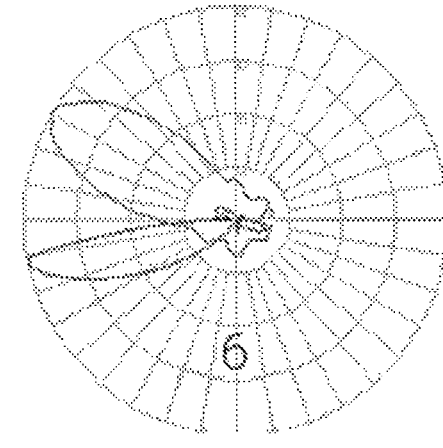
Figure 18:
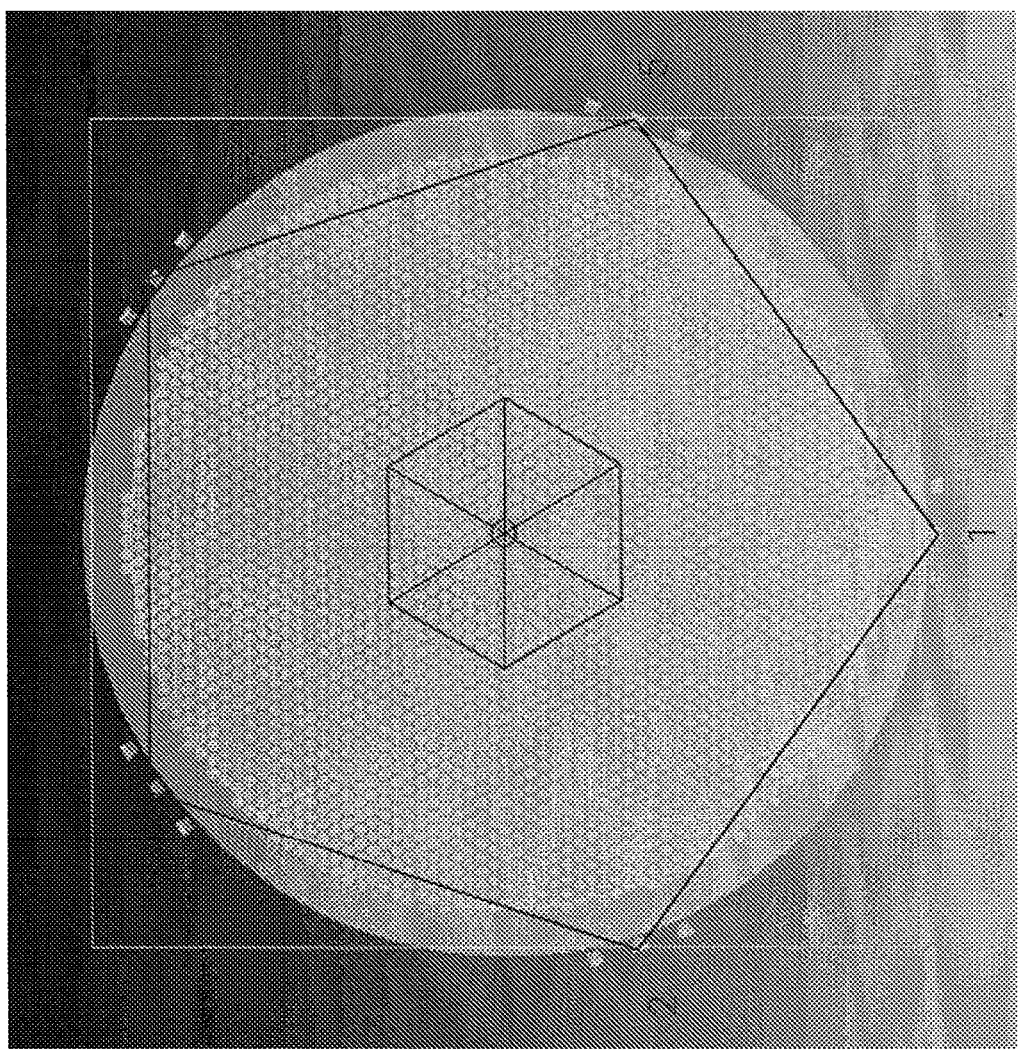
FIG. 18 illustrates a plan view of a luminaire wherein spacing of the light sources does not match the polygonal geometry of the array of light extraction elements.
Figure 19:
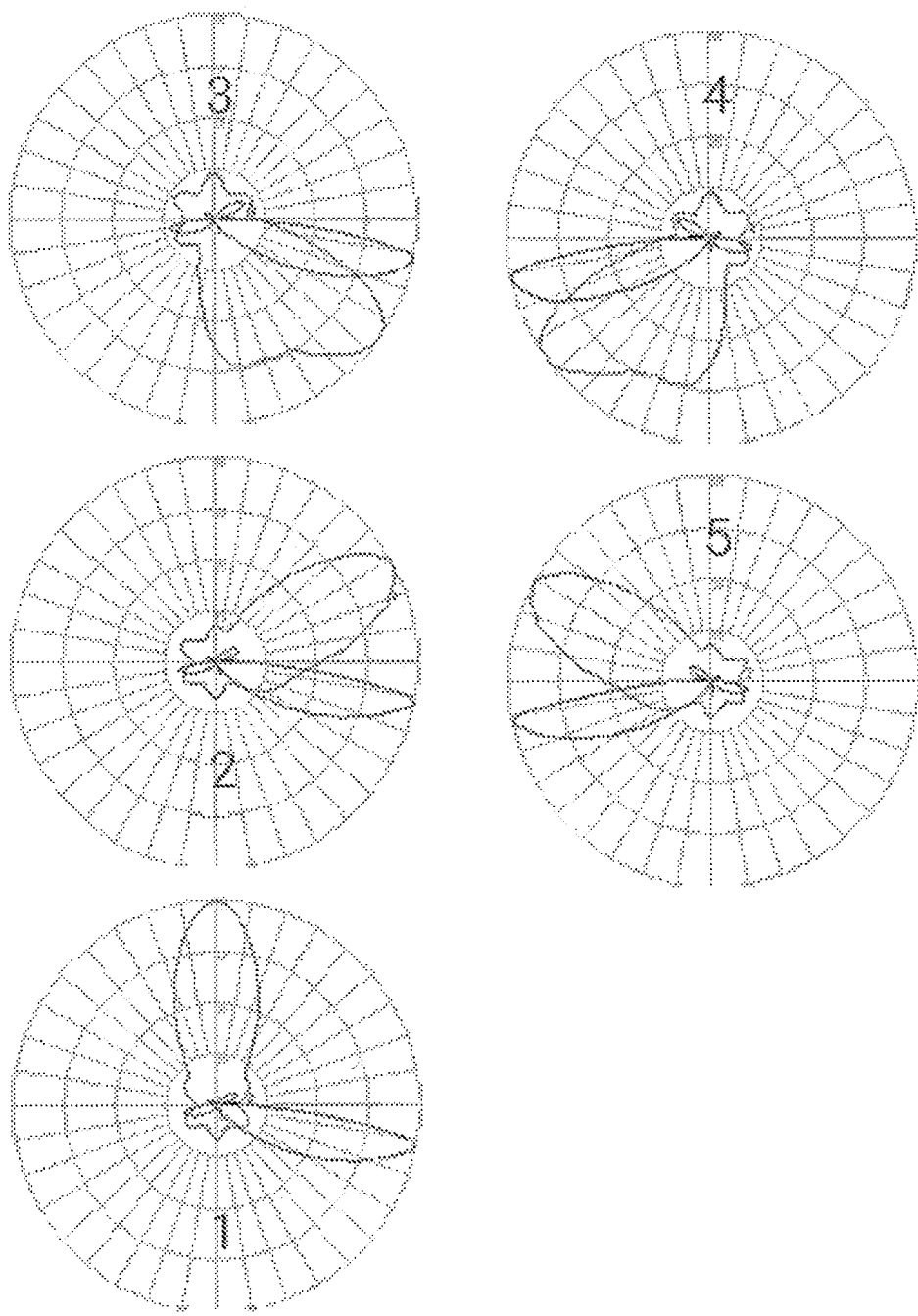
FIG. 19 provides illuminance distribution patterns of the luminaire of FIG. 14 illustrating azimuthal steering according to some embodiments.

In the embodiment of FIG. 5, the light sources 14 are groupings of LEDs 16. The light sources 14 have differing radial angular positioning or spacing along the perimeter of the waveguide body 12 for steering an azimuthal component of illuminance distribution patterns of the luminaire in conjunction with the light extraction component 13. Generally, the light sources can have any spacing along the perimeter of the waveguide body consistent with steering azimuthal components. Depending on the desired illuminance distribution pattern, the light sources can have equal or unequal spacing along the waveguide body perimeter. As described herein, the light extraction elements can be arranged in arrays of various geometry. In the embodiment of FIG. 5, for example, the light extraction elements 51 are disposed in a hexagonal array. Spacing of the light sources, in some embodiments, matches the polygonal geometry of the array of light extraction elements. FIG. 16 illustrates one embodiment wherein spacing of the light sources matches the polygonal geometry of the array of light extraction elements. As illustrated in FIG. 16, the light extraction elements 121 of the luminaire 120 are arranged in a hexagonal array 122. Similarly, the light sources 123 are spaced in a hexagonal format along the perimeter of the waveguide body 124. An azimuthal component of illuminance distribution patterns of the luminaire 120 can be steered by selectively lighting one or more of the light sources 123. The illuminance distribution patterns of FIG. 17 illustrate such azimuthal steering. The number of each illuminance distribution pattern in FIG. 13 corresponds to the light source in FIG. 16 selectively lit to produce the distribution pattern. Alternatively, spacing of the light sources does not match the polygonal geometry of the array of light extraction elements. FIG. 18 illustrates mismatch between the polygonal geometry of the array of light extraction elements and spacing of the light sources. The light extraction elements 121 of FIG. 18 are arranged in a hexagonal array 122 with the light sources 123 spaced in a pentagonal format along the perimeter of the waveguide body 124. This mismatch in geometry produces illuminance distribution patterns different than embodiments wherein the geometries are matched and illustrates the interdependence of light source spacing and light extraction component design for azimuthal steering. FIG. 19 illustrates illuminance distribution patterns of the luminaire 120 of FIG. 18 when light sources are selectively lit. The number of each illuminance distribution pattern in FIG. 19 corresponds to the light source in FIG. 18 selectively lit to produce the distribution pattern. Steering azimuthal components as described herein permits dynamic alteration of illuminance distribution patterns.

Selectively lighting one or more light sources along the waveguide body perimeter resulting in azimuthal steering can be controlled by a computer or other programmable device. Selective lighting strategies and/or patterns for generating various azimuthal illuminance distributions can be stored on and executed by the computer or programmable device in conjunction with driver(s), current controller(s) and/or associated circuitry. Additionally, the computer or programmable device can allow a user to select lighting pattern(s), thereby initiating changes in illuminance distribution patterns of the luminaire. Changes in illuminance distribution patterns can also be conducted with reference to color temperature and color rendering aspects of the luminaire. In embodiments wherein LEDs are employed as light sources, luminaire color temperature can be altered in conjunction with the illuminance distribution patterns to provide real-time adjustments in response to changes in the lighting environment.

II. Waveguides with Dynamic Light Extraction Elements

In another aspect, a luminaire described herein comprises a waveguide body and light extraction component on and/or in the waveguide body, wherein the light extraction component includes one or more reversibly moveable surfaces for altering illuminance distribution patterns of the luminaire in response to one or more forces applied to the light extraction component.

As detailed further herein, forces can be applied mechanically, electrically and/or magnetically to reversibly movable surfaces of the light extraction component by a force application assembly of the luminaire. In some embodiments, the reversibly moveable surfaces can form individual light extraction elements of the light extraction component. In such embodiments, the reversibly moveable surfaces are reversibly deflectable, expandable, contractible or combinations thereof. For example, the reversibly moveable surfaces can be deflected or expanded to form light extraction elements having shapes, profile and/or features of any of the light extraction elements described in Section I hereinabove. In some embodiments, reversibly movable surfaces can be deflected or expanded to form light extraction elements of hemispherical profile. Height of the hemispherical profile can vary according to the amount of force applied to the reversibly moveable surfaces. In additional embodiments, the reversibly moveable surfaces can be deflected or expanded to provide light extraction elements having shapes and/or features illustrated in FIGS. 6-15 herein. Alternatively, the reversibly moveable surfaces can be deflected to provide light extraction elements having concave profile, such as depressions or indents.

In some embodiments, a membrane is provided on one or more surfaces of the waveguide, wherein the membrane comprises an array of reversibly moveable surfaces. When deflected, expanded or contracted, the reversibly moveable surfaces form an array of light extraction elements. With reference to FIG. 9, for example, reversibly moveable surfaces of the membrane 52 can form an array of light extraction elements 51 when deflected or expanded by application of one or more forces by a force application assembly of the luminaire. When the forces are removed, the surfaces return to an unraised or planar configuration, thereby smoothing the surface of the membrane 52. Similarly, the reversibly moveable surfaces of the membrane can form light extraction elements 62 in a series of elongate parallel protrusions 63 as illustrated in FIG. 10 when deflected or expanded by the force application assembly. In further embodiments, the membrane is deflected or expanded as monolithic piece, thereby providing a single light extraction element over the waveguide. For example, the membrane can be expanded to provide a single convex or domed light extraction element spanning the waveguide. Alternatively, the membrane can be deflected inwardly to provide a single concave light extraction element spanning the waveguide.

Figure 20:
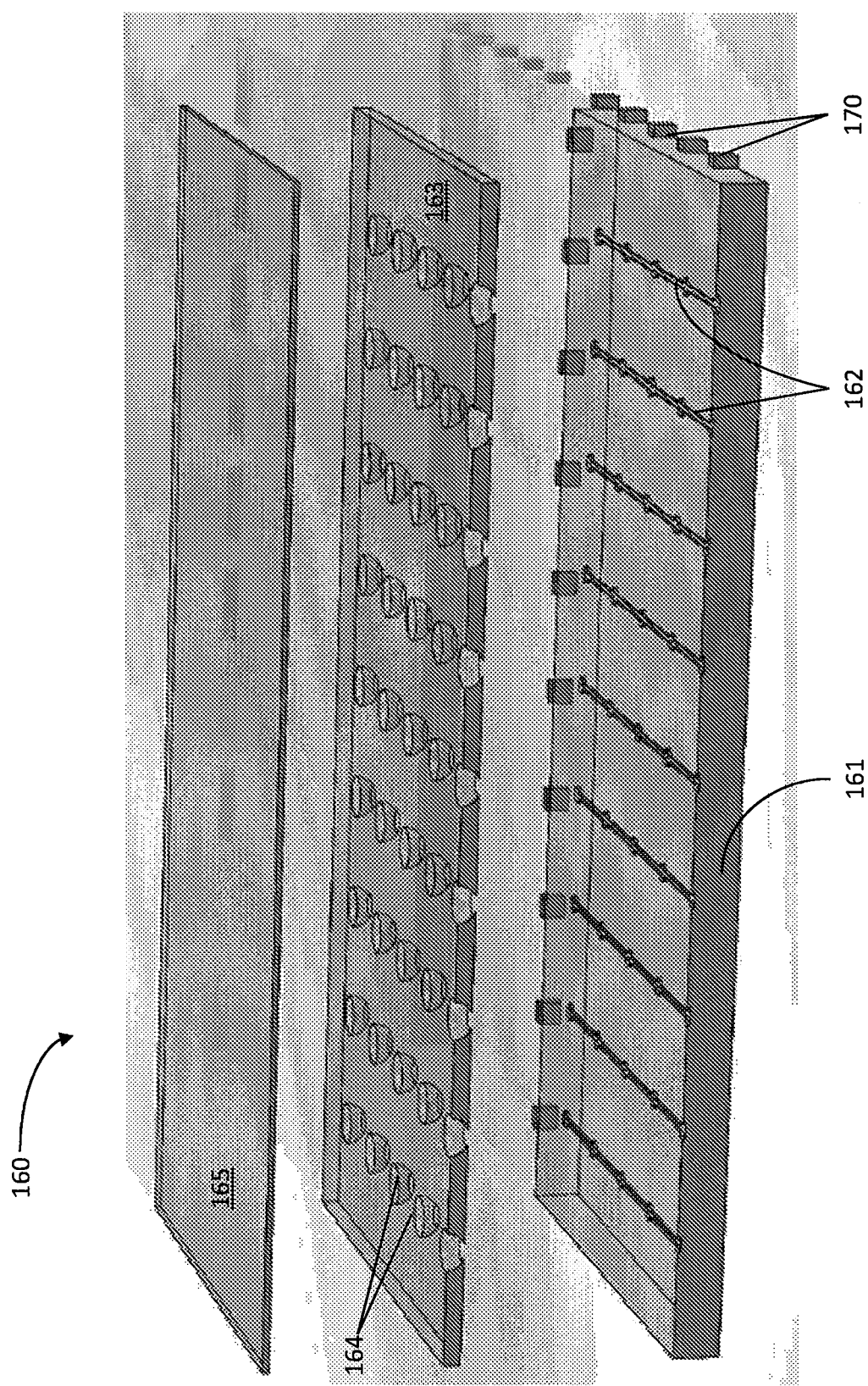
FIG. 20 illustrates an exploded view of a luminaire employing dynamic light extraction elements according to some embodiments.

Forces can be applied to the reversibly moveable surfaces mechanically, electrically and/or magnetically. In some embodiments, the force application assembly comprises one or more channels and/or cavities for applying positive or negative fluid pressure to the reversibly moveable surface(s) of individual light extraction elements. FIG. 20 illustrates one embodiment of a luminaire comprising a waveguide and light extraction component including one or more reversibly moveable surfaces for altering illuminance distribution patterns of the luminaire in response to application of positive or negative fluid pressure. As illustrated in the exploded view of FIG. 16, the luminaire 160 comprises a waveguide body 161 having a plurality of fluid channels 162 formed thereon and light sources 170 positioned along the perimeter of the waveguide body 161. The waveguide body 161 can be formed of any optically transmissive material supporting TIR, including the waveguide materials described in Section I above. A plate 163 having an array of cavities 164 is positioned over the face of the waveguide body 161, wherein the array of cavities 164 is in communication with the fluid channels 162. The fluid channels 162 and cavities 164 can have any arrangement/spacing on the waveguide body 161. For example, the cavities 164 can be arranged in arrays of various format, including polygonal and other arrays discussed in Section I above. In some embodiments, the cavities 164 are arranged in a hexagonal array on the waveguide body 161. The plate 163 can be formed of any material not inconsistent with the objectives of the present invention. In some embodiments, the plate 163 is formed of an optically transmissive polymeric material. The plate 163, in one embodiment, is formed of the same material as the waveguide body 161. In other embodiments, the plate 163 is formed of a different material than the waveguide body 161. In such embodiments, the plate 163 and waveguide body 161 can be indexed matched or indexed mismatched.

Figure 21:
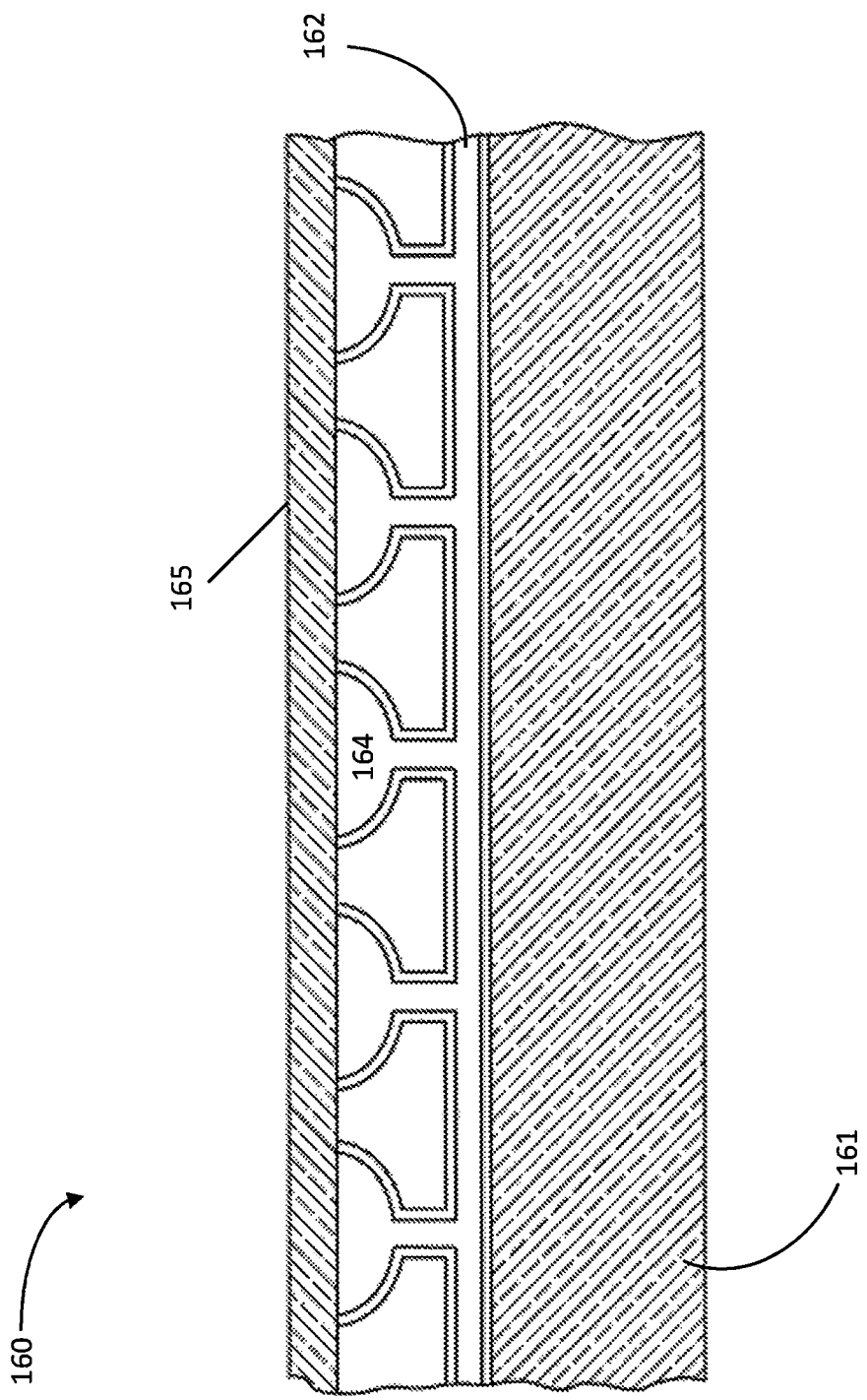
FIG. 21 illustrates a fragmentary cross-sectional view of the luminaire of claim 16.

The plate 163 is covered with a flexible membrane 165. When covering the plate 163, the flexible membrane encloses the cavities 164. FIG. 21 illustrates a cross-sectional view of the luminaire 160, wherein the cavities 164 are enclosed by the flexible membrane 165. FIG. 21 also illustrates the cavities 164 being in communication with the fluid channels 162. The flexible membrane 165 can be formed of any optically transmissive material not inconsistent with the objectives of the present invention. In some embodiments, the membrane 165 is formed of a polymeric material, such as one or more elastomers or thermoplastics. Material of the membrane 165 can have an index of refraction matching the waveguide body 161 and/or fluid disposed in the cavities and channels 162. In other embodiments, material of the membrane is not index matched to the waveguide body 161 and/or fluid in the channels and cavities. Thickness of the membrane 165 can be selected according to several considerations including, but not limited to, membrane material, mechanical demands of the luminaire environment and flexibility required to reversibly form extraction elements of the desired profile and/or geometry in response to force(s) applied by the force application assembly. In some embodiments, membrane thickness is in the range of 0.5-10 mm. The membrane 165 can have a uniform thickness. Alternatively, thickness can vary between one or more regions of the membrane 165. For example, membrane thickness over individual cavities 164 can differ from membrane thickness in regions where the cavities 164 are absent. Variations in membrane thickness can enhance flexibility of the reversibly moveable surfaces without sacrificing mechanical stability of the membrane.

The membrane 165 can be coupled to the waveguide body 161 and/or plate 163 defining the array of cavities 164. In some embodiments, the membrane 165 can be bonded directly to the waveguide body 161 (e.g., through chemical or thermal bonding, or a combination of the two). Additionally, adhesive bonding and non-adhesive bonding may be employed to join the optical surfaces. The present disclosure also contemplates use of bonding processes that are adhesive-free to bond two structures permanently, preferably using heat and pressure. Other non-adhesive bonding processes may be alternatively or additionally used. Such processes can employ layers made of materials that can be bonded using light or other electromagnetic radiation, such as UV-curable resins, or layers that are secured together by a bonding agent that does not use adhesives, bonding layers using mechanical motion (e.g., ultrasonic vibration welding), heat welding (e.g., hot gas welding, hot plate welding, laser welding), induction welding, encapsulating materials in one layer with materials of another layer, chemically combining materials at an interface between layers, solvent welding (e.g., acetone, cyclohexane, 1,2-dichloroethane, methyl ethyl ketone, tetrahydrofuran), microscopically and/or macroscopically physically interspersing particles of one layer in another layer, providing a friction-fit, interference-fit, and/or suction fit between layers, securing layers together using one or more mechanical fasteners (e.g., staples, brads, rivets), or the like. Alternatively, the waveguide body 161 and membrane 165 may be bonded through one or more intermediate layers (such as an adhesive layer or pressure-sensitive adhesive film).

Fluid can be disposed in the fluid channels 162 and associated cavities 164 in conjunction with a pump or other apparatus to complete the force application assembly of the luminaire 160. Fluid of various optical properties can be employed. The fluid, in some embodiments, is optically transparent and has a refractive index matching or substantially matching the refractive index of the waveguide body 161. Alternatively, fluid index of refraction can be greater than or less than the index of refraction of the waveguide body 161. Further, the fluid may contain various additives such as scattering material, phosphors, dyes, upconverters and/or downconverters. The fluid, for example, can be selected from various oils including, but not limited to, immersion oils, aliphatic hydrocarbons, glycerin, mineral oil or mixtures thereof. In other embodiments, the fluid may be water or an aqueous-based mixture. Further, the fluid may be a gas such as air, nitrogen, argon or carbon dioxide.

Figure 22:
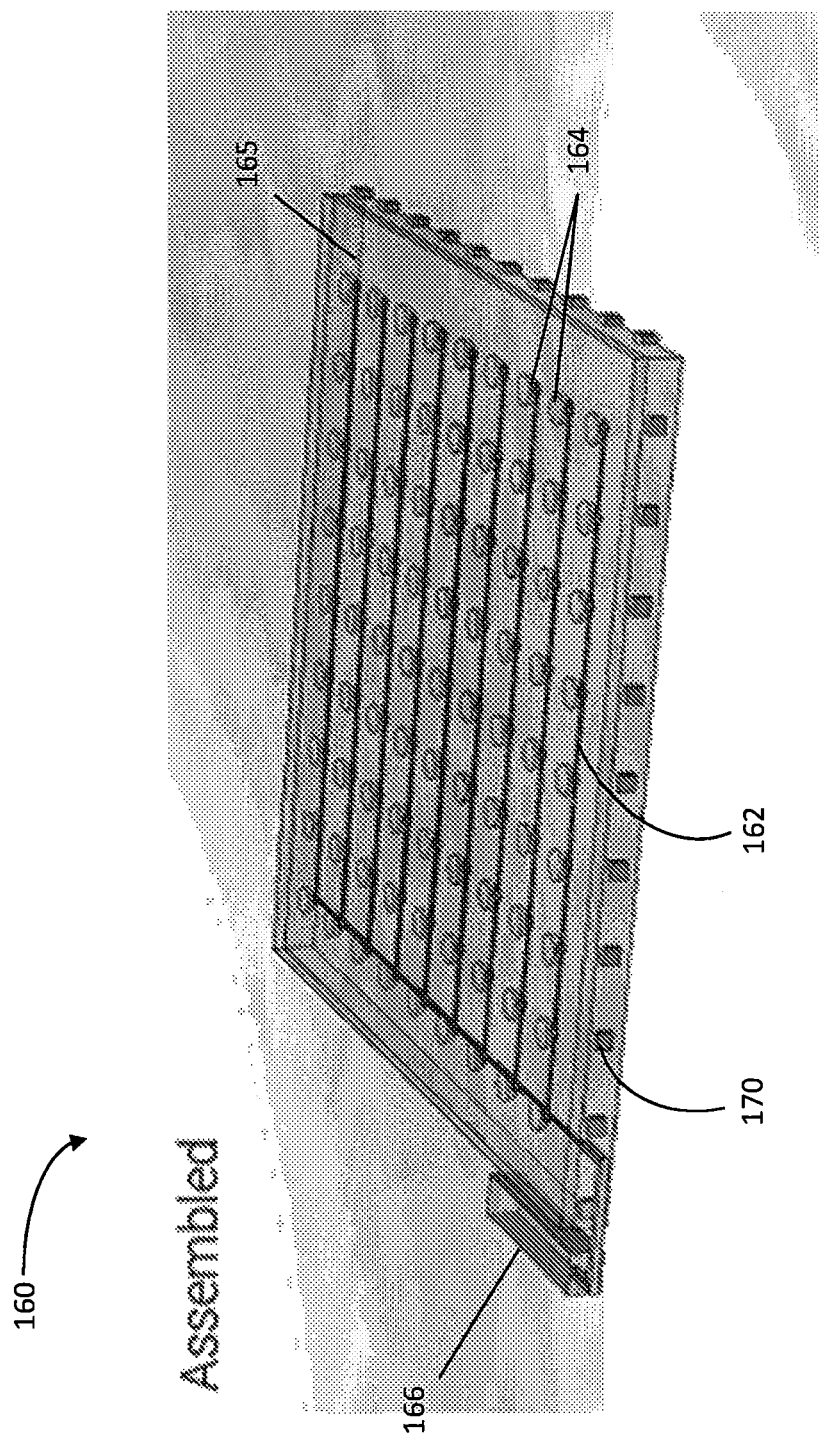
FIG. 22 illustrates an assembled luminaire including a fluidic force application assembly comprising a pump, fluid channels and cavities for application of fluid pressure to reversibly moveable surfaces of light extraction elements according to some embodiments.
Figure 23A:
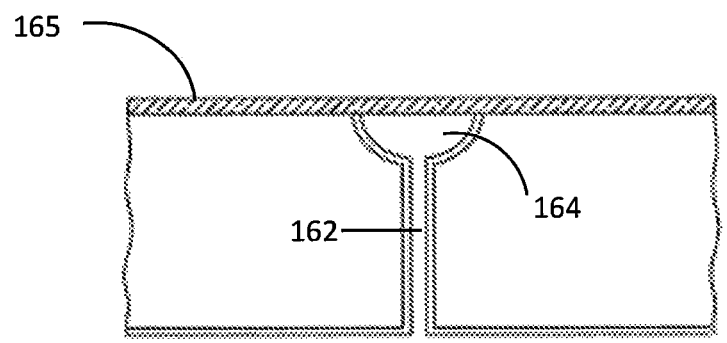
FIGS. 23A-23C illustrate fragmentary views of responses of a reversibly moveable surface of a light extraction element to various fluid pressures applied by a force application assembly according to some embodiments.
Figure 23B:
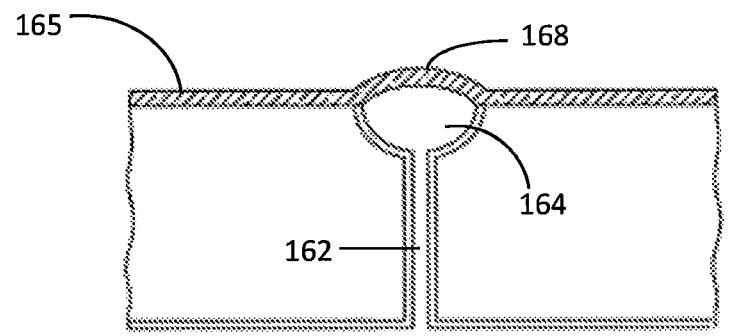
Figure 23C:
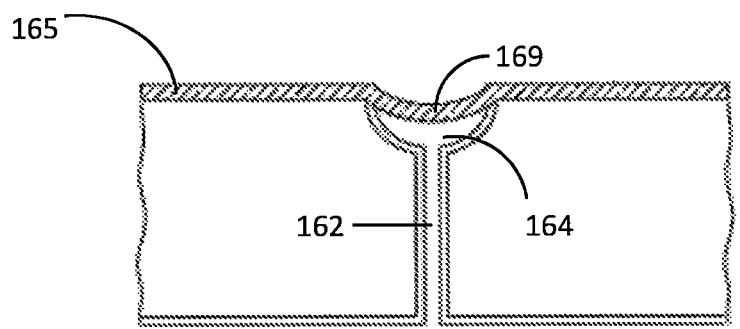

One or more pumps or similar apparatus can be employed to manage the fluid in the channels 162 and cavities 164. In some embodiments, a pressure pump, syringe pump, peristaltic pump, electro-osmotic pump or piezoelectric pump can be coupled to the channels 162 of the waveguide body 161 by pipes or tubing. FIG. 22 illustrates the assembled luminaire 160 with the pump 166 for applying pressure to the fluid in the channels 162 and cavities 164. The pump 166 in conjunction with the fluid channels 162, cavities 164 and fluid therein generally form the force application assembly of the luminaire 160. In some embodiments, the pump 166 applies a positive fluid pressure to the membrane 165 through the fluid channels 162 and cavities 164. Application of the positive fluid pressure locally expands the membrane 165 over the cavity 164 to form a light extraction element 168 of convex profile as illustrated in FIG. 23B. Height or radius of the convex light extraction element 168 can be proportional to the amount of positive pressure applied. Cessation of the positive fluid pressure returns the membrane 165 to a relaxed state as illustrated in FIG. 23A. A negative fluid pressure can also be applied to the membrane 165. In such embodiments, the negative fluid pressure locally draws the membrane 165 inwardly toward the cavity 164 to form a light extraction element 169 having a concave or indented profile as illustrated in FIG. 23C. Depth or radius of the concave light extraction element 169 can be proportional to the amount of negative pressure applied. Cessation of the negative pressure returns the membrane 165 to the relaxed state of FIG. 23A.

Figure 24A:
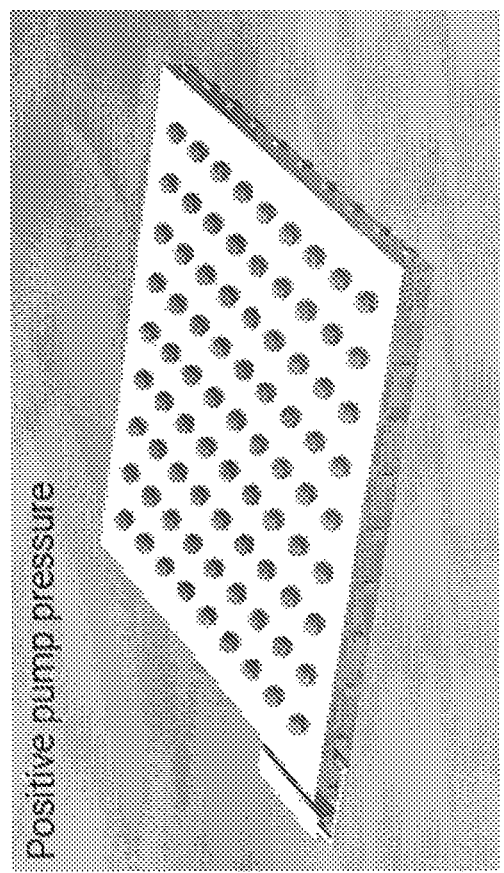
FIG. 24A illustrates an array of convex light extraction elements produced in response to application of positive fluid pressure to reversibly moveable surfaces of the light extraction elements.
Figure 24B:
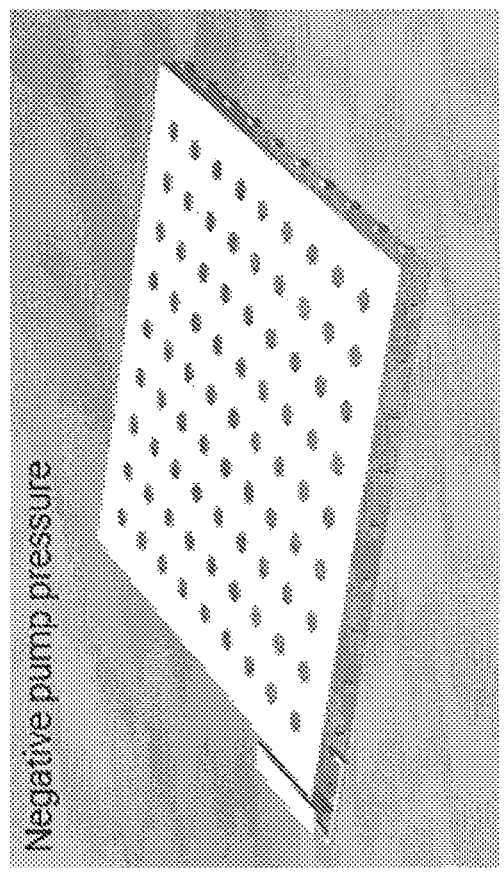
FIG. 24B illustrates an array of concave light extraction elements produced in response to application of negative fluid pressure to reversibly moveable surfaces of the light extraction elements.

Light extraction elements formed by application of fluid pressure to reversible moveable surfaces of the membrane 165 can alter illuminance distribution patterns of the luminaire 160. In some embodiments, positive or negative fluid pressure is applied to each of the cavities to provide an array of convex or concave light extraction elements as illustrated in FIGS. 24A and 24B respectively. Alternatively, differing pressures can be applied to selected areas of the membrane to provide individual light extraction elements or predetermined groupings of light extraction elements of differing profile to alter illuminance distribution patterns of the luminaire. For example, a positive fluid pressure can be applied to a first grouping of cavities to provide a first grouping of light extraction elements having convex profile. A negative pressure can also be applied to a second grouping of cavities to provide a second group of light extraction elements having concave profile. Similarly, a first pressure can be applied to a first grouping of cavities to provide a first grouping of light extraction elements of a first height. A second pressure can be applied to a second grouping of cavities to provide a second grouping of light extraction elements having a second height different from the first height. The first and second pressures can be selected from positive pressures and negative pressures. Any number or combination of differing light extraction elements based on application of differing pressures is contemplated.

Figure 25:
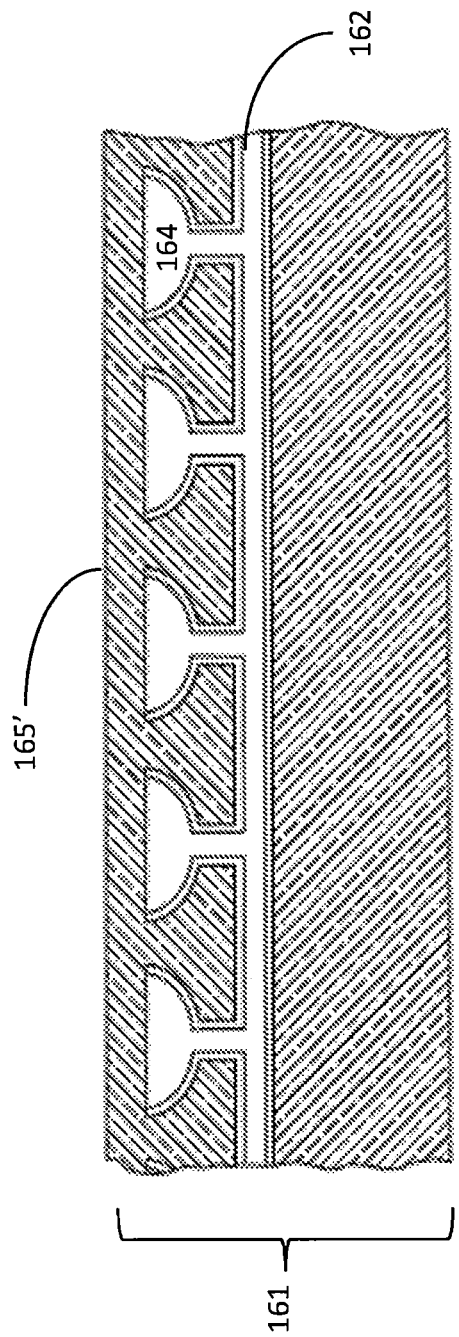
FIG. 25 illustrates a fragmentary cross-sectional view of a waveguide body incorporating fluid flow channels and cavities according to some embodiments.
Figure 26A:
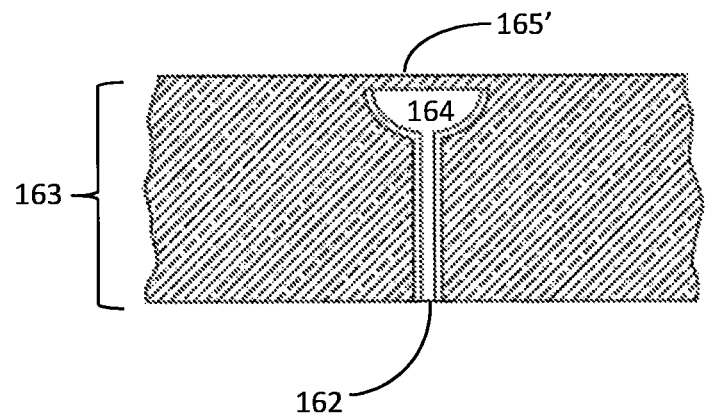
FIGS. 26A-26C illustrate fragmentary views of responses of a reversibly moveable surface of a light extraction element to various fluid pressures applied by a force application assembly according to some embodiments.
Figure 26B:
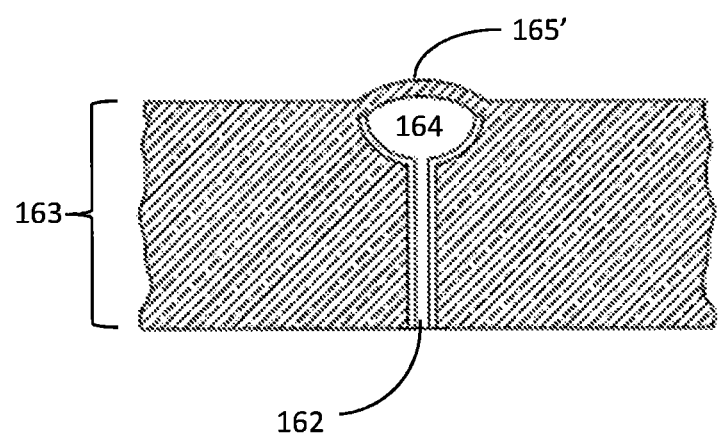
Figure 26C:
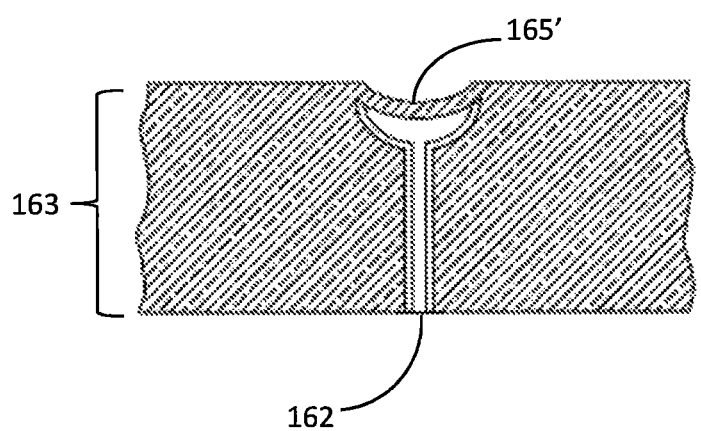

Referring once again to FIG. 20, the luminaire 160, in some embodiments, does not employ plate 163 and associated cavities 164. For example, the fluid channels 162 and cavities 164 can be formed as part of the waveguide body 161 as illustrated in FIG. 25. The outer surface 165' of the waveguide can have thickness responsive to pressure changes applied by the pump 166 in conjunction with fluid in the channels 162 and cavities 164 as illustrated in FIGS. 26A-26C. Alternatively, cavities 164 and associated fluid channels 162 are formed on the waveguide body 161 and subsequently covered by a membrane 165. For example, the channels 162 and cavities 164 can be formed in the waveguide body 161 by one or more techniques such as embossing, molding, stamping, additive manufacturing or lithography. Once formed, a membrane 165 can be applied to the waveguide body 161 for covering the cavities 164.

Figure 27:
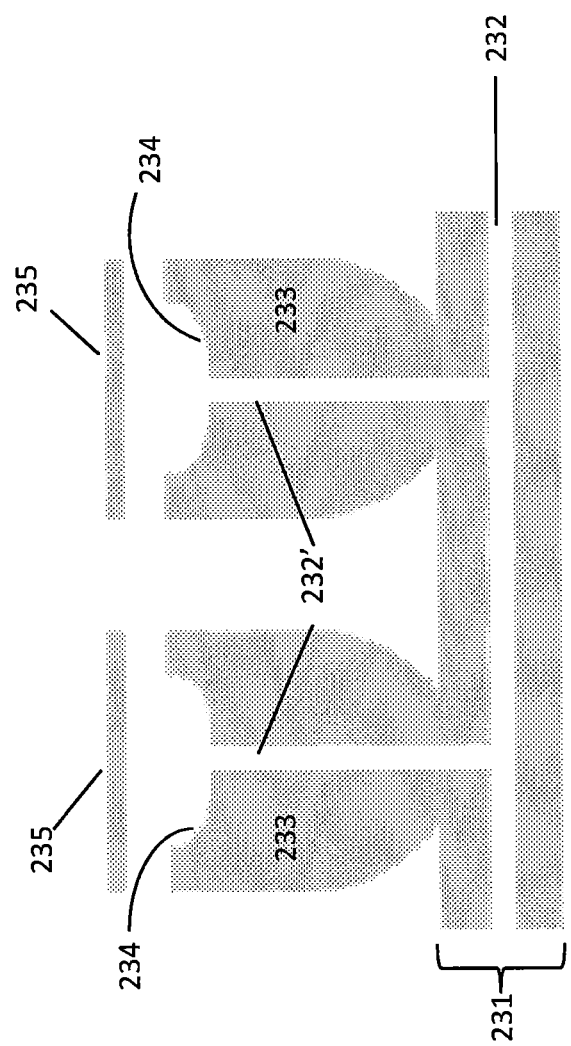
FIG. 27 illustrates extraction lens constructions according to some embodiments.

In some embodiments, an array of extraction lenses are formed on the surface of the waveguide body, the lenses including cavities in communication with fluid flow channels as described herein. The lenses can be capped with a flexible membrane for alteration by fluid pressure applied to the membrane via the flow channels and cavities. FIG. 27 illustrates extraction lenses according to some embodiments described herein. As illustrated in FIG. 27, extraction lenses 233 are formed on the waveguide body 231. The extraction lenses 233 comprise cavities 234 in communication with fluid channels 232 of the waveguide body 231. Fluid channels 232' extend into the extraction lens 233 permitting fluid to enter the cavity 234. The cavity 234 of each extraction lens is covered with a flexible membrane 235 for alteration by fluid pressure applied to the membrane 235 via the flow channels 232 and cavities 234.

Fluid channels and cavities of dynamic light extraction elements described herein can have any dimensions not inconsistent with the objectives of the present invention. In some embodiments, for example, the fluid channels and/or cavities have dimensions for managing microliters of fluid. In other embodiments, the fluid channels and/or cavities can accommodate milliliters of fluid.

Figure 28:
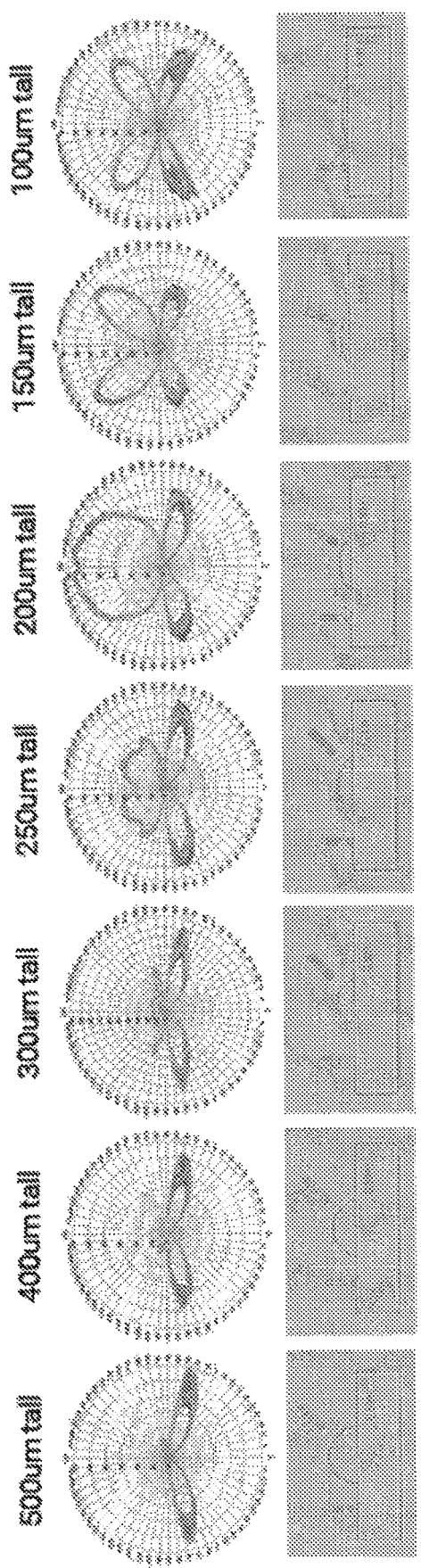
FIG. 28 illustrates changes in illuminance distribution patterns of a luminaire as a function of radius of hemispherical light extraction elements according to some embodiments.
Figure 29:
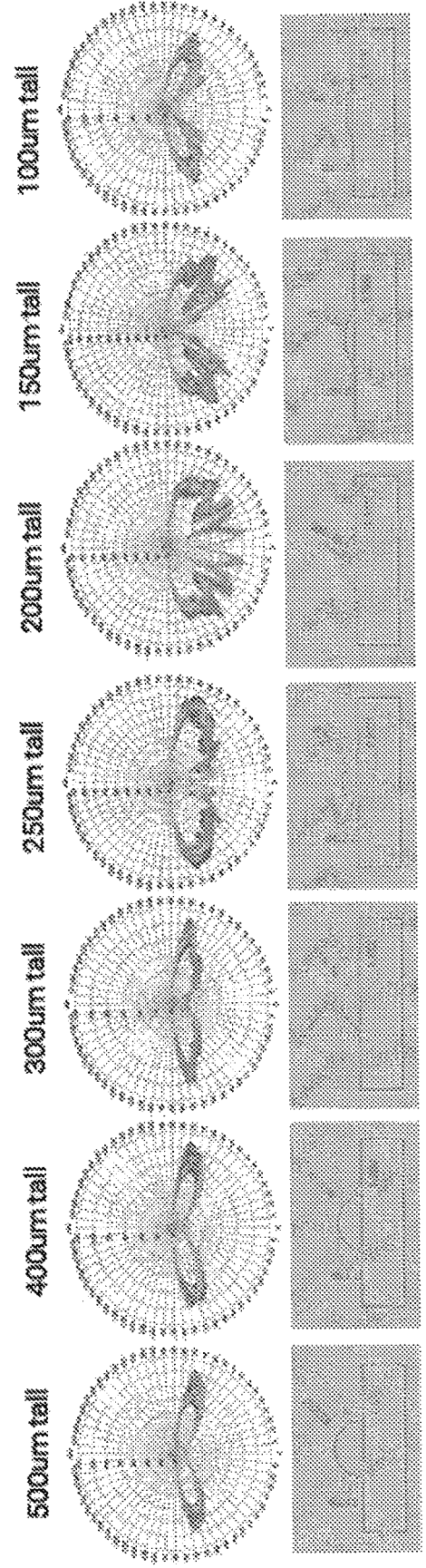
FIG. 29 illustrates alteration to the illuminance distribution patterns of FIG. 24 when a specular backside reflector is added to the luminaire construction.
Figure 30:
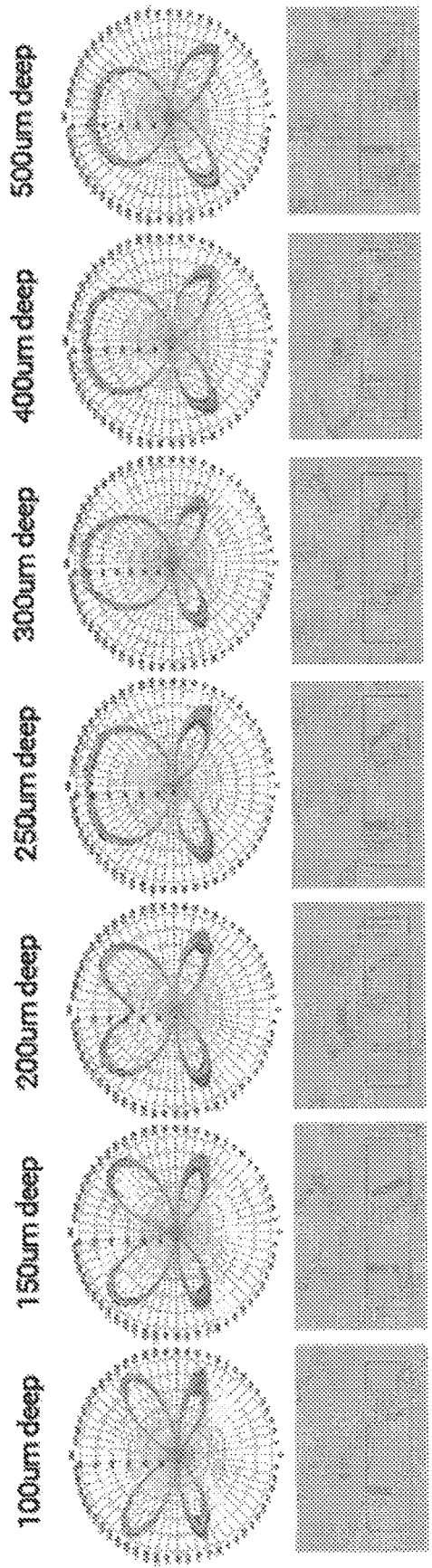
FIG. 30 illustrates changes in illuminance distribution patterns of a luminaire as a function of radius of concave light extraction elements according to some embodiments.
Figure 31:
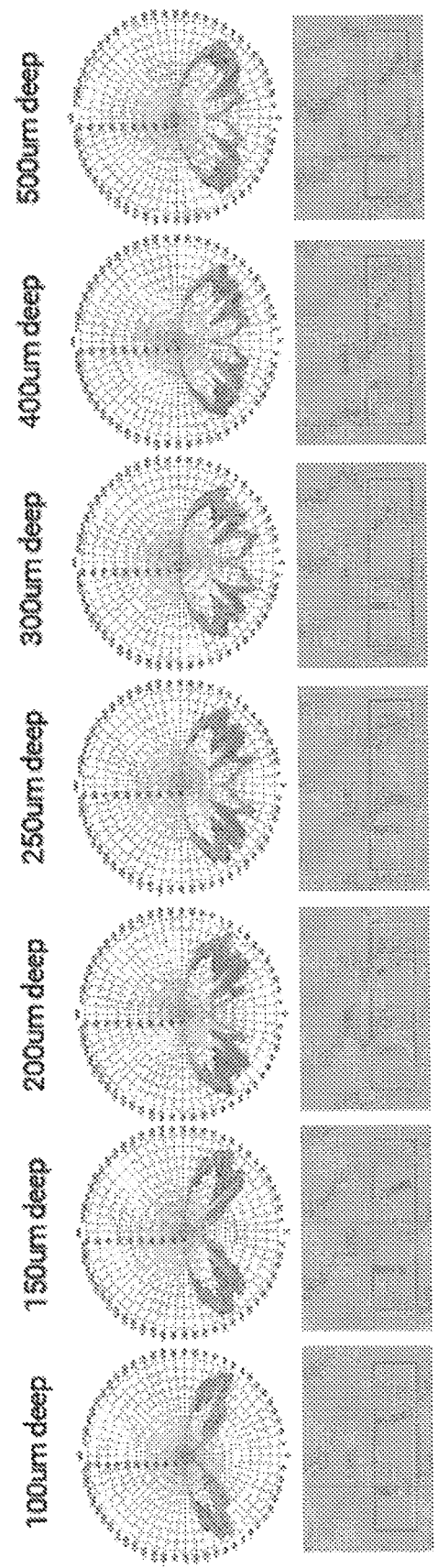
FIG. 31 illustrates alteration to the illuminance distribution patterns of FIG. 26 when a specular backside reflector is added to the luminaire construction.

To illustrate alterations in illuminance distribution patterns with varying extraction element profile, a luminaire having the construction illustrated in FIG. 5 was modeled. Simulations of illuminance distribution patterns were conducted with the luminaire employing hemispherical light extraction elements of differing height or radius. Simulations were conducted for luminaire embodiments employing a backside reflector as well as embodiments wherein a backside reflector was absent. FIG. 28 illustrates changes in illuminance distribution patterns of the luminaire with changing radius of the hemispherical light extraction elements. The simulations of FIG. 28 were conducted without a backside reflector. FIG. 29 illustrates alterations to the illuminance distribution patterns of FIG. 28 when a specular backside reflector was added to the luminaire construction. In a similar manner, illuminance distribution patterns were simulated for light extraction elements having a concave profile. FIG. 30 illustrates changes in illuminance distribution patterns of the luminaire with changing depth or radius of the concave light extraction elements. FIG. 31 illustrates alterations to the illuminance distribution patterns of FIG. 30 when a specular backside reflector was added to the luminaire construction.

In further embodiments, surfaces of light extraction elements can be reversibly deflected, expanded or contracted via pathways other than fluid pressure. In some embodiments, for example, the reversibly moveable surfaces comprise piezoelectric materials or electroactive polymers operable to move in response to an applied electric field. In such embodiments, the force application assembly of the luminaire can include electrodes and associated circuitry for application of electric field(s) to induce deflection and formation of light extraction elements of desired profile and/or geometry. Polymeric materials having piezoelectric properties, in some embodiments, can be employed in the reversibly moveable surfaces of individual light extraction elements. Piezoelectric polymeric materials can include ferroelectric polymers such as polyvinyl fluoride (PVF), polyvinylidene fluoride (PVDF), polyvinylidene fluoride-trifluoroethylene (PVDF-TrFE), polyvinylidene fluoride-tetrafluoroethylene (PVDF-TFE). Moreover, polymeric composite materials exhibiting piezoelectric properties can be used in the reversibly moveable surfaces. Acrylics, polyolefins and/or polycarbonate, for example, can be doped with piezoelectric particles to provide surfaces responsive to an applied electric field. Piezoelectric particles can include titanate ($BaTiO_3$) particles, bismuth telluride particles (BiTe), other inorganic particles or mixtures thereof. Other suitable electrically responsive materials can include dielectric elastomers including, but not limited to, acrylic and silicone elastomers. Conducting polymers such as polypyrrole, polyaniline, polythiophene and/or derivatives thereof may also be used in reversibly moveable surfaces responsive to an applied electric field or voltage. Referring once again to FIG. 9, each of light extraction elements 51 can comprise an assembly of piezoelectric or electroactive polymer positioned between electrodes. Application of an electric field or voltage by the electrodes deflects or expands the piezoelectric or electroactive polymer to form the bump light extraction elements 51. Light extraction elements having shapes, profiles and/or features of any of the light extraction elements described in Section I herein may also be formed by electrode-electroactive polymer assemblies. In some embodiments, optically transparent electrode materials can be used, including optically transparent conducting oxides. Optically transparent conducting oxides can comprise indium tin oxide (ITO), gallium indium tin oxide (GITO), and zinc indium tin oxide (ZITO). Surfaces of light extraction elements can also be reversibly deflected, expanded or contracted via magnetic pathways. Surfaces of light extraction elements, for example, can include magnetic elements for response to an applied magnetic field.

As described herein, the force application assembly can provide one or more forces to the light extraction elements individually or in predetermined groupings to provide the desired illuminance distribution pattern of the luminaire. The force application assembly can be controlled by a computer or other programmable device. Force application strategies and/or patterns for generating various illuminance distributions with the light extraction elements can be stored on and executed by the computer or programmable device. For example, fluid pressures and valves for routing application of the fluid pressures to cavities of light extraction elements to be altered can be controlled by the computer. In piezoelectric or electroactive polymer embodiments, electrode assemblies can be independently controlled with appropriate circuitry for application of electric field to selected light extraction elements. Moreover, the computer or programmable device can allow a user to alter forces applied to light extraction elements, thereby initiating a change in illuminance distribution pattern of the luminaire. In being part of the luminaire construction, the force application assembly precludes adjustment via one or more means external to the device, such as by an individually manually moving, adding or removing optical element(s) of the luminaire. Changes in illuminance distribution patterns can also be conducted with reference to color temperature and color rendering aspects of the luminaire. In embodiments wherein LEDs are employed as light sources, luminaire color temperature can be altered in conjunction with the illuminance distribution patterns to provide real-time adjustments in response to changes in the lighting environment.

Any of the embodiments disclosed herein may be used in a luminaire having one or more communication components forming a part of the light control circuitry, such as an RF antenna that senses RF energy. The communication components may be included, for example, to allow the luminaire to communicate with other luminaires and/or with an external wireless controller, such as disclosed in U.S. patent application Ser. No. 13/782,040, filed Mar. 1, 2013, entitled "Lighting Fixture for Distributed Control" or U.S. Provisional Application No. 61/932,058, filed Jan. 27, 2014, entitled "Enhanced Network Lighting" both owned by the assignee of the present application and the disclosures of which are incorporated by reference herein. More generally, the control circuitry can include at least one of a network component, an RF component, a control component, and one or more sensors. A sensor, such as a knob-shaped sensor, may provide an indication of ambient lighting levels and/or occupancy within the room or illuminated area. Other sensors are possible, and a sensor may be integrated into the light control architecture governing the force application assembly.

III. Hybrid Luminaires

In a further aspect, luminaires of hybrid construction are described, which include at least one waveguide body in conjunction with one or more conventional optics. In some embodiments, for example, a luminaire comprises at least one light source and a waveguide including a waveguide body and light extraction component(s) on and/or in the waveguide body. At least one optic external to the waveguide is arranged to receive at least a portion of light from the waveguide and/or a portion of light directly from the light source. The at least one external optic can be a reflector or lens.

Turning now to specific components, the waveguide body of can be formed of any suitable material, including the waveguide materials listed in Section I herein. Moreover, the waveguide body can have any desired geometry or shape. In some embodiments, the waveguide body can be polygonal, circular or elliptical. Shape of the waveguide body may also combine polygonal elements with circular and/or elliptical elements. Further, the waveguide body may be planar, curved or combinations thereof. Shape and dimensions of the waveguide body can be selected according to several considerations including, but not limited to, waveguide material, overall luminaire design, luminaire application(s) and associated lighting requirements. The waveguide body, for example, can have shape and dimensions suitable for pendant, surface mount, wall mount and/or stand-alone luminaires.

The light extraction component of the waveguide can have any desired construction and/or design. Design of the light extraction component can be selected according to several considerations including, but not limited to, lighting requirements and applications of the luminaire, geometry/shape of the waveguide body and/or arrangement of the light sources of the luminaire. In some embodiments, the light extraction component has a construction or design described in Section I hereinabove. Light extraction elements, for example, can have shapes and/or features illustrated in FIGS. 6-15 herein. Alternatively, the light extraction component can incorporate the dynamic light extraction elements described in Section II hereinabove employing reversibly moveable surfaces.

Hybrid luminaires described herein can employ a variety of light sources including incandescent, fluorescent or LED. In some embodiments, for example, LEDs described in Section I hereinabove are employed in the luminaire construction. Type and number of light sources can be selected according to luminaire lighting and performance requirements, including lumen output, color temperature and color rendering. The light source(s) can have any desired arrangement relative to the waveguide. In some embodiments, light sources are arranged along the perimeter of the waveguide body. For example, the light sources can have spacing to permit azimuthal steering as described in Section I herein. Alternatively, one or more light sources may have a central arrangement, such as in a coupling cavity between adjacent waveguides.

The luminaire comprises at least one optic external to the waveguide, wherein the optic is arranged to receive at least a portion of light from the light extraction component and/or light directly from the luminaire light source(s). In some embodiments, the optic is arranged to receive all or substantially all of the light emitted from the waveguide by the light extraction component. The external optic can have any desired arrangement relative to the waveguide. In some embodiments, the external optic has a radial arrangement relative to the waveguide. In such embodiments, the external optical can surround or partially surround the waveguide. For example, in some embodiments, the waveguide and external optic are concentrically arranged. In other embodiments, the external optic can be arranged parallel to the waveguide.

External optic(s) of hybrid luminaires described herein can be reflective optics, refractive optics or various combinations thereof. Depending on the lighting application, suitable reflective optics can provide specular reflection or diffusion reflection. In some embodiments, reflective optics employ one or more curved surfaces, including concave and/or convex surfaces. Reflective surfaces may also incorporate a photoluminescent component, such as a phosphor or dye coating. A phosphor or dye coating may cover all or selected portion(s) of the reflective surface. In some embodiments, the light extraction component can be used irradiate selected areas of the reflector via the dynamic extractors described in Section II and/or the azimuthal steering described in Section I herein. An external optic of the luminaire, in some embodiments, includes an array of sub-optical elements. The sub-optical elements can be in alignment with the array of light extraction elements. A refractive optic, for example, can comprise an array of lenses having alignment with the array of light extraction elements of the waveguide.

Figure 32:
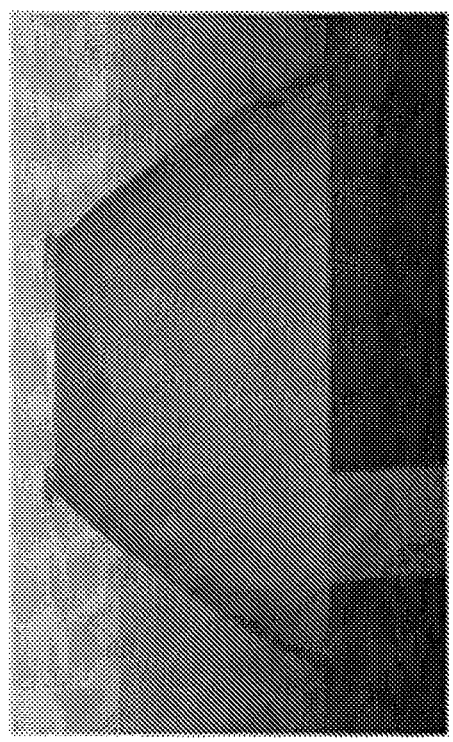
FIG. 32 illustrates one embodiment of a luminaire comprising a waveguide and optic external to the waveguide.

By receiving light from the light extraction component, the external optic is operable to redirect the light and alter illuminance distribution patterns of the luminaire. In some embodiments, the external optic can function as a collimator or otherwise narrow the light distribution received from the light extraction component. Depending on the type and arrangement of the external optic, a variety of illuminance distribution patterns can be produced. The variety of illuminance distribution patterns can be further increased when the luminaire construction incorporates azimuthal steering of Section I and/or dynamic light extractors of Section II. FIG. 32 illustrates one embodiment of a luminaire comprising a waveguide and optic external to the waveguide. The waveguide and associated light sources can have architectures as illustrated in FIG. 5. A parabolic specular reflector surrounds the waveguide and receives light from the light extraction component of the waveguide. In the embodiment of FIG. 32, the parabolic specular reflector redirects the received light while narrowing the illuminance distribution pattern.

The ability to dynamically alter illuminance distributions enables luminaires described herein to find application in a variety of lighting environments. For example, luminaires can find application in office or retail lighting wherein the illuminance distribution is specifically tailored to direct light where needed and minimize light where it is not. In such applications, illuminance distribution patterns can be based on real-time sensing of occupancy, occupant position, time of day and/or window number and positioning. Color temperature can also be varied with the illuminance distribution to provide addition lighting enhancements and effects, such as in architectural or museum lighting. Luminaires described herein can also be used as skylight and/or window simulators designed to provide a sense of a naturally sunlit room wherein illuminance distribution changes in a manner consistent with changing sun position during the day. Luminaires described herein may also find application in dynamic street lighting permitting real-time adjustments to illuminance distributions to match various conditions including roadway occupancy, weather and ambient lighting conditions.

Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A luminaire comprising:
a light source;
a waveguide including a waveguide body and a light extraction component on one or more surfaces of the waveguide body, the waveguide body transmitting light from the light source to the light extraction component by total internal reflection (TIR), wherein the light extraction component includes one or more reversibly moveable surfaces for altering illuminance distribution patterns of the luminaire in response to one or more forces applied to the light extraction component by a force application assembly of the luminaire, wherein the one or more reversibly moveable surfaces are movable between a generally convex shape and a generally concave shape.

2. The luminaire of claim 1 wherein the force application assembly applies the one or more forces using at least one of a mechanical, an electrical and a magnetic force application assembly.

3. The luminaire of claim 1 wherein the one or more reversibly moveable surfaces comprises a plurality of moveable surfaces and further comprising a flexible membrane provided on the one or more surfaces of the waveguide, wherein the flexible membrane comprises an array of the plurality of reversibly moveable surfaces.

4. The luminaire of claim 1 wherein the force application assembly comprises one or more channels for applying a positive fluid pressure or a negative fluid pressure to the one or more reversibly moveable surfaces.

5. The luminaire of claim 4 wherein the force application assembly comprises one or more cavities in fluid communication with the one or more channels, the one or more cavities being formed, at least in part, by a flexible membrane wherein the one or more reversibly moveable surfaces comprise the flexible membrane.

6. The luminaire of claim 4 wherein the one or more cavities are formed in a plate attached to the waveguide body.

7. The luminaire of claim 4 wherein the plate and the waveguide body are formed of optically transmissive material supporting TIR.

8. The luminaire of claim 7 wherein the plate is formed of a first optically transmissive material and the waveguide body is formed of a second optically transmissive material, wherein the first optically transmissive material is different than the second optically transmissive material.

9. The luminaire of claim 3 wherein the flexible membrane is bonded directly to the waveguide body to define the plurality of reversibly moveable surfaces.

10. The luminaire of claim 4 wherein the force application assembly comprises a pump in fluid communication with the one or more channels for altering a pressure applied to the one or more reversibly moveable surfaces by a fluid.

11. The luminaire of claim 4 wherein the positive fluid pressure or the negative fluid pressure is applied to each of the plurality of reversibly moveable surfaces to create a profile for each of the plurality of reversibly moveable surfaces.

12. The luminaire of claim 11 wherein the positive fluid pressure or the negative fluid pressure is applied to each of the plurality of reversibly moveable surfaces such that each of the plurality of reversibly moveable surfaces has the same profile.

13. The luminaire of claim 11 wherein the positive fluid pressure or the negative fluid pressure is applied to each of the plurality of reversibly moveable surfaces such that at least a first moveable surface of the plurality of reversibly moveable surfaces has a first profile and at least a second moveable surface of the plurality of reversibly moveable surfaces has a second profile, the first profile being different than the second profile.

14. The luminaire of claim 5 wherein the one or more cavities and the one or more channels are formed in the waveguide body.

15. The luminaire of claim 1 wherein a plurality of extraction lenses are formed on and extend from the one or more surfaces of the waveguide body, the one or more reversibly moveable surfaces comprising a plurality of moveable surfaces, the plurality of moveable surfaces being formed on the plurality of extraction lenses.

16. The luminaire of claim 1 wherein the one or more reversibly moveable surfaces comprise an assembly of piezoelectric polymer positioned between electrodes whereby application of an electric field or voltage by the electrodes deflects or expands the piezoelectric polymer.

17. The luminaire of claim 1 wherein the one or more reversibly moveable surfaces comprise an assembly of electroactive polymer positioned between electrodes whereby application of an electric field or voltage by the electrodes deflects or expands the electroactive polymer.

18. The luminaire of claim 1 wherein the one or more reversibly moveable surfaces comprise magnetic elements that respond to an applied magnetic field.

19. The luminaire of claim 1 wherein the force application assembly comprises a programmable device for controlling the one or more forces applied to the one or more reversibly moveable surfaces to generate a plurality of illuminance distribution patterns of the luminaire.

20. A method of dynamic lighting comprising:
providing a luminaire comprising one or more light sources, a waveguide body and light extraction component, wherein the light extraction component includes one or more reversibly moveable surfaces that are movable between a generally convex shape and a generally concave shape; and alterating an illuminance distribution pattern of the luminaire by controlling the application of one or more forces to the one or more reversibly moveable surfaces with a force application assembly of the luminaire.

21. A luminaire comprising:

a light source;

a waveguide including a waveguide body and a light extraction component on one or more surfaces of the waveguide body, the waveguide body transmitting light from the light source to the light extraction component by total internal reflection (TIR), wherein the light extraction component includes one or more reversibly moveable surfaces for altering illuminance distribution patterns of the luminaire in response to one or more forces applied to the light extraction component by a force application assembly of the luminaire, wherein the force application assembly comprises one or more channels for applying a positive fluid pressure or a negative fluid pressure to the one or more reversibly moveable surfaces.

22. The luminaire of claim 21 wherein the force application assembly comprises one or more cavities in fluid communication with the one or more channels, the one or more cavities being formed, at least in part, by a flexible membrane wherein the one or more reversibly moveable surfaces comprise the flexible membrane.

23. The luminaire of claim 21 wherein the one or more cavities are formed in a plate attached to the waveguide body.

24. The luminaire of claim 21 wherein the plate and the waveguide body are formed of optically transmissive material supporting TIR.

25. The luminaire of claim 24 wherein the plate is formed of a first optically transmissive material and the waveguide body is formed of a second optically transmissive material, wherein the first optically transmissive material is different than the second optically transmissive material.

26. The luminaire of claim 21 wherein the force application assembly comprises a pump in fluid communication with the one or more channels for altering a pressure applied to the one or more reversibly moveable surfaces by a fluid.

27. The luminaire of claim 21 wherein the positive fluid pressure or the negative fluid pressure is applied to each of the plurality of reversibly moveable surfaces to create a profile for each of the plurality of reversibly moveable surfaces.

28. The luminaire of claim 27 wherein the positive fluid pressure or the negative fluid pressure is applied to each of the plurality of reversibly moveable surfaces such that each of the plurality of reversibly moveable surfaces has the same profile.

29. The luminaire of claim 27 wherein the positive fluid pressure or the negative fluid pressure is applied to each of the plurality of reversibly moveable surfaces such that at least a first moveable surface of the plurality of reversibly moveable surfaces has a first profile and at least a second moveable surface of the plurality of reversibly moveable surfaces has a second profile, the first profile being different than the second profile.

30. The luminaire of claim 22 wherein the one or more cavities and the one or more channels are formed in the waveguide body.

* * * * *